United States Patent
Garcia et al.

(10) Patent No.: US 6,555,002 B2
(45) Date of Patent: Apr. 29, 2003

(54) APPARATUS AND METHOD FOR WASTEWATER TREATMENT WITH ENHANCED SOLIDS REDUCTION (ESR)

(75) Inventors: Paul G. Garcia, Las Vegas, NV (US); Leonard Davidson, Henderson, NV (US); H. Matthew Russell, Las Vegas, NV (US); Martin Perry Johnson, Pahrump, NV (US); Paul F. Garcia, Henderson, NV (US)

(73) Assignee: Premier Wastwater International, LLC, Las Vegas, NE (US)

( * ) Notice: Subject to any disclaimer, the term of this patent is extended or adjusted under 35 U.S.C. 154(b) by 48 days.

(21) Appl. No.: 09/972,222

(22) Filed: Oct. 5, 2001

(65) Prior Publication Data

US 2002/0040871 A1 Apr. 11, 2002

Related U.S. Application Data

(60) Provisional application No. 60/238,878, filed on Oct. 6, 2000, and provisional application No. 60/291,763, filed on May 17, 2001.

(51) Int. Cl.[7] .................................................. C02F 3/30
(52) U.S. Cl. ........................ 210/605; 210/622; 210/624; 210/195.1; 210/195.3; 210/205; 210/259; 210/903; 210/906; 210/908
(58) Field of Search ................................. 210/605, 607, 210/621–624, 630, 195.1, 205, 220, 259, 195.3, 903, 906, 908; 261/76, DIG. 70

(56) References Cited

U.S. PATENT DOCUMENTS

| | | |
|---|---|---|
| 3,291,309 A | 12/1966 | Hutchinson |
| 3,306,447 A | 2/1967 | Medeiros |
| 3,412,017 A | 11/1968 | Abson et al. |
| 3,528,704 A | 9/1970 | Johnson, Jr. |
| 3,728,253 A | 4/1973 | Kaufman |

(List continued on next page.)

FOREIGN PATENT DOCUMENTS

WO    WO 01/70636    *   9/2001

OTHER PUBLICATIONS

Kenneth M. Kalumuck et al, "The Use of Cavitating Jets to Oxidize Organic Compounds in Water", Proceedings of FEDSM '98, 1998 ASME Fluids Engineering Division Summer Meeting, Jun. 21–25, 1998, pp. 1–8, Washington, D.C.

Primary Examiner—Fred Prince
(74) Attorney, Agent, or Firm—Frishauf, Holtz, Goodman & Chick, P.C.

(57) ABSTRACT

A wastewater treatment process that provides improved reduction of total solids through endogenous respiration while reducing biochemical oxygen demand and utilizing biological nutrient reduction. The wastewater treatment process uses an efficient aeration delivery system to drastically reduce the time needed to oxidize organic matter, and re-circulates, shreds and homogenizes the organic matter and microorganisms and oxygenates the entire mass many more times than traditional systems resulting in a greater biological solids digestion rate.

3 Claims, 25 Drawing Sheets

U.S. PATENT DOCUMENTS

| | | | |
|---|---|---|---|
| 3,964,998 A | * | 6/1976 | Barnard ...................... 210/605 |
| 4,048,070 A | | 9/1977 | Propp |
| 4,076,617 A | | 2/1978 | Bybel et al. |
| 4,154,685 A | | 5/1979 | Marcotte |
| 4,166,790 A | | 9/1979 | Zlokarnik et al. |
| 4,244,815 A | | 1/1981 | Chaikin et al. |
| 4,262,757 A | | 4/1981 | Johnson, Jr. et al. |
| 4,315,821 A | | 2/1982 | Climenhage |
| 4,389,071 A | | 6/1983 | Johnson, Jr. et al. |
| 4,474,251 A | | 10/1984 | Johnson, Jr. |
| 4,508,577 A | | 4/1985 | Conn et al. |
| 4,522,722 A | * | 6/1985 | Nicholas ...................... 210/605 |
| 4,610,321 A | | 9/1986 | Whaling |
| RE32,429 E | * | 6/1987 | Spector ...................... 210/605 |
| 4,681,264 A | | 7/1987 | Johnson |
| 4,693,827 A | * | 9/1987 | Mordorski ................... 210/605 |
| 4,906,387 A | | 3/1990 | Pisani |
| 4,966,705 A | | 10/1990 | Jamieson et al. |
| 4,990,260 A | | 2/1991 | Pisani |
| 5,086,974 A | | 2/1992 | Henshaw |
| 5,154,347 A | | 10/1992 | Vijay |
| 5,186,837 A | | 2/1993 | Nikolic et al. |
| 5,198,122 A | | 3/1993 | Koszalka et al. |
| 5,205,935 A | | 4/1993 | Ruocco |
| 5,213,681 A | * | 5/1993 | Kos ........................... 210/605 |
| 5,288,405 A | * | 2/1994 | Lamb, III .................... 210/605 |
| 5,326,468 A | | 7/1994 | Cox |
| 5,393,417 A | | 2/1995 | Cox |
| 5,431,346 A | | 7/1995 | Sinaisky |
| 5,494,585 A | | 2/1996 | Cox |
| 5,650,069 A | * | 7/1997 | Hong et al. .................. 210/605 |
| 5,893,641 A | | 4/1999 | Garcia |
| 6,200,486 B1 | | 3/2001 | Chahine et al. |
| 6,210,578 B1 | * | 4/2001 | Sagastume et al. ......... 210/605 |
| 6,406,629 B1 | * | 6/2002 | Husain et al. .............. 210/605 |

* cited by examiner

|  | PRESENT INVENTION | COMPLETE MIX | PLUG FLOW | CONTACT STABILIZATION | STEP FEED | EXTENDED AERATION |
|---|---|---|---|---|---|---|
| AERATION TIME (hrs) | 4-8 | 3-5 | 4-8 | .5-1.0 | 3-5 | 18-36 |
| MCRT (days) | 30->150 | 15-30 | 15-30 | 5-15 | 5-15 | 15-30 |
| F/M RATIO (lbs BOD/day/lb MLVSS) | 0.05-0.80 | 0.05-0.20 | 0.05-0.20 | 0.20-0.40 | 0.20-0.4 | 0.05-0.2 |
| MLSS | 2,000-10,000 | 3,000-6,000 | 1,500-3,000 | 1,000-3,000 | 2,000-3,500 | 3,000-6,000 |
| RAS RECIRCULATION % RAS/(Q) | 25-100 | 25-100 | 25-50 | 25-100 | 25-75 | 75-150 |
| PROCESSING RECIRCULATION % | 500-2000 | N/A | N/A | N/A | N/A | N/A |

WASTEWATER TREATMENT SYSTEMS COMPARATIVE

FIG.3

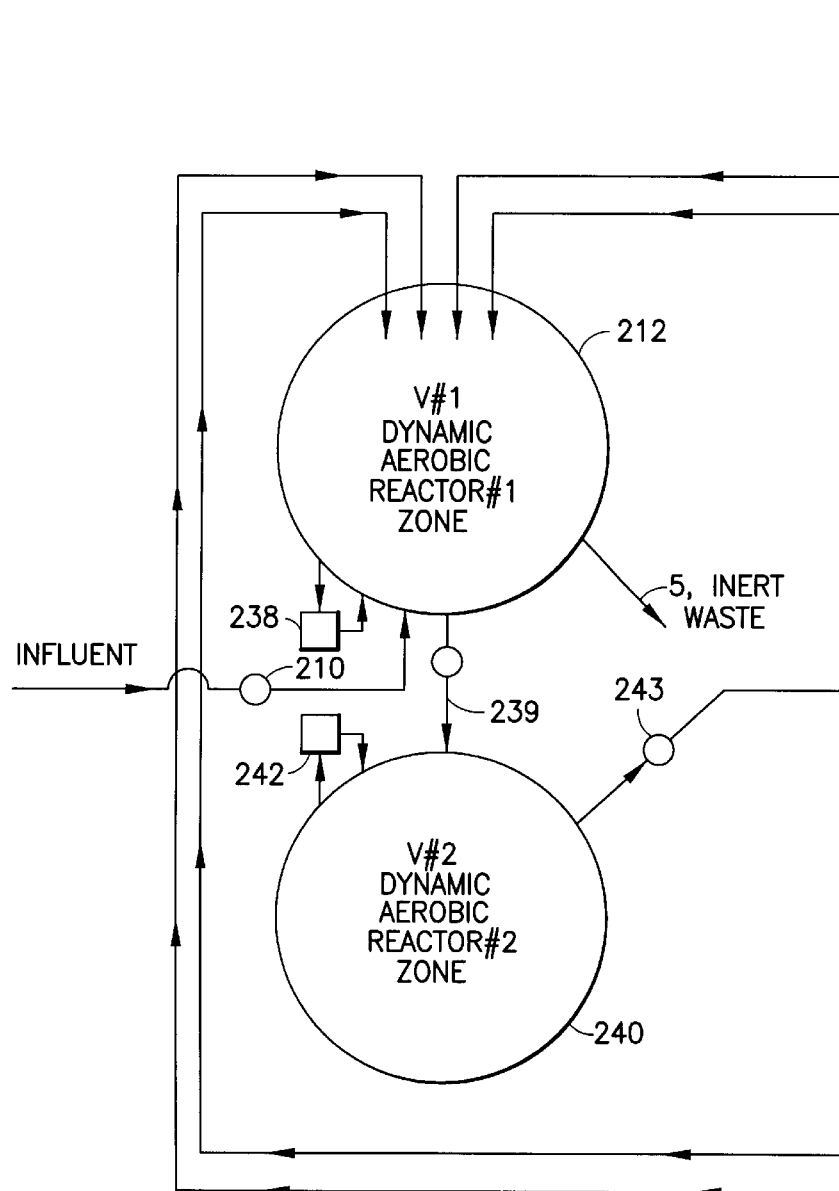
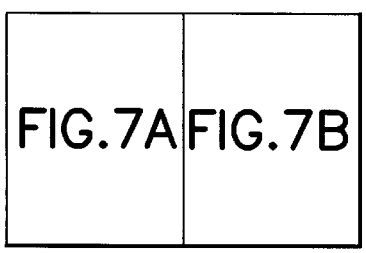
FIG.7A

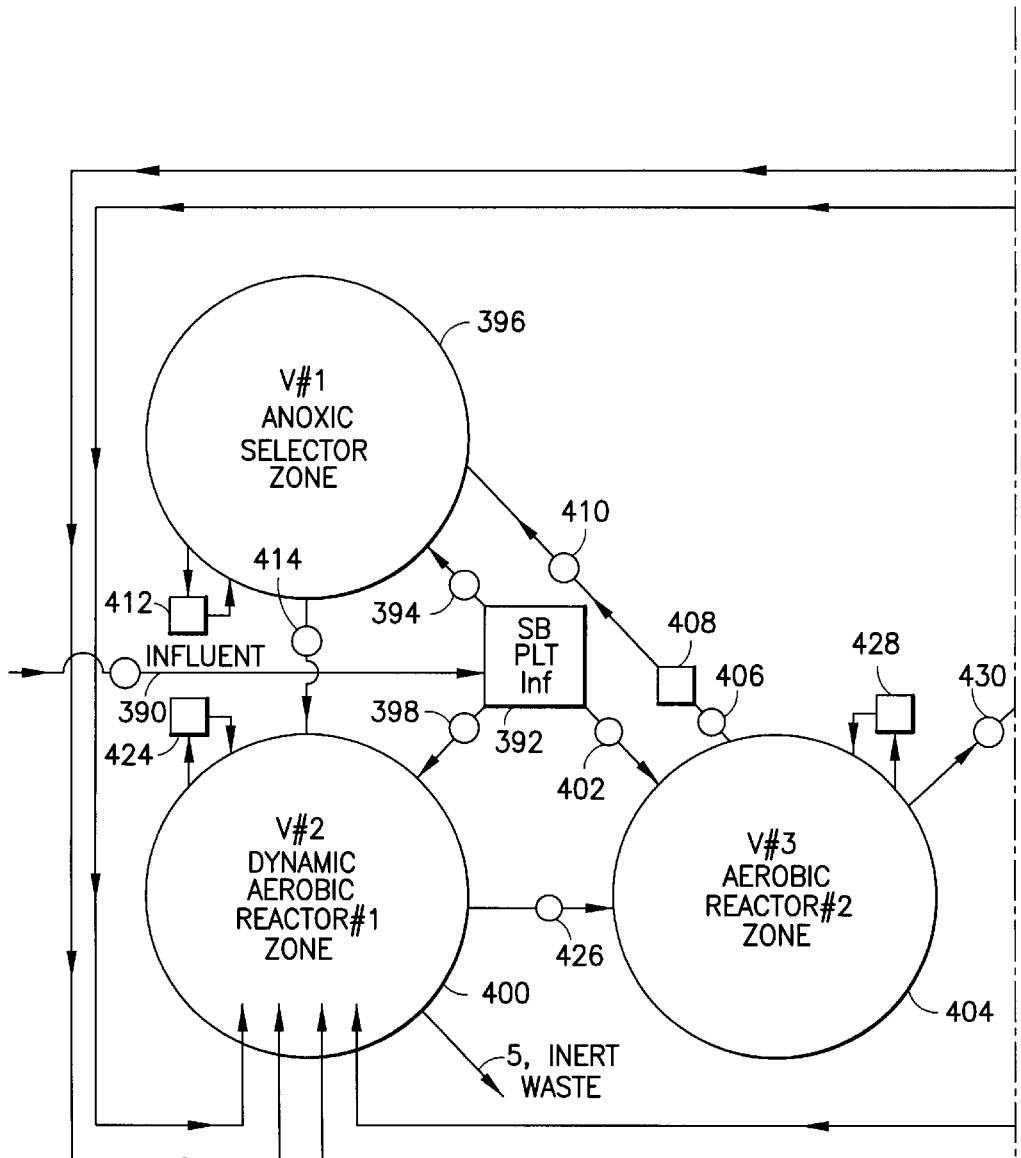
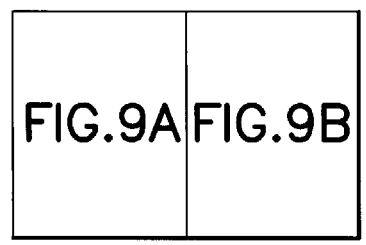
FIG.9A

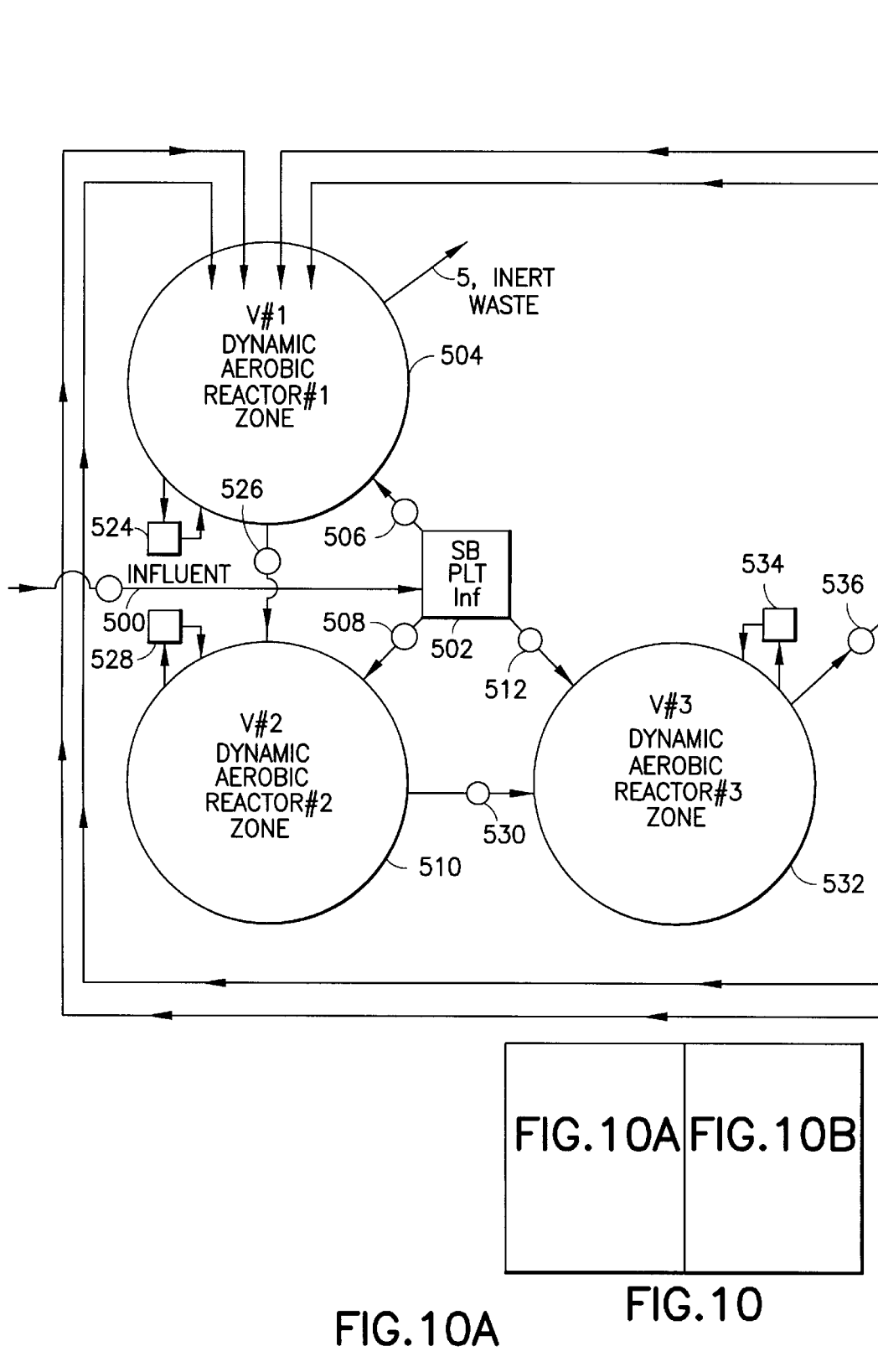

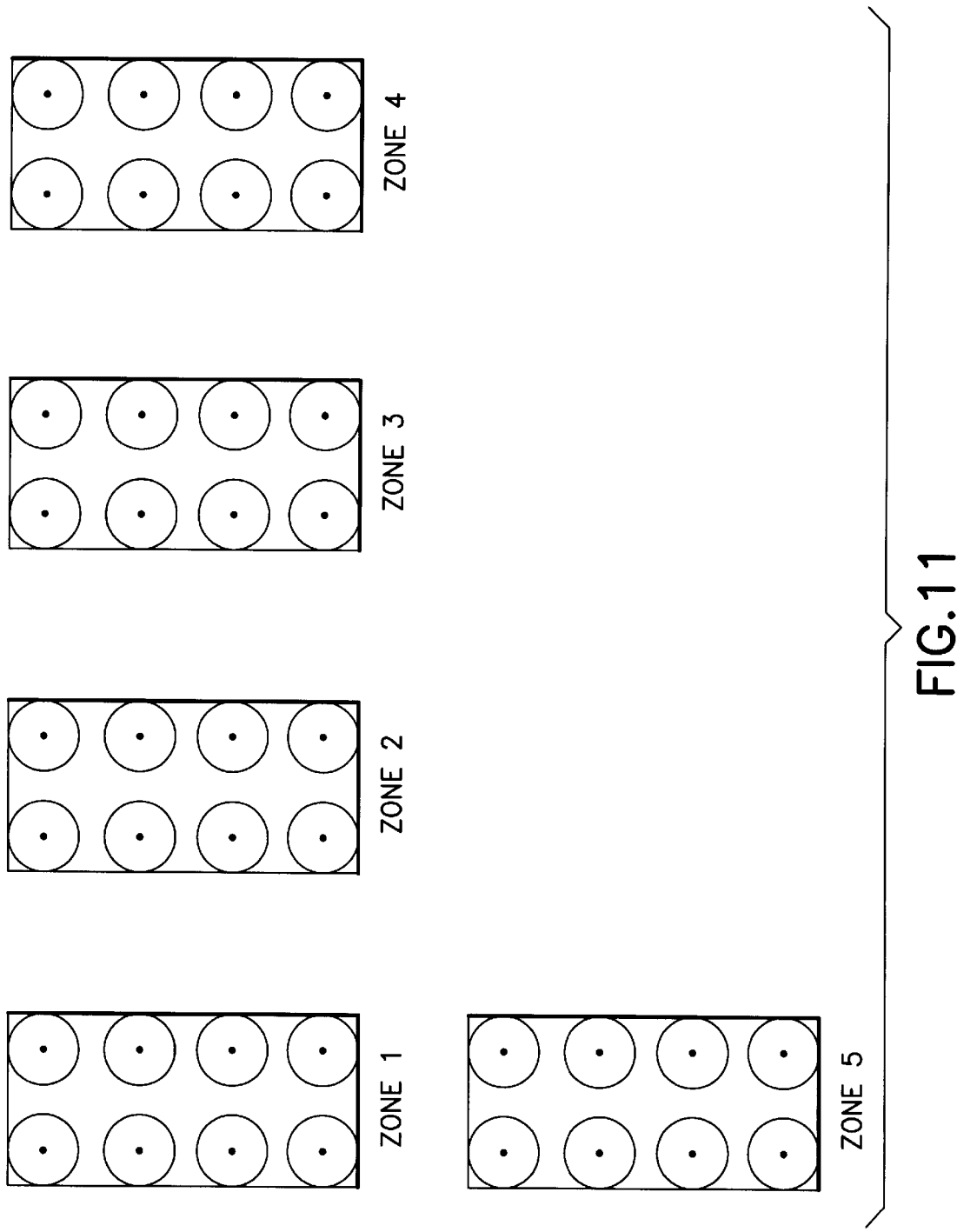

TYPICAL COMPOSITION OF SOLIDS IN RAW INFLUENT OF MUNICIPAL WASTEWATER

WASTEWATER NITROGEN CYCLE

RE-CIRCULATION AERATION SYSTEM (RCAS)
(WITH OPTIONAL AERATOR BY-PASS)

DECAY COEFFICIENT

MCRT IS MEAN CELL RESIDENCE TIME
Y IS THE YIELD COEFFICIENT
F/M IS THE FOOD TO MICROORGANISM RATIO
BOD REM EFFCY IS THE BOD REMOVAL EFFICIENCY
$K_d$ IS THE DECAY COEFFICIENT

SOLVING FOR $K_d$ $$K_d = (Y)(F/M)(BOD\ REM\ EFFCY) - \frac{1}{MCRT}$$

WHERE:
Y = 0.55 lbs OF VSS PRODUCED PER lb BOD REMOVED $$F/M = \frac{lbs\ OF\ BOD\ APPLIED\ PER\ DAY}{lbs\ OF\ VSS\ IN\ INVENTORY}$$

BOD REM EFFCY = % BOD REMOVED IN THE PROCESS AS A DECIMAL $$MCRT = \frac{lbs\ MLVSS\ IN\ AERATION\ SYSTEM}{lbs\ MLVSS\ LEAVING\ AERATION\ SYSTEM}$$

FIG. 17

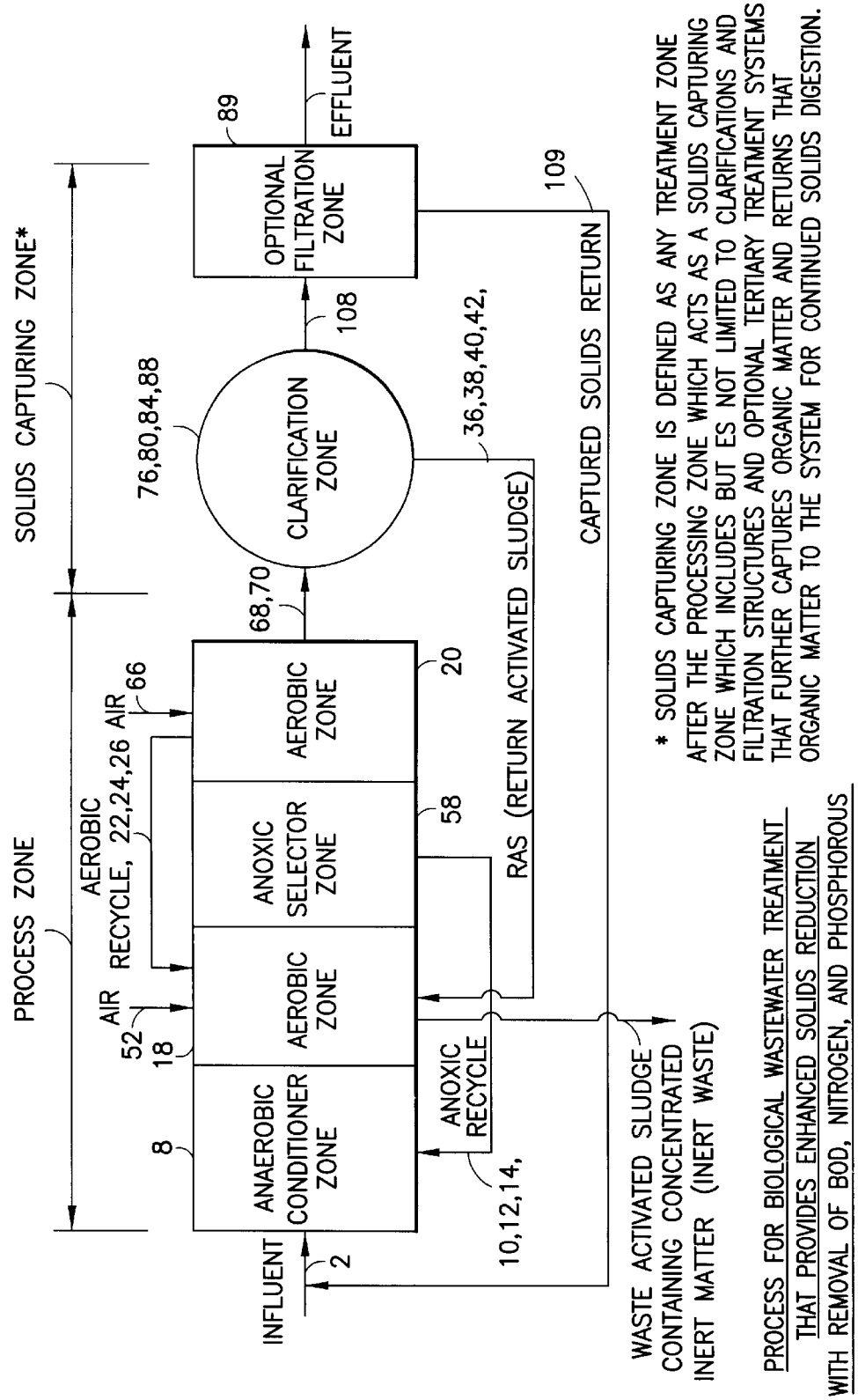

APPARATUS AND METHOD FOR WASTEWATER TREATMENT WITH ENHANCED SOLIDS REDUCTION (ESR)

CROSS-REFERENCE TO RELATED APPLICATIONS

The present application claims priority under 35 USC 119(e) of U.S. Provisional Application Ser. No. 60/238,878, filed Oct. 6, 2000, and U.S. Provisional Application Ser. No. 60/291,763, filed May 17, 2001, the entire disclosure of each of which is incorporated herein by reference.

BACKGROUND OF THE INVENTION

1. Field of the Invention

The present invention relates to an aqueous waste treatment method and apparatus that provides improved treatment of aqueous waste and, more particularly, to a method and apparatus which employs improved functionality, ease of operation and aeration techniques to provide improvement in the treatment of aqueous waste.

2. Background Information

Currently, the processes used in wastewater treatment plants follow traditional methods that expend energy, materials and labor at a relatively high rate along with a large use of land. The high costs associated with traditional methods of wastewater treatment are due to the treatment, handling, and monitoring of all of the wastewater flow's components with equipment such as pumps, blowers, air compressors, scrapers, filters, chemicals, heat, presses, coagulants, flocculants, precipitants and dewatering, among others. In traditional wastewater treatment systems, the wastewater is treated using high energy consuming methods. These methods include, but are not limited to, aerobic digestion, anaerobic digestion, sludge thickening and solids dewatering processes. The costs associated with these treatments amount to approximately 85% of the plant operating energy budget.

In a typical influent wastewater stream which is subject to wastewater treatment, 99.9% of the entire wastewater stream is water and about 0.1% is organic, inorganic and dissolved solids. The typical influent wastewater stream also contains nutrients in varying concentrations. Nutrients within the wastewater stream which need removal have an oxygen demand which must be met for decomposition. In the industry, this oxygen demand is referred to as biochemical oxygen demand (BOD). Of the approximately 0.1% solids, about 10% to 20% are settleable solids containing about 35% of the BOD. The remaining 65% of the BOD is contained within the dissolved organic matter portion of municipal waste. See FIG. 13.

In the solids (sludge) handling systems of traditional wastewater treatment systems, processing energy is expended for organic matter to be reduced by digestion to a level of about 50% reduction in volume while the remaining 50% volume of organic matter is disposed of by a number of means including, but not limited to, land fill disposal, incineration and land application. This results in the expenditure of additional energy and expense for the handling of solids. It would be beneficial to have a system and method which eliminates most of the need for disposal of organic matter.

OBJECTS AND SUMMARY OF THE INVENTION

It is an object of the present invention to provide an apparatus and method for treating aqueous waste containing organic matter and chemicals.

It is another object of the present invention to use an activated sludge process with recirculation of a treatment zone and greater aerator effectiveness to decrease the time and energy necessary for decomposition of organic matter.

It is yet another object of the present invention to substantially reduce the wasting of organic matter in the form of waste activated sludge (WAS) which is the intentional removal of organic settled solids from the system and thus reduce the effort and cost of solids handling facilities.

It is another object of the present invention to provide an apparatus and method for treating aqueous wastewater which contains high concentrations of industrial type nutrients.

It is yet a further object of the present invention to treat municipal waste which has typical concentrations of chemical oxygen demand (COD), BOD, ammonia and phosphorous.

It is yet a further object of the present invention to treat industrial strength waste which has high concentration levels of COD, BOD, ammonia and phosphorous typically found in animal type wastes.

It is still another object of the present invention to provide an apparatus and method for pre-treating wastewater from on-site facilities such as might occur from industrial manufacturers or animal wastes facilities.

It is another object of the present invention to utilize an efficient re-circulating aeration system (RCAS), which provides a combination of aeration, mixing, homogenizing and shredding that is superior to and which is more affordable than conventional aeration systems.

It is still another object of the present invention to provide an apparatus and method which is easier to design, operate, construct, initialize, manage, expand and maintain than conventional treatment systems.

It is still another object of the present invention to provide an apparatus and method which is easier to adapt to changes in processing and flow conditions, and which is easier to automate, monitor and control than conventional treatment systems.

It is still another object of the present invention to provide an apparatus and method which when compared with similar wastewater treatment requirements, uses an overall smaller footprint (land area) than that which is found with conventional wastewater treatment plants.

It is still another object of the present invention to provide an apparatus and method which is more economical to operate than conventional wastewater treatment systems.

It is still another object of the present invention to provide an apparatus and method which is less expensive to build and operate than conventional wastewater treatment systems.

It is still another object of the present invention to provide an apparatus and method which increases the ability of the process vessels to treat larger quantities of wastewater in aeration basins by not being limited by vessel floor surface area for placement of diffusers with regard to the ability to deliver intense aeration.

It is still another object of the present invention to provide an apparatus and method which provides a significantly increased decay coefficient ($k_d$)

It is still another object of the present invention to provide an apparatus and method which increases the mean cell residence time (MCRT) beyond that of conventional treatment systems, thereby providing for increased volatile solids destruction and subsequent reduced solids handling efforts.

It is still another object of the present invention to provide an apparatus and method which allows for a highly flexible food to microorganism (F/M) ratio range above and below the ratio ranges of conventional treatment systems.

It is still another object of the present invention to provide an apparatus and method which reduces start-up costs, which include, but are not limited to, more rapidly increasing the mixed liquid suspended solids (MLSS) concentration, lower power costs for initial start-up and reduced costs for hauling of seed sludge, thereby achieving design flow capacity with increased efficiency.

It is still another object of the present invention to provide an apparatus and method which uses cone bottom shaped vessels for a type of sequential batch reaction system during start-up conditions for faster initial plant start-up.

It is still another object of the present invention to provide an apparatus and method which uses cone bottom shaped vessels for a type of sequential batch reaction that allows micro colonies to grow rapidly following conditions that have upset a process, so as to quickly grow microorganisms which recover from the upset conditions.

It is still another object of the present invention is to provide a treatment plant that contains less apparatus and processes to treat the wastewater to the desired effluent quality than conventional wastewater treatment systems.

It is still another object of the present invention to provide a device that separates solids from liquid through clarification without the need for scraping, raking or brushing devices in clarifiers.

It is still another object of the present invention to provide a device which acts as a solids capturing zone which includes, but is not limited to clarifiers, filtration structures and optional tertiary treatment systems that further capture organic matter, and that return the organic matter to aerobic zones for continued solids digestion.

It is still another object of the present invention to provide a device which decreases total nitrogen in a waste stream through oxidation of organic nitrogen into the more stable compound of nitrate, which is then reduced in the waste stream by the denitrification process.

It is still another object of the present invention to provide a device which reduces phosphorous in a waste stream through microorganism digestion and use for the growing of new cells in the decomposition of organic matter.

It is still another object of the present invention to provide a treatment process that is zone specific and not vessel specific.

It is still another object of the present invention to provide a system design that accommodates a specific flow and specific treatment process.

It is still another object of the present invention to use the toroidal vortex action of the RCAS system for the reduction of the number of pathogenic organisms within wastewater.

It is still another object of the present invention to provide an apparatus and method which allows for chemical oxidation of an aqueous solution.

It is still another object of the present invention to provide a means for the homogenization of a microorganism colony and the substrate that the colony feeds on.

It is still another object of the present invention to provide for the disbursements of a large microorganism floc into a smaller microorganism floc.

It is still another object of the present invention to cause the entire microorganism floc including the center to remain aerobic.

It is still another object of the present invention to provide a high concentration of dissolved oxygen in an aerobic process.

It is still another object of the present invention to provide an alternative to the cost and need for wastewater lagoons.

It is yet a further object of the present invention to overcome the deficiencies of known wastewater treatment systems and methods.

In order to represent the applications for, and capabilities of, the present invention, raw influent of municipal wastewater is exampled as the aqueous waste to be treated. However the embodiments of the apparatus and method of the present invention can be implemented to treat a variety of wastes.

The term aeration as it pertains to the present invention means the addition of a secondary fluid flow (liquid or gas) into a primary fluid flow (liquid or gas).

The present invention is able to treat organic matter of wastewater by providing intense aeration by means of an RCAS (Re-Circulating Aeration System) which gives increased oxygen transfer efficiencies that results in increased microorganism oxygen uptake rates and functionalizing, shredding and homogenizing organic matter causing virtually 100% digestion of the organic matter. This is a significantly more effective use of processing energy as compared with traditional treatment methods using traditional aeration such as diffused aeration. The present invention also reduces or eliminates many traditional energy consuming devices such as primary clarification equipment, anaerobic digestion equipment, aerobic digestion equipment, primary treatment lagoons, incineration furnaces and related equipment, sludge thickening equipment and sludge hauling equipment.

The present invention enables a more efficient and complete digestion of organic matter in the wastewater. The organic matter portions of the wastewater total BOD are treated in a first aerobic reactor zone and a second aerobic reactor zone by use of aeration, and in an anaerobic conditioner zone and anoxic selector zone where the wastewater is kept in a condition in which the aquatic environment does not contain sufficient dissolved molecular oxygen for easy microorganism respiration, which can also be called an oxygen deficient condition. This oxygen deficient condition generally refers to an environment in which chemically bound oxygen, such as nitrate, is present. Aggressive digestion of the organic matter is accomplished in the zones of the anaerobic conditioner, first aerobic reactor zone, anoxic selector and second aerobic reactor zone.

In accordance with one form of the present invention a process for the treatment of an aqueous solution containing waste includes the steps of:

providing an influent wastewater stream to an anaerobic conditioner zone within which aqueous total solids are re-circulated, mixed and kept in suspension;

providing low oxygen level mixed liquor suspended solids from an anoxic selector zone to the anaerobic conditioner zone to maintain a low dissolved oxygen level within the anaerobic conditioner zone;

providing an outflow from the anaerobic conditioner zone to a first aerobic reactor zone, the anaerobic conditioner zone outflow being mixed in the first aerobic reactor zone with return activated sludge from a clarification zone whereby contents of the first aerobic reactor zone are re-circulated and aerated, and whereby settleable solids present in the contents of the first aerobic reactor zone are fractionalized, thereby decomposing and oxidizing the solids and other organic matter and accumulating insert solids;

discharging the accumulated inert solids from the first aerobic reactor zone;

providing an outflow of aqueous solution from the first aerobic reactor zone to the anoxic selector zone wherein the aqueous solution in the anoxic selector zone is re-circulated and mixed;

transferring a first portion of the anoxic selector zone aqueous solution corresponding to the low oxygen level/mixed liquor suspended solids to the anaerobic conditioner zone, and a second portion of the anoxic selector zone aqueous solution to a second aerobic reactor zone;

recirculating and aerating aqueous solution contained in the second aerobic reactor zone whereby settleable solids become fractionalized thereby decomposing and oxidizing suspended solids and other organic matter;

providing a first portion of the second aerobic reactor zone aqueous solution to the first aerobic reactor zone;

providing a second portion of the second aerobic reactor zone aqueous solution to the clarification zone to settle or separate solids from the aqueous solution contained therein;

providing the settled or separated solids from the clarification zone, corresponding to return activated sludge, to the first aerobic reactor zone;

providing aqueous solution of the clarification zone to a filtration zone to settle or separate solids from the aqueous solution provided thereto; and transferring a liquid portion of an outflow of the filtration zone to a discharge receptacle, and the settled or separated solids portion of the outflow of the filtration zone to the influent wastewater stream for re-processing.

In accordance with another form of the present invention, a process for the biological treatment of an aqueous solution containing waste to reduce organic material, nitrogen and phosphorous, includes the steps of:

providing an influent wastewater stream, which includes microorganisms, to an anaerobic conditioner zone within which aqueous total solids are re-circulated, mixed and kept in suspension, wherein a first stage of luxury phosphorous uptake is accomplished by regulating a flow of low oxygen level mixed liquor suspended solids from an anoxic selector zone to the anaerobic conditioner zone to maintain a low dissolved oxygen level within the anaerobic conditioner zone;

providing an outflow from the anaerobic conditioner zone to a first aerobic reactor zone, the anaerobic conditioner zone outflow being mixed in the first aerobic reactor zone with return activated sludge received from a clarification zone whereby contents of the first aerobic reactor zone are re-circulated and aerated and whereby nitrification occurs and settleable solids present in the contents of the first aerobic reactor zone are fractionalized, thereby decomposing and oxidizing suspended solids and other organic matter along with enhancing a second stage of luxury phosphorous uptake and accumulating insert solids;

discharging the accumulated inert solids from the first aerobic reactor zone;

providing an outflow of aqueous solution from the first aerobic reactor zone to the anoxic selector zone wherein the aqueous solution in the anoxic selector zone is re-circulated and mixed, and causing a low oxygen environment to exist within the anoxic selector zone such that denitrification and release of biological phosphorous occurs along with the consumption of organic matter contained within the aqueous solution;

transferring a first portion of anoxic selector zone aqueous solution corresponding to low oxygen level/mixed liquor suspended solids to the anaerobic conditioner zone and a second portion of the anoxic selector zone aqueous solution to a second aerobic zone, at least the second portion of the anoxic selector zone aqueous solution being rich in microorganisms and nutrients;

re-circulating and aerating aqueous solution contained in the second aerobic reactor zone whereby nitrification occurs and settleable solids become fractionalized and shredded thereby decomposing and oxidizing suspended solids and other organic matter, and further enhancing the second stage of luxury phosphorous uptake resulting in a consumption of a large amount of phosphorous by the microorganisms;

providing a first portion of the second aerobic reactor zone aqueous solution to the first aerobic reactor zone;

providing a second portion of the second aerobic reactor zone aqueous solution to the clarification zone to settle or separate solids from the aqueous solution provided thereto;

providing the settled or separated solids from the clarification zone to the first aerobic reactor zone as return activated sludge;

providing aqueous solution of the clarification zone to a filtration zone to settle or separate solids from the aqueous solution provided thereto; and transferring a liquid portion of an outflow of the filtration zone to a discharge receptacle and the settled or separated solids portion of the outflow of the filtration zone to the influent wastewater stream for re-processing.

In accordance with another form of the present invention, apparatus for the treatment of an aqueous solution containing waste includes:

an anaerobic conditioner zone fluidly coupled to an inlet, the anaerobic conditioner zone receiving an influent wastewater stream through the inlet, the anaerobic conditioner zone re-circulating the wastewater contained therein such that aqueous total solids are kept in suspension, the anaerobic conditioner zone receiving a flow of low oxygen level mixed liquor suspended solids from an anoxic selector zone to maintain a low dissolved oxygen level within the anaerobic conditioner zone;

a first aerobic reactor zone fluidly coupled to the anaerobic conditioner zone, the first aerobic reactor zone receiving an outflow of the anaerobic conditioner zone which is mixed with return activated sludge received from a clarification zone whereby contents of the first aerobic reactor zone are re-circulated and aerated and whereby settleable solids become fractionalized thereby decomposing and oxidizing suspended solids and other organic matter, the first aerobic reactor zone accumulating inert solids, the accumulated inert solids being discharged from the first aerobic reactor zone;

an anoxic selector zone fluidly coupled to the anaerobic conditioner zone and the first aerobic reactor zone, the anoxic selector zone receiving an outflow of aqueous solution from the first aerobic reactor zone, aqueous solution within the anoxic selector zone being re-circulated and mixed, a first portion of the anoxic selector zone aqueous solution, corresponding to the low oxygen level/mixed liquor suspended solids, being provided to the anaerobic conditioner zone;

a second aerobic reactor zone fluidly coupled to the anoxic selector zone and the first aerobic reactor zone, the second aerobic reactor zone receiving a second portion of the anoxic selector zone aqueous solution wherein the aqueous solution within the second aerobic zone is re-circulated and aerated whereby settleable solids become fractionalized, a first portion of the aqueous solution of the second aerobic reactor zone being provided to the first aerobic reactor zone;

a clarification zone fluidly coupled to the second aerobic zone and the first aerobic zone, the clarification zone receiving a second portion of the second aerobic reactor zone aqueous solution, whereby settling or separating and capturing of solids from the aqueous solution occurs, and the settled solids, corresponding to return activated sludge, are provided to the first aerobic reactor zone; and a filtration zone fluidly coupled to the clarification zone, the inlet, and an outlet, the filtration zone receiving an outflow from the clarification zone to separate solids from the liquid portion of the contents of the clarification zone, a first portion of the contents of the filtration zone, which corresponds to effluent, being provided to the outlet, and a second portion of the contents of the filtration zone, which corresponds to separated solids, being provided to the inlet and being combined with the influent wastewater stream for re-processing.

These and other objects, features and advantages of the present invention will become apparent from the following detailed description of preferred embodiments which is to be read in connection with the accompanying drawings.

BRIEF DESCRIPTION OF THE DRAWINGS

FIG. 3 is a chart showing comparative data for a variety of wastewater treatment systems;

FIG. 11 is a schematic illustration of a wastewater treatment system made up of a number of treatment zones, each of which includes a number of vessels;

FIG. 17 illustrates how the Decay Co-efficient $k_d$ is calculated in relation to the MCRT and F/M Ratio; and FIG. 18 is a simplified representation of the process shown in FIG. 5 with a filtration zone coupled to the clarifiers for returning captured solids for reprocessing.

DETAILED DESCRIPTION OF THE PREFERRED EMBODIMENTS

Figure 1:
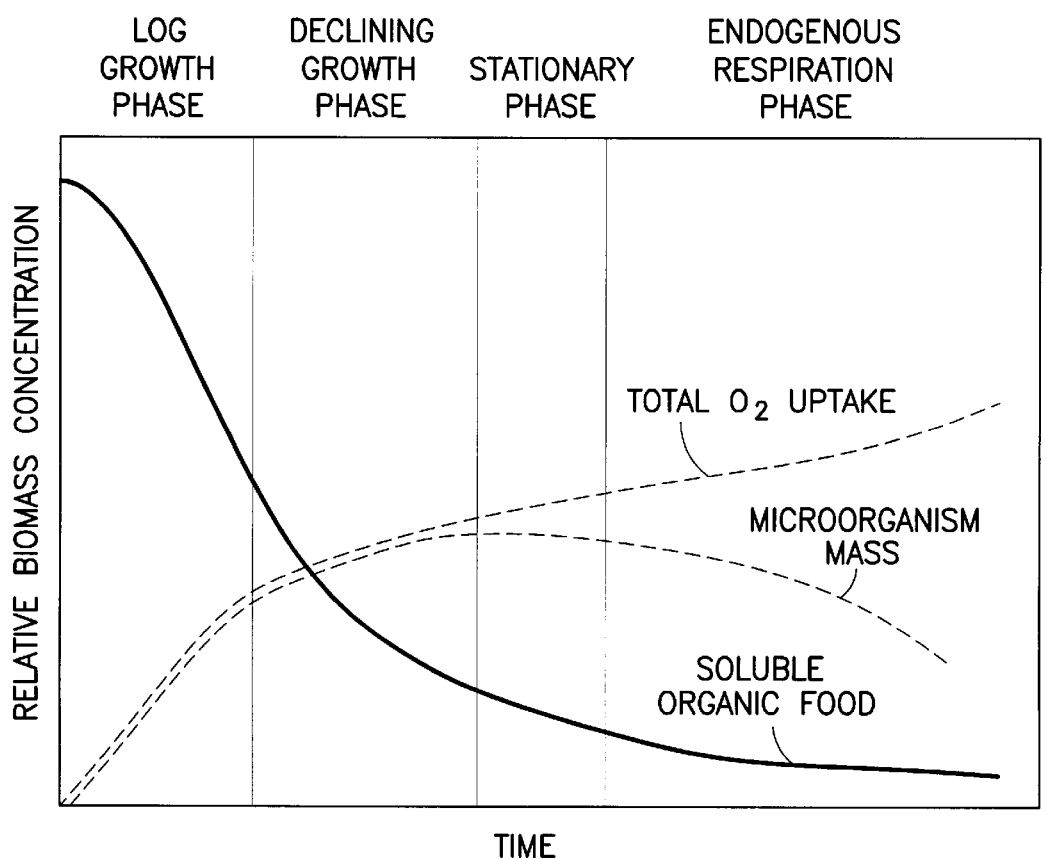
FIG. 1 is a graph showing the relative concentrations of biomass, soluble organic food and total oxygen uptake vs. time of various wastewater treatment processes.

Treatment of chemical and biological aqueous waste can be performed through utilization and implementation of the method and apparatus of the present invention. The present invention cleans aqueous wastes in an aqueous solution by means of various strictly aerobic treatment methods and combinations of treatment methods such as aerobic biological decomposition, biological oxidation, chemical oxidation and physical separation of solids. The present invention is efficient in its use of aerobic treatment methods in that there is a reduction in the reliance on chemicals for nutrient removal. These methods exist in various stages of stabilization within the treatment process.

The approximate levels of performance (influent vs. effluent) within the treatment process of the present invention are as follows:

Reduction of 90% to 99.5% influent total BOD (biochemical oxygen demand) concentrations through oxidation and subsequent gravity settling.

Reduction of organic nitrogen through oxidation into first ammonia, second nitrite and third nitrate.

Reductions of 95% to 99.5% influent ammonia nitrogen concentrations through nitrification.

Reductions through de-nitrification of 50% to 99.5% nitrite and nitrate nitrogen concentrations that have resulted through the nitrification process referenced above.

Reduction of 90% to 99.5% influent total phosphorous concentrations through luxury "P" uptake.

Destruction of up to 99.5% total organic suspended solids concentrations through intense oxidation.

The following description explains the processes of the present invention that achieve these levels of performance as the aqueous solutions proceed from process zone to process zone for treatment. The design of the present invention prefers a total hydraulic detention time for nutrient oxidation within the processing zones of about 4 to 8 hours.

Process Performance

Treatment of chemical and organic matter that occurs as an aqueous waste is stabilized through either oxidation or biological means. Stabilization is actually a group of processes. For example, in the treatment of municipal wastewater, the stabilization of ammonia as it is converted into nitrogen gas is a several step process. Ammonia ($NH_3$) is biologically oxidized into nitrite ($NO_2$) and then it is ;o organically stabilized into nitrate ($NO_3$). The next and final stage is known as de-nitrification. Once this stage is attained, the presence of oxygen is reduced to very low levels and the elemental bound oxygen in the form of $NO_3$ is utilized for respiration while the nitrogen gas, $N_2$, is released into the atmosphere.

Another form of treatment is oxidation of chemical compounds which is accomplished by aeration. The reaction occurring from oxidation causes a chemical element or compound to lose electrons. This loss of electrons makes the element or compound more stable.

Biological treatment is one of the most important steps in processing municipal wastewater, and a brief explanation of that treatment is helpful in understanding the present invention and its apparatus and processes. During biological treatment, microorganisms eat, convert or consume nutrients (BOD) in the wastewater. These nutrients can be biodegradable organics or chemical in nature. With traditional systems, physical treatment of raw wastewater by sedimentation and wasting removes only about 35% of the BOD, due to the high percentage (about 65% of the BOD) of BOD contained in the non-settleable and dissolved solids contained in wastes. The present invention uses aerobic digestion treatment through a suspended growth treatment method to treat the total BOD within the aqueous solution to levels at or above 95% removal.

There are two types of solids in liquid wastes, 1) organic, and 2) inorganic. Inorganic solids do not break down or decompose by biological treatment. Therefore, as the inorganic or inert solids begin to accumulate in the processing system, the removal or wasting of inert solids should occur. This wasting is set on a predetermined concentration ratio of inert to organic solids. With the percentage of inorganic or inert solids content in most municipal type wastewater being small compared to the entire solids load entering the system, the time frame for inert wasting could range substantially between 90 days and 360 days or more. Organic solids content of the typical municipal waste stream makes up approximately 70% to 85% of the solids in the wastewater. Around 80% to 85% of these solids are typically dissolved solids and are not settleable, but 15% to 20% of these solids are settleable. However, these settleable solids are shredded during the recirculation process of each of the aerobic processing zones used in the present invention which allows for easier consumption by the microorganisms.

This shredding enhances the aerobic digestion treatment process of the current invention by allowing the microorganism colony and settleable solids to become homogenized. This homogenization of settleable solids causes all of the food substrate to become almost a dissolved solid allowing for easier consumption by the microorganism colony.

As the floc of the microorganism colony passes through the RCAS system of the present invention, the large floc portions are disbursed into smaller floc particles. The reduction in floc size aids the consumption of substrate by the microorganism colony by increasing the surface area of the floc and causing more intimate contact with needed food and oxygen.

Digestion of a substrate and microorganism colony occurs with increased speed when a microorganism colony remains aerobic throughout its contents. The RCAS system increases the digestion of a substrate by keeping microorganism colonies in disbursed small floc particles so as to maintain an aerobic condition in the center of the floc particles. As the floc particles become smaller, the concentration of dissolved oxygen within the aerobic zone is easily accessible to the center of the floc particles. This also allows for a high concentration of dissolved oxygen to be maintained within an aerobic zone.

The processing and aerobic digestion treatment system of the present invention are provided by living systems that rely on mixed biological culture to break down the organic wastes. The present invention's aerobic digestion treatment system grows and maintains in suspension a high population of non-photosynthetic microorganisms, i.e., a biomass, which consumes the organic waste. Under aerobic digestion conditions, the reduced organic compounds are oxidized to end products of carbon dioxide and water.

The growth and survival of non-photosynthetic microorganisms depends on the microorganisms ability to obtain energy by metabolizing the organic matter. A traditional aerobic treatment process results in complete metabolism and synthesis of organic matter, producing biological growth in large quantities which must be removed from the system to keep the process from becoming biologically overloaded compromising the quality of the effluent. The present invention makes use of a complete aerobic digestion treatment of the biomass with which the microorganism environment is kept to the far right of the "endogenous respiration phase" of FIG. 2 by controlling and balancing the F/M (food-to-microorganism) ratio (in a range of 0.05 to 0.80) and the oxygen delivery. This results in not only the complete metabolism and synthesis of the organic matter but also in the significant reduction of biological solids at the end of the process.

Another feature of the present invention is the use of the nitrification cycle for the conversion of large amounts of organic nitrogen into ammonia, ammonia into nitrite and nitrite into nitrate. The nitrate is then de-nitrified releasing nitrogen into the atmosphere, resulting in a reduction of total nitrogen within the waste stream.

Still another feature of the present invention is the consumption of phosphorous entering the system by microorganisms as a food source for cell wall development and new cell growth during high oxygen concentration times such as that which occurs in the aerobic reactor zones.

Referring now to FIG. 1, the characteristic growth pattern for microorganisms is shown where the relative biomass concentration (on the vertical axis) is charted as a function of time (on the horizontal axis). After a short time period for adaptation to the new environment, the microorganisms consume the organic matter and reproduce by binary fission, exponentially increasing the number of viable cells and biomass in the culture medium. This is the "log growth phase" shown in the left most portion of the chart in FIG. 1. The rate of metabolism in the "log growth phase" is limited by both the ability of the microorganisms to process the organic matter, and the amount of dissolved oxygen available to the microorganisms for respiration.

The "declining growth phase" shown in FIG. 1 is caused by an increasing shortage of the organic matter necessary for growth of the microorganisms. In the "declining growth phase", the rate of reproduction of the microorganisms decreases. The growth of microorganisms in the "declining growth phase" is a function of both the concentration of the microorganisms and concentration of the growth-limiting organic matter.

The "declining growth phase" is followed by a "stationary phase". In the "stationary phase", the biomass concentration reaches a maximum value, and the low concentration of remaining organic matter substantially limits the biomass growth rate which becomes relatively constant.

The "endogenous respiration phase" follows the "stationary phase". In the "endogenous respiration phase", viable microorganisms compete for the small amount of organic matter which is still in the wastewater that is undergoing treatment. Eventually, starvation of the microorganisms occurs, such that the rate of death exceeds the rate of reproduction. Thus, the concentration of biomass in the aqueous solution declines during the "endogenous respiration phase". In the current invention the endogenous respiration (ER) is controlled such that the rate of death of the microorganisms is equal to the rate of growth of the microorganisms as verified by a mixed liquid suspended solids (MLSS) concentration that is kept at a constant concentration relative to the processing criteria.

Wastewater treatment according to the present invention will now be described in detail. In the present invention, wastewater treatment processing takes place in three stages:

(1) Mass biological aerobic digestion to consume the organic waste, including but not limited to total organic nitrogen and total phosphorous reductions;
(2) Solids capturing zone clarification/sedimentation; and
(3) Re-treatment of solids capturing zones settled solids by returning solids back to the aerobic reactor process.

In the processing method of the present invention, consumption of organic waste is accomplished by maintaining an environment consisting of high mean cell residence time (MCRT), a moderate food to microorganism (F/M) ratio and intense aeration, wherein the microorganisms are forced to live in the endogenous respiration phase.

The clarification/sedimentation stage of the process is used to separate solids from the supernatant (the remaining liquid) through gravity settling. Once the aqueous solution containing suspended solids enter the clarification zone (vessels 76, 80, 84 and 88 corresponding (Clarifier #'s 1, 2, 3 and 4 of FIG. 4) from the aerobic reactor zone #2 (vessel 20 of FIG. 4), the specifics of which are explained in detail below, the velocity of the supernatant is slowed to allow the solids to settle by gravity. As the settled solids slightly concentrate at the bottom of the clarification vessels, they are frequently and quickly removed and sent back to vessel aerobic reactor #1 zone (vessel 18) for further treatment. The supernatant (clearer aqueous solution) continues through the process where it may be further treated with optional tertiary treatments such as tertiary clarification or filtration for the nearly complete removal of biological and inert matter before being discharged. A receiving stream, evaporation ponds, landscape irrigation, crop irrigation or to some other type of disposal may be the recipient of such a discharge.

Aerobic digestion treatment systems such as that of the present invention must grow and maintain in suspension a population of microorganisms in order to consume the organic waste. Although, as illustrated in FIG. 1, individual microorganisms grow rapidly, it takes time at startup or where major load changes are occurring to increase the original low concentration of microorganisms to levels high enough to rapidly degrade the organic waste. It therefore becomes important to use methods for increasing the concentration of MLSS in a rapid fashion. Plant startup time, in regard to traditional systems, range as long as 30 to 45 days for MLSS concentrations to reach acceptable operational levels. Using the present invention, plant start-up time can be reduced to as little as 14 days or less with the present invention. The time required for plant re-starts due to a toxic shock load to the microorganisms are reduced as compared with traditional plant time requirements. These methods are discussed below.

A common design concept for aerobic digestion systems is mean cell residence time (MCRT), which is the average time the microorganisms spend in the system. The MCRT of traditional treatment systems relates to the quantity of microbial solids in an activated sludge process, relative to the quantity of solids lost in the effluent and the excess solids withdrawn from the processing cycle in the waste sludge. With the present invention the MCRT relates to the quantity of microbial solids in the aerobic treatment process, relative to the quantity of solids lost in the effluent only, which is un-intentional wasting, as there are virtually no volatile solids withdrawn as waste activated sludge. Typical MCRT values for traditional systems are from 15 to 30 days. However, MCRT values for the present invention begin at 30 days and reach numbers of 150 to 250 days or greater (see FIG. 3). MCRT values for conventional aerobic treatment systems of greater than 30 days may produce operational problems. The excessive build up of solids in the system caused by inadequate wasting of solids is a common cause of a poor effluent quality due to the retention of higher concentrations of suspended solids, turbidity, etc. Other reasons for poor effluent quality include extremely old slow settling solids, over-oxidation of the solids and de-flocculation of the solids. Consequently, for traditional aerobic treatment systems it is desirable to intentionally waste excessive solids from time to time to keep the MCRT within the ranges shown in FIG. 3. As in the present invention, the removal of excessive solids is not necessary due to its ability to nearly complete the digestion of all organic solids.

Quantities of solids are expressed as concentrations of MLSS (mixed liquid suspended solids) with values for a conventional system shown in FIG. 3. These typical MLSS values for conventional systems range from 1,000 mg/L at the low end of the range for contact stabilization systems to 6,000 mg/L for complete mix and extended aeration systems. The quantity of microbial solids (MLSS) in the anaerobic conditioner zone, anoxic selector zone and aerobic reactor zones of the present invention (see, e.g. FIG. 4 explained in detail below) range from 2,000–8,000 mg/L or more. The apparatus and method of the present invention is able to maintain the MLSS concentrations shown in FIG. 3 for near complete digestion of organic matter of a typical municipal type waste, to the elevated MLSS concentration shown in FIG. 3 for near complete digestion of organic matter of non-typical industrial type waste by using an efficient aeration delivery system device such as the one used in the present invention (re-circulating aeration system or "RCAS"). The aeration device used in the present invention is the one described in U.S. Pat. No. 5,893,641 (Garcia), the entire disclosure of which is incorporated herein by reference.

The process implemented by the present invention also achieves the results of total organic solids digestion by using the above-mentioned efficient aeration delivery system (RCAS) to deliver atmospheric air necessary for oxygen transfer, circulation, homogenization and deep mixing. An additional benefit of the implemented process that uses an aeration system of the type mentioned above is the mixing and secondary oxygenation of the MLSS residing within the aerobic reactor zones. This mixing and secondary oxygenation is accomplished by the removal of the MLSS contents from the aerobic reactor zones at their lowest point and discharging the re-oxygenated MLSS back into each respective vessel at an elevation of substantially two thirds of the way below the surface of the side water depth. The secondary oxygenation of the MLSS is accomplished by allowing the excess entrained air, injected by the RCAS, carried along with the aerated MLSS to flow via a conduit into and through the contents of the aerobic reactor zones. The primary and secondary oxygenation of the aerobic reactor zones MLSS enables the dissolved oxygen (DO) concentration to achieve levels in a range substantially between 3.0 and 5.0 mg/L. The dissolved oxygen concentration in the aerobic reactor zones is kept at an operational level that exceeds the upper range for traditional aerobic digestion systems, which is 2.0 mg/L. For this reason, inter alia, the present invention achieves a higher degree of organic solids digestion through its efficient oxygenation treatment process.

With the higher than normal dissolved oxygen concentrations and intimate mixing as achieved with the present invention, a higher rate decay co-efficient ($k_d$) of organic matter occurs than is achieved with traditional aeration systems. The word "decay" is the term used to express destruction (digestion) of volatile (organic) suspended solids in the formula relating F/M to MCRT. Traditional aeration systems have a $k_d$ value of between 0.04 to 0.06 for an average of 0.05, whereas in the present invention, $k_d$ is substantially 0.10 or twice that for traditional aeration systems, thus yielding a greater digestion rate. See FIG. 17 for the formulas used for determining the decay co-efficient.

Traditional oxygen transfer efficiency is expressed as the percentage of mass of oxygen that reaches the biological cell compared to the applied mass of gaseous oxygen supplied to the reactor. The rate of oxygen transfer from air bubbles admitted by the RCAS is a function of several factors which vary according to the wastewater characteristics, including but not limited to, the oxygen transfer coefficient of the wastewater within a conduit and the oxygen transfer coefficient within a vessel, the oxygen saturation coefficient of the wastewater, and the present dissolved oxygen concentration and saturation concentrations of oxygen within the aqueous solution.

Figure 2:
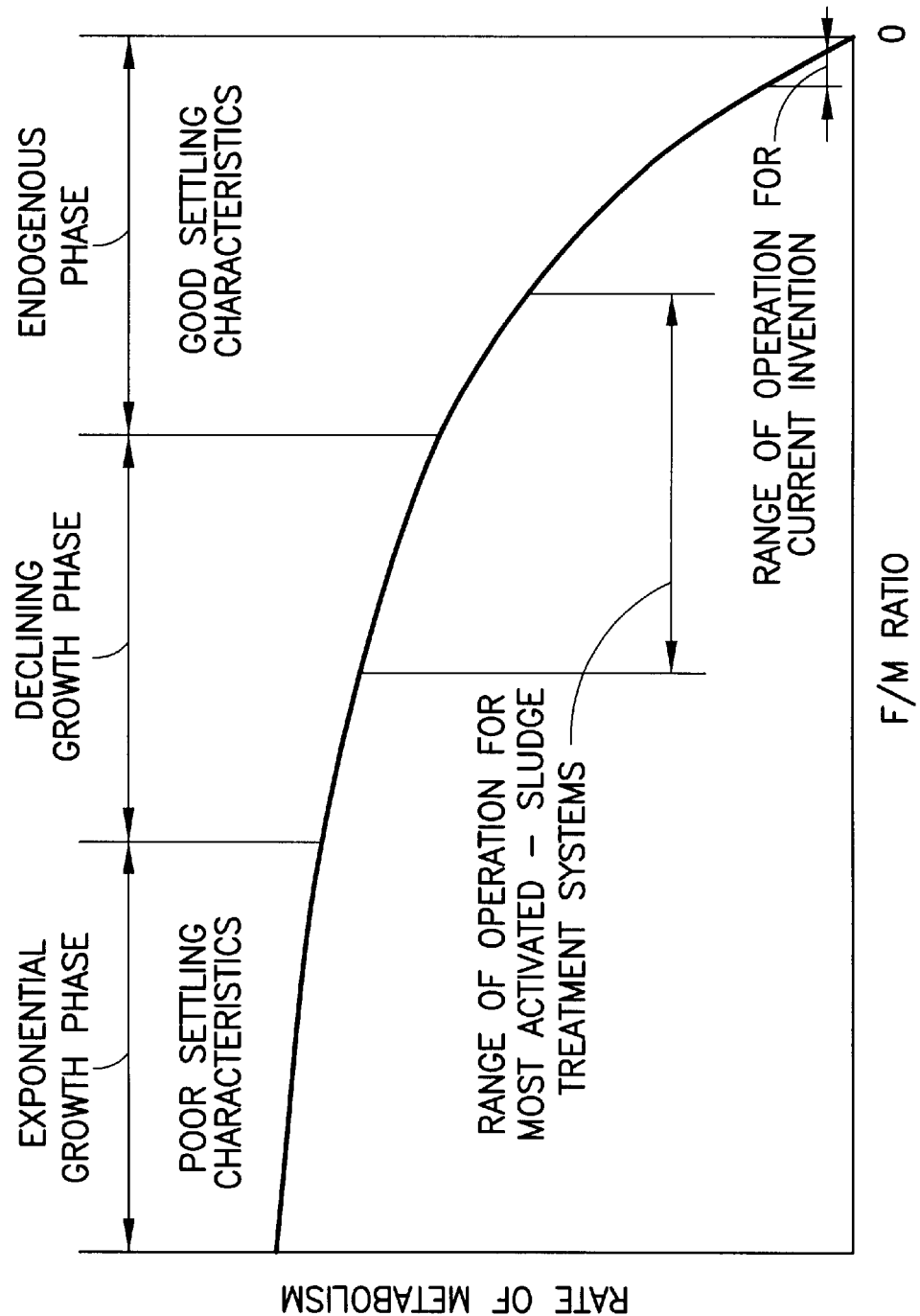
FIG. 2 is a graph showing the rate of metabolism vs. F/M (Food to Microorganism) ratio of wastewater treatment processes.

In a traditional aerobic biological treatment system the metabolism of organic matter in the wastewater results in an increased biological mass (growth) of microorganisms in the system. Excess microorganisms are removed or wasted from the system to maintain a proper balance between food supply and the mass of microorganisms that exist in the aeration basin where the oxygen is being delivered. This balance is referred to as food-to-microorganism (F/M) ratio. One familiar in the art knows that an F/M ratio of 0.05 to 0.20 that is maintained in traditional aeration basins defines the operation of extended aeration systems. FIG. 2 illustrates how an increasing F/M ratio affects the rate of metabolism. Although the "exponential growth phase" shown in FIG. 2 is desirable for maximum rate of removal of organic matter, in this phase the microorganisms are in dispersed growth and experience difficulty in settling out of solution by gravity. Moreover, there is excess unconsumed organic matter in solution, which cannot be removed by a dispersed growth microorganism colony of a traditional aeration system and thus passes out of the system in the effluent. Operation of traditional aeration treatment systems at a high F/M ratio thus results in inefficient and insufficient BOD removal.

At a low F/M ratio, the overall metabolic activity in the aeration basin is endogenous. In this phase the metabolism of the organic matter is nearly complete and the microorganisms flocculate rapidly and settle out of solution by gravity. Operation in the endogenous phase is desirable where a high BOD removal efficiency is desired.

Typical traditional aeration treatment systems F/M ratios range from 0.05 to 0.2 for the low rate needed for extended aeration, 0.2 to 0.4 for conventional rate of treatment to the upper range of 0.4 to 1.5 for high rate treatment. However, in the present invention, the F/M ratio is kept in the range of 0.05 to 0.8 to encompass all of the low rate, all of the conventional rate and a portion of the high rate treatment processes allowing for a significant amount of flexibility within a single treatment plant design. This flexibility is evident in that as the flow of a treatment system increases and the concentrations of organic matter remains the same, the recirculation rate is able to be increased by simply modulating the aerator to increase the speed of the recirculating pumps, which in turn increases the aeration delivery rate. Therefore, with a sufficient amount of available oxygen as achieved by using an aeration delivery system such as the one described herein and in U.S. Pat. No. 5,893,641, the ranges of F/M ratio listed above for the current invention allow the microorganisms not only to completely metabolize the organic matter, but through intense aeration the food source diminishes as the microorganisms consume it and thus the competition for food increases. Microorganisms consume themselves and each other in order to survive as in the endogenous respiration treatment process, even at the higher F/M ratio of 0.8. The long-term cannibalistic state of endogenous respiration ensures the mass reduction of solids accumulation that occurs with the aerobic digestion process of the current invention. Maintaining F/M ratios such as with the current invention along with maintaining high amounts of dissolved oxygen as is economically possible using the aeration device and delivery system mentioned above, the oxidation of organic matter is rapidly completed.

Figure 16:
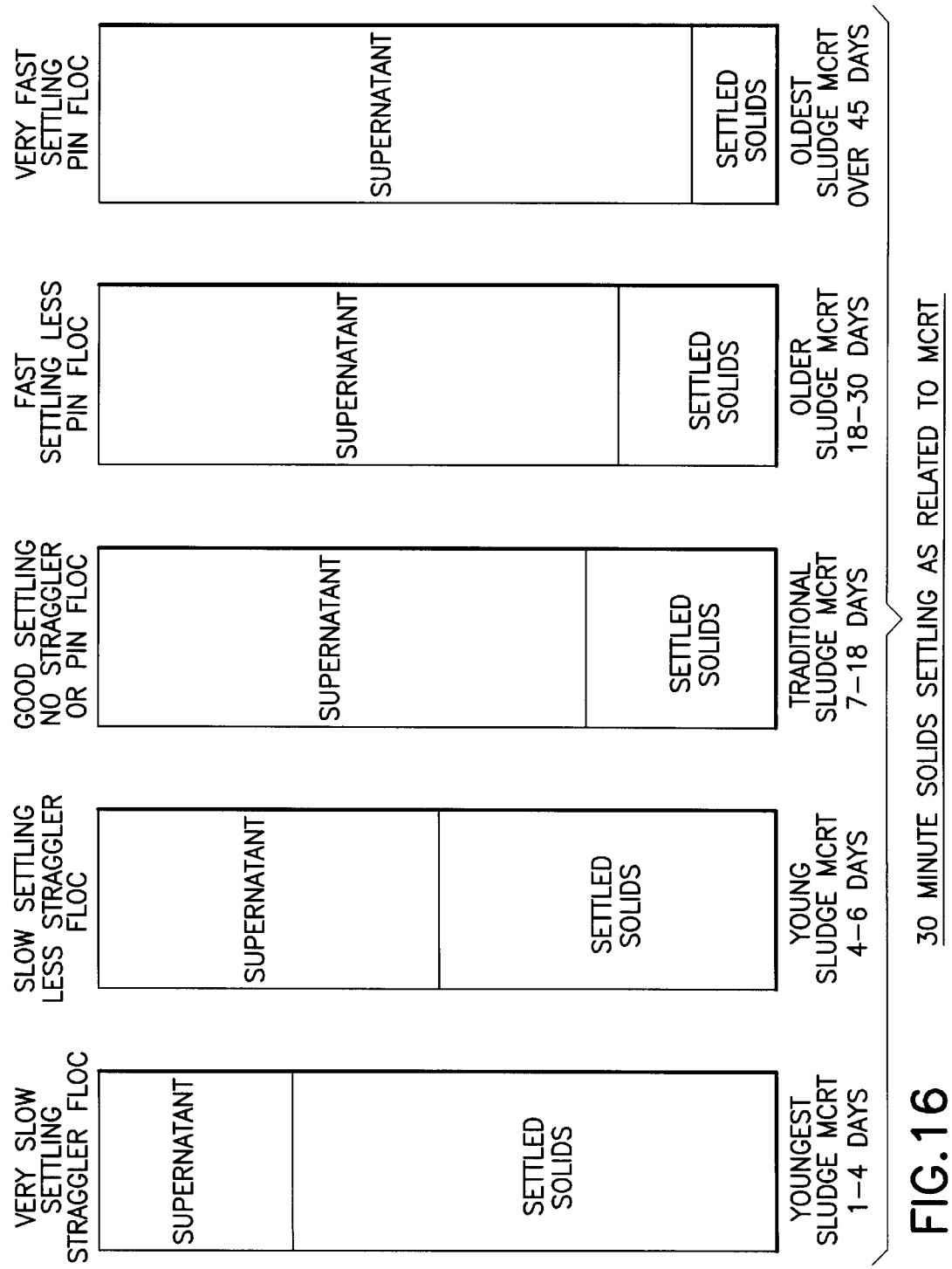
FIG. 16 is a chart showing the 30 minute solids settling as related to MCRT.

As the MCRT of the microorganisms increases, the promotion of rapid settling of the microorganisms increases, benefitting the clarification process, as shown in FIGS. 2 and 16.

Figure 13:
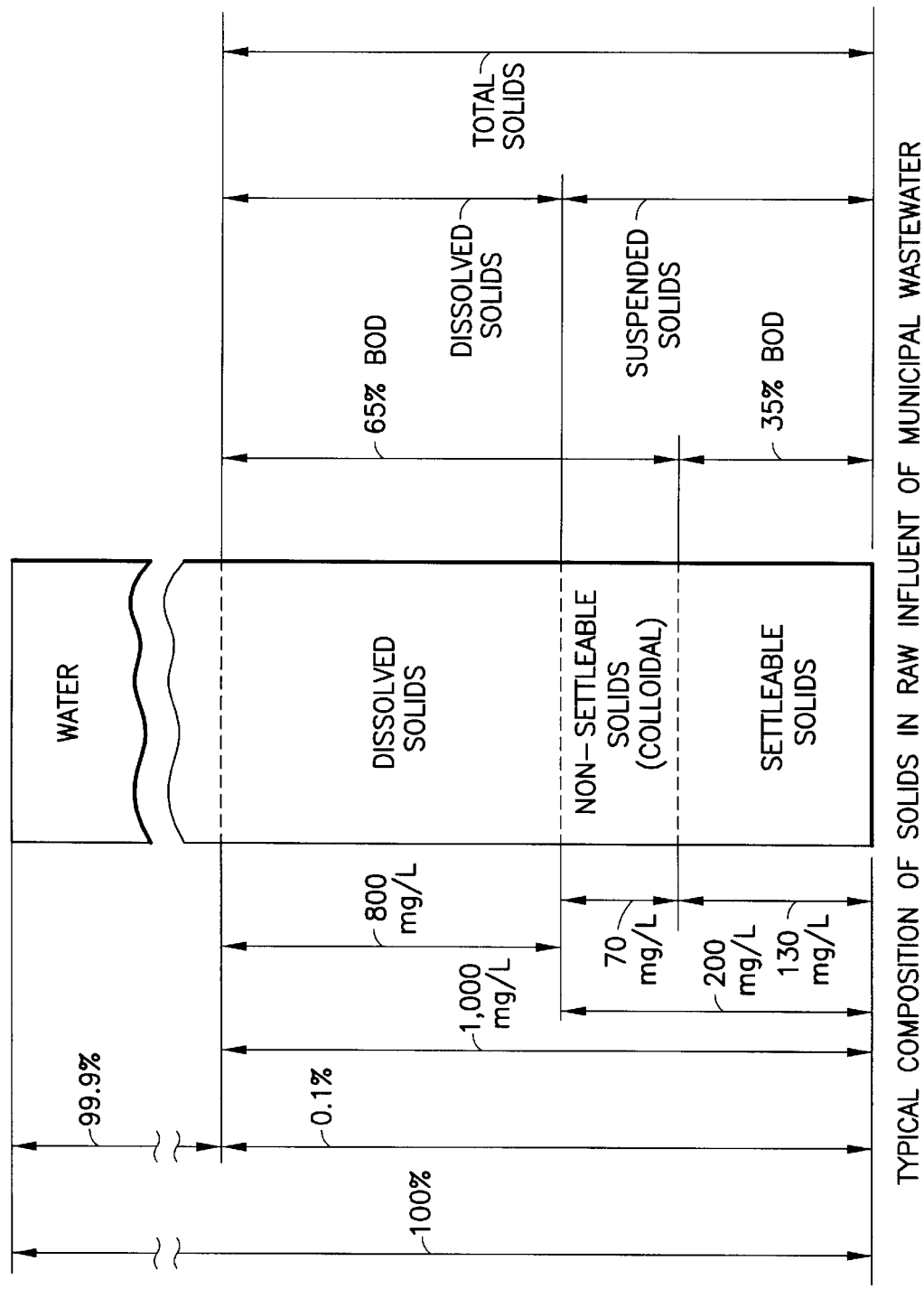
FIG. 13 illustrates the solids composition of raw influent in typical municipal wastewater.
Figure 14:
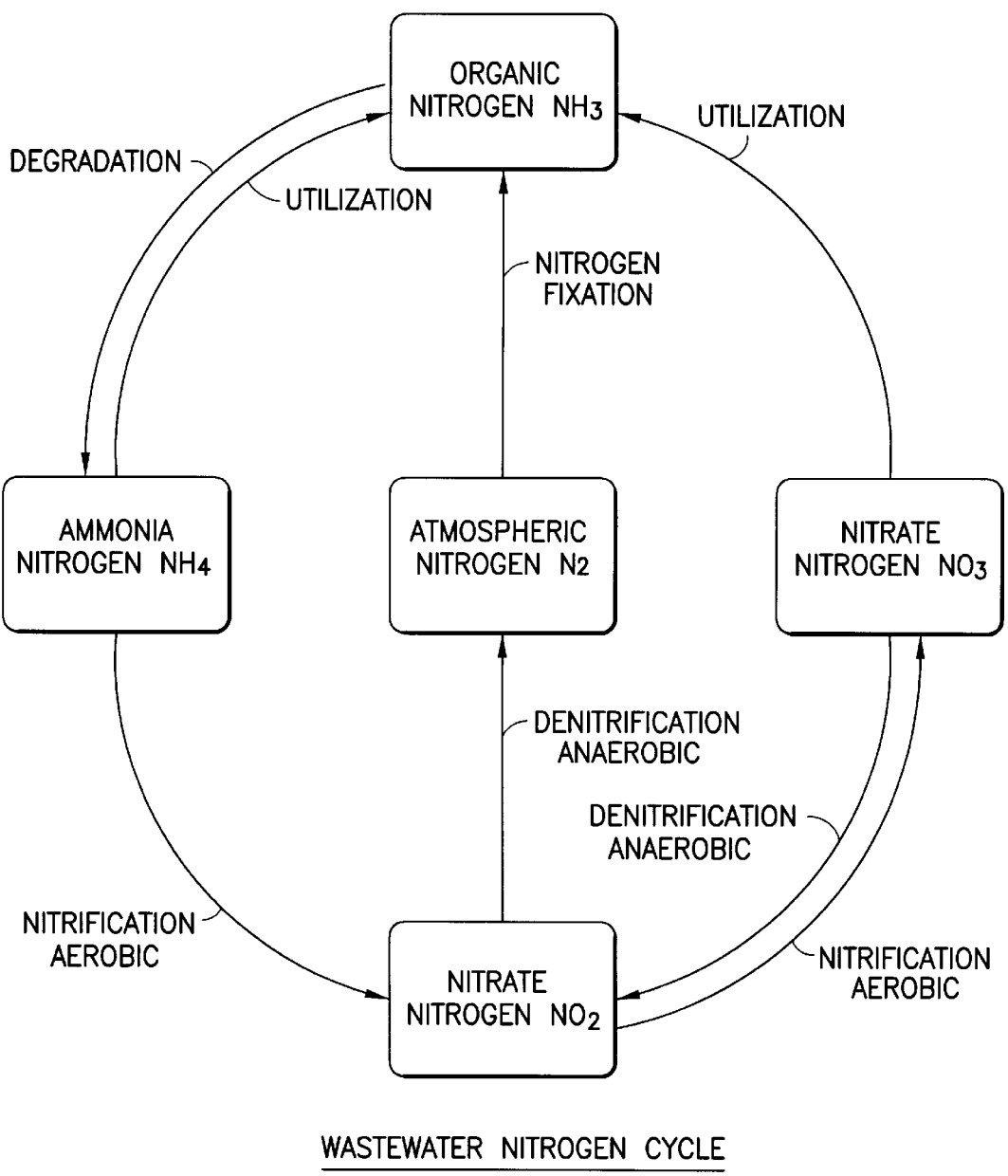
FIG. 14 shows a wastewater nitrogen cycle.

In order to better understand the term "wasting" as used in the present invention, the following explanation is given. As the concentration of inert solids increases, a removal or wasting of these solids should occur so as to allow a sufficient volume of biological microorganisms to reside within the biological processing zones. For this reason provisions have been made for the removal of inorganic or inert solids from aerobic reactor #1 as illustrated in FIGS. 4, 5, 6, 7, 8, 9, 10 and 18. When the inert concentration reaches the removal level a predetermined amount of solids are removed. The concentration of inert solids prior to this wasting has steadily risen from the extremely low concentrations (approximately 0.001% of the settleable solids as indicated in FIG. 13) in the influent flow, to levels that can reach substantially 50% of the total solids concentration residing in the biological processing zones. While there are organic solids intermixed with inert solids, the total weight of organic solids wasted out of the biological processing zones are substantially between 0.01% and 0.5% as compared to the total weight of organic solids that have entered the biological processing zone. This wasting of inert and organic solids should continue periodically until the inert solids concentrations within the biological processing zone have dropped to acceptable processing levels.

Clarification may be defined as separating the biomass from the treated aqueous solution. Traditional aerobic treatment and solids separation systems attempt to retain the bulk of the microorganisms in the system by coagulation and flocculation, however, wasting occurs due to the nature of traditional process and apparatus along with operational energy cost limitations. The biological solids then settle to the bottom of a clarifier. The majority of the biological solids are then returned to the aeration basin while intentionally wasting (removing) from the system a portion of the biological solids (activated sludge), which is an amount of activated sludge that exceeds the system's designed treatment digestion ability. The current invention retains the microorganisms in the system by settling the biological solids along with all inorganic solids in a clarification zone (Clarifiers #1, 2, 3 and 4 of FIG. 4), and returning them to the aerobic reactor #1 zone (vessel 18 of FIG. 4) for further processing. Care is taken so as to regulate the blanket depth (accumulated sludge in the bottom of a clarifier) to a minimum by the frequency and number of gallons of return activated sludge (RAS) evacuated and returned to the aerobic reactor #1 zone. This frequency of evacuation of RAS eliminates long detention times of biological solids in the clarification zone, which would otherwise become septic, gasify and float to the surface of the clarification zone. Observation and adjustments are made to the evacuation of RAS flows so as to minimize the hydraulic velocities in the clarification zone. Higher hydraulic velocities can cause inefficient settling in the clarification zone resulting in biological solids carry over in its effluent.

With the present invention, the hydraulic detention time within the aeration cycles are in the ranges of the complete mix and plug flow processes, and partially in the high purity oxygen process range, while deriving the benefits of the extended aeration process. The extended aeration process typically uses 18 to 36 hours to almost completely oxidize (treat) organic matter as shown on FIG. 3 (see the right-most column thereof). The present invention obtains the same results on the organic matter in substantially 4 to 8 hours time. By using an efficient aeration delivery system, the current invention drastically reduces the time needed to oxidize the organic matter. This is accomplished by the aeration delivery systems located at each of the aerobic reactor zones (vessels 18, 20 of FIG. 4), the anaerobic conditioner zone (vessel 8 of FIG. 4) and the anoxic selector zone (vessel 58 of FIG. 4) re-circulating, by volume, each of their respective contents substantially 100% every two hours. When combining the anaerobic conditioner zone along with both aerobic reactor zone and the anoxic selector zone recirculation percentage rates, the total processing recirculation percentage rate is equal to or greater than 200% of the influent flow entering the treatment process in a 24 hour period. The aeration system re-circulates, shreds and homogenizes the organic matter and microorganisms, and oxygenates the entire mass many more times than traditional systems resulting in a greater biological solids digestion rate in a shorter time period than traditional systems. Typical re-circulation rates in conventional treatment systems range from 25 to 100 percent per day of the influent flow for complete mix systems, 25 to 50 percent per day of the influent flow for plug flow systems and 75 to 150 percent per day of the influent flow for extended aeration systems. Recirculation percentage rates as they pertain to traditional activated sludge treatment systems refer only to the percentage of recirculation of the Return Activated Sludge (RAS) as compared to the influent flow. While the present invention uses this same type of RAS recirculation percentage the present invention also utilizes the previously described processing recirculation percentage achieving a greater solids digestion rate than is possible with traditional activated sludge treatment systems.

The biological treatment technique according to the present invention will now be described. The composition of microorganism cells consist of 70 to 90 percent water with 10 to 30 percent dry material by weight. Of this dry material, 70 to 95 percent is organic and 5 to 30 percent is inorganic. Ninety-five percent of the organic dry material consists of carbon, oxygen, nitrogen, hydrogen and phosphorus, and other trace materials respectively. The present invention takes advantage of the large percent of organics available to the microorganisms by maintaining an extremely long MCRT for not only the complete oxidation of organic compounds but also for the consumption of biomass (the mass of organic material consisting of living organisms feeding on the wastes in the wastewater, dead organisms and other debris), which also contains these same elements. In the activated sludge process, carbon, oxygen, nitrogen and hydrogen are used as the main constituent of cellular material, with phosphorus being used as the constituent of nucleic acids, phospholipids and nucleotides. Compounds are taken up by microorganisms from their environment to carry out two basic primary metabolic activities: energy production through bioenergetics, and synthesis of new cell material through biosynthesis. Microorganisms produce energy for themselves from light, organic and inorganic compounds. The main inorganic compounds used by the microorganisms as a source of energy are, ammonium ($NH_4$), nitrite ($NO_2$), dissolved sulfide ($H_2S$), and elemental sulfur. These compounds are oxidized and the energy released is used for cell maintenance, synthesis of new cell material and movement of the microorganism if they are mobile. There are two types of microorganisms: autotrophic microorganisms which use inorganic carbon for biosynthesis and heterotrophic microorganisms which use organic carbon for biosynthesis.

Carbon makes up approximately 50 percent of the dry mass of the microorganism cell. Therefore carbon is the main element used during biosynthesis. The microorganisms use as one of their sources of energy for new cell development either organic compounds such as fatty acids, amino acids, sugars, organic acids, or carbon dioxide ($CO_2$). Through biological processes, organic carbon is converted into microorganism biosynthesis material and gases such as carbon dioxide, which can escape into the atmosphere. Through the 200% recirculation by volume of the contents of the aerobic reactor by the RCAS of the present invention, the microorganisms are enabled to come into contact with their carbon source more times and more efficiently than in traditional systems.

Oxygen and hydrogen are the main gas elements used in cellular material. The source of oxygen for the cellular material of microorganisms is found in molecular oxygen, organic compounds or even carbon dioxide. The present invention delivers oxygen through the aerobic reactor's aeration delivery system (RCAS) directly into the aqueous solution of nutrients and microorganisms. This offers the microorganisms the opportunity to respirate in the easiest manner and with the most available oxygen source for bioenergetics and biosynthesis. The source of hydrogen for the cellular material of microorganisms is found in molecular hydrogen and organic compounds. Oxygen as an electron acceptor is used in the classification of microorganisms. Microorganisms, which use oxygen are referred to as aerobes, and those that do not use oxygen are referred as anaerobes. The present invention uses aerobes for organic compound stabilization and decomposition in the aerobic reactor.

Nitrogen is the major source for proteins and nucleic acids for the microorganisms and includes 14 percent of the cellular material. Microorganisms can use inorganic nitrogen in the form of nitrogen gas ($N_2$), ammonia-nitrogen ($NH_3+NH_4$), nitrite ($NO_2$) and nitrate ($NO_3$). Nitrogen gas to be used must first be converted into ammonium ($NH_4$) and then converted into organic nitrogen as in nitrogen fixing in soils, however ammonia-nitrogen ($NH_3$) can be considered as 100 percent ready and available for nutritional use by microorganisms. Conversion of ammonia ($NH_3$) into nitrite ($NO_2$) and nitrate ($NO_3$) opens the door for microorganisms that use $NO_2$ and $NO_3$ as their sole nitrogen source. However there is a large amount of energy needed for microorganisms to be able to use this nitrogen as a source for growth. These microorganisms must oxidize larger amounts of organic compounds to have the energy needed for using $NO_2$ and $NO_3$ as their nitrogen source. This results in a lower microorganism growth rate than when using $NH_3$ as a source for nitrogen. The current invention uses this lower growth rate to its advantage when maintaining an extremely long MCRT and variable F/M ratio to reduce the amount of microorganism growth. In combination, the microorganisms must consume greater amounts of organic compounds and are unable to reproduce as rapidly. There are three biological removal processes used to remove nitrogen, they are ammonification followed by nitrification and denitrification. Ammonification and nitrification occur in the aerobic reactors while denitrification occurs in the anoxic selector. Ammonification is carried out by heterotrophic microorganisms, which take organic nitrogen in the form of proteins and peptides and decomposes them into ammonia and ammonium. Autotrophic microorganisms that convert ammonia into $NO_2$ and then $NO_3$ carry out nitrification. The third stage in the process is denitrification where another group of heterotrophic microorganisms reduce the $NO_3$ to $NO_2$ and then to NO and finally to $N_2$ for release into the atmosphere.

Microorganisms use phosphorus during cell synthesis, cell maintenance and as energy transport. Due to this, about 10 to 30 percent of an influent's phosphorus is consumed by microorganisms and used for their metabolic processes. However there are three microorganisms with the ability to store phosphorus in larger amounts than is needed for growth requirements. This is referred to as luxury phosphorus uptake. The three microorganisms, acinetobacter, pseudomonas and moraxella, are collectively referred to as poly-P bacteria because of their ability to store phosphorus in the form of polyphosphate granules. The poly-P bacteria are able to use the polyphosphate as an energy source when under stressed conditions. Since these bacteria are only able to store this extra amount of phosphorus when under aerobic conditions, the current invention maintains dissolved oxygen in sufficient quantities to ensure luxury phosphorus uptake within the aerobic reactor zones. The present invention uses an anaerobic conditioner zone as an area for microorganisms to reach the necessary stressed conditions to enable these poly-P bacteria to use the polyphosphate as energy, thus reducing the amount of phosphorus in the effluent stream.

In summary, carbon, nitrogen and phosphorus are reduced through bioenergetics and biosynthesis by the microorganisms. The amount of removal of these nutrients is directly related to the concentration of the nutrients and the amount of time these nutrients are exposed to microorganisms. Increasing the number of times nutrients come into contact with the microorganisms and oxygen through homogenization, as is the case with the current invention, can accelerate the organic digestion process. By designing zones to substantially meet a 2-hour hydraulic detention time and by re-circulation and re-aerating the entire content, by volume, of the aerobic reactor zones 100% every 2 hours before it flows out of the zones, an environment for the microorganisms to accelerate the biological digestion process is provided. All biological solids removed from the solids capturing zone and returned to the processing zones are subject to this accelerated biological digestion as well. The present invention, as outlined above, produces this effect, and henceforth utilizes a smaller footprint design as compared to traditional treatment systems while performing as if there is more hydraulic detention capacity available.

By using an extended MCRT, a flexible F/M ratio and increasing the re-circulation as described above, the consumption of biomass also occurs, achieving an enhanced organic solids reduction in the process through digestion. Only after a predetermined concentration of inorganic solids is reached is intentional wasting initiated of substantially only those inorganic solids, with possible high concentrations of phosphorous.

Another component of the "enhanced solids reduction" (ESR) wastewater treatment system of the present invention are the zones (vessels), as being a part of an entire system. The zones consist of a vessel or group of vessels, which contains the wastewater for treatment. These vessels are preferred to be of a particular shape consisting of a vertical cylinder having a conical bottom. However, the processing of said wastewater with the present invention is not limited to the preferred vessels. Effective treatment with the process of the present invention is attainable in square or rectangular vessels, with flat or sloped bottoms. The zones are unique to the process designated for that zone. The vessel design and construction of the process zones are a component of the ESR wastewater treatment system that permits the modularization of the system. The zones illustrated in FIG. 4, the preferred apparatus embodiment, are of a single vessel per zone design. Alternate apparatus embodiments could resemble a zone having one or more vessels performing the unique process function of that zone. Alternately, as an example of a large capacity ESR wastewater treatment system, the number vessels shown in FIG. 11, could be classified as one zone, and additional modules resembling the number of vessels in FIG. 11 could be added for each additional treatment zone required until such time that the design criteria of a large volume treatment plant is satisfied. Alternate designs could incorporate various sized vessels that utilize the same treatment processing techniques as described herein.

Figure 12:
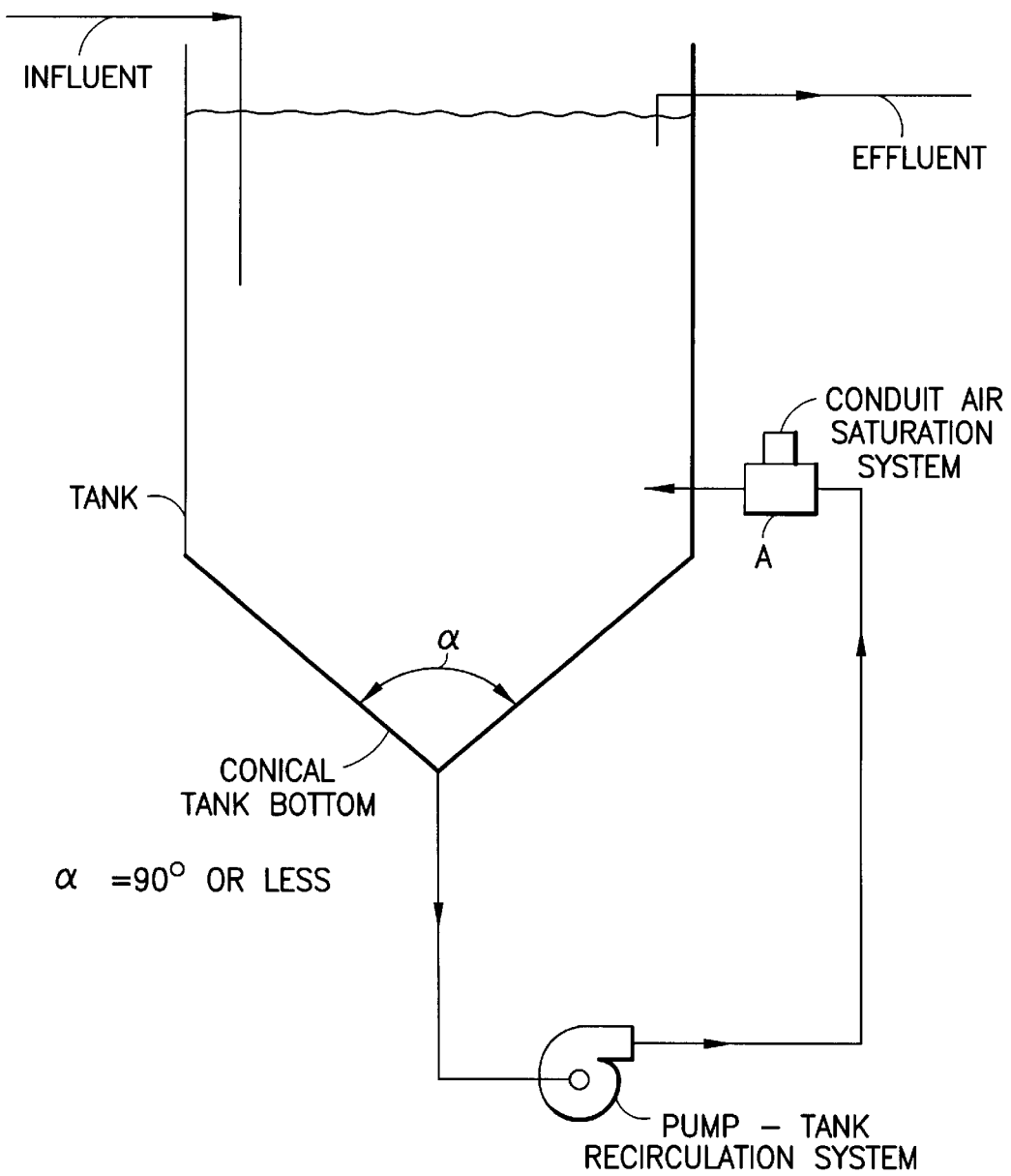
FIG. 12 is a schematic illustration of a vessel structure of the present invention, including a zone flow diagram.

Vessel design incorporates the vertical cylinder with a depressed-shaped bottom, but preferably cone-shaped bottom (see FIG. 12) in order to create the environment to enhance the desired path of the wastewater stream during treatment. The use of the cone bottom vessel is essential for the settling and concentrating of solids within the clarification zone and is used effectively in the process zones in the settling and concentrating of phosphorous rich inorganic solids for periodic removal. Keeping solids in suspension is accomplished by the RCAS system as it receives flow into the pump from the bottom of the aerobic reactor zone. The aerobic reactor zone contents are then pumped, aerated and recirculated, generating velocities during the RCAS conduit discharge back into the aerobic reactor so that the aerobic reactor zone contents are well mixed.

With the use of cylindrical shapes during clarification, and with the prompting of flow via the inflow's direction and its positioned reference point, and the re-circulation discharge direction and its positioned reference point, the wastewater is directed to travel in a particular direction, preferably rotational, at a particular speed and for a particular distance so as to allow the settling solids to arrive at the lower portion of the vessel, and remain within the vessel for a particular period of time so as to accumulate, concentrate and process, in order to facilitate the treatment desired. The conical bottom along with the flow characteristics of the traveling wastewater, promotes the settling solids to accumulate at a central point of reference at the lowest point within the cone shaped bottom (referred to as solids concentrator). These accumulated settled solids are then available to be evacuated by to way of a port exiting at that lowest point.

Figure 4A:
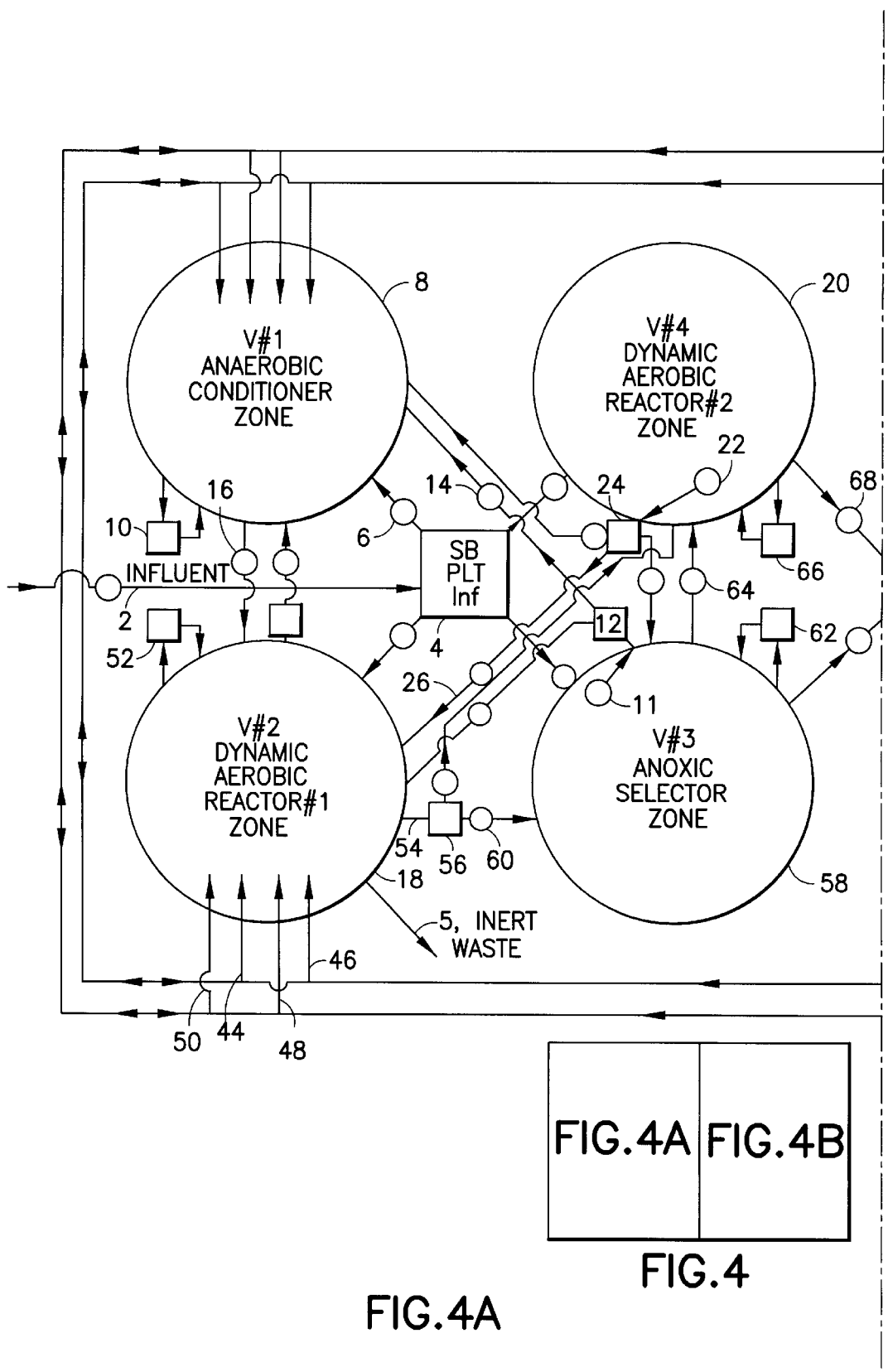
FIG. 4 is a schematic diagram of an eight-vessel plant layout according to the preferred embodiment of the present invention showing flex-flow, nitrification, de-nitrification and phosphorous reduction.
Figure 4B:
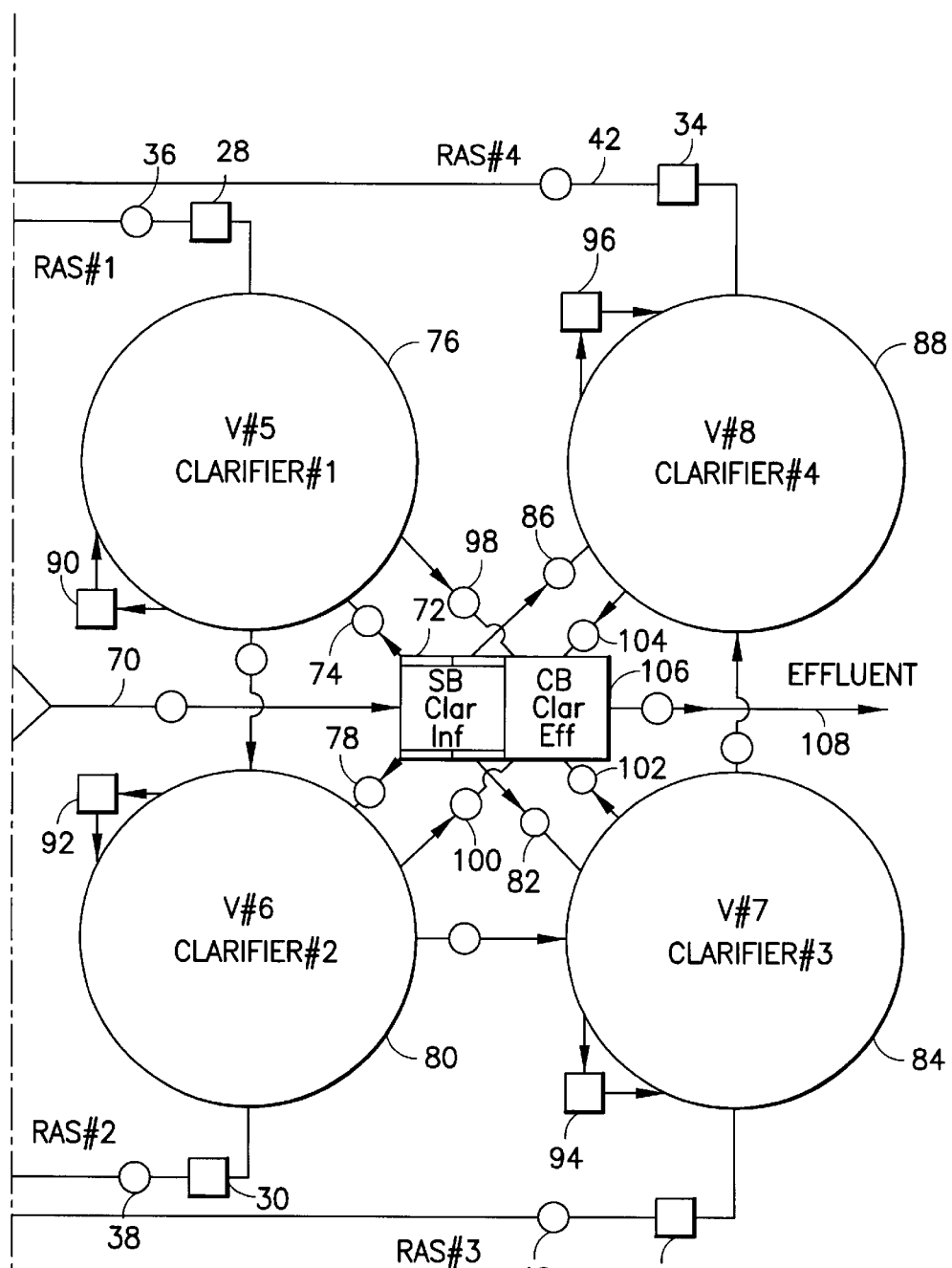

The embodiment of FIG. 4 is utilized to illustrate the preferred flow characteristics when the influent contains normal BOD, TSS (Total Suspended Solids) & $NH_3$ loading, and requiring normal nitrification, denitrification and phosphorous reduction, as demonstrated by the influent concentrations of a municipal wastewater treatment plant. In FIG. 4, pre-screened influent wastewater containing suspended solids and biodegradable organic substances passes through the influent feeder line, which flows into an influent splitter box, which then has take-off feeders to each of the vessels. This enables FIG. 4 to represent a universal configuration that would be used as a representative for all possible flow characteristics sought after for varying treatment specifications.

Flow and Processes

Referring now to FIG. 4, a preferred embodiment of the enhanced solids reduction (ESR) wastewater treatment system in accordance with the present invention is shown which provides complete operational flexibility in the processing characteristics of nitrification, de-nitrification and phosphorous reduction in conjunction with using a plug flow type flow characteristic (the preferred process embodiment). Due to the efficiency of the preferred embodiment of the present invention and particularly of the RCAS system, an economic and treatability improvement in the processing of wastewater is achieved over and above traditional wastewater treatment processes. The preferred embodiment corresponds to a four-zone biological process and a solids capturing treatment zone. The biological processing zones consist of, but are not limited to, 1) an anaerobic zone, 2) an aerobic zone, 3) an anoxic zone and 4) an additional aerobic zone. The solids capturing zone consists of but is not limited to secondary clarification, tertiary clarification, filtration and chemical addition. However, by altering the flow characteristics by valve changes, any of the alternate processing embodiments (described below) can be implemented and used. The preferred processing embodiment of the present invention is a method of processing that is zone specific and not vessel specific.

For the preferred plug flow characteristic, the influent, which in this embodiment is foreseen as typical municipal wastewater, is directed through line 2 into a flow splitter box 4 which regulates and/or splits the flow of the influent to the treatment vessels. In this embodiment the entire flow of influent is then directed via line 6 to vessel 8 (V #1) which is used as an anaerobic conditioner zone, whereby the contents, ilk by volume, of this zone are recirculated substantially one time every two hours using pump 10 and the above-mentioned RCAS. The size of the vessel 8 depends on the volume of influent being processed.

Vessel 8 (anaerobic conditioner zone) begins the first stage of luxury phosphorous uptake, which is biological phosphorous (Bio-P) release. This first stage of luxury phosphorous uptake is accomplished by maintaining an oxygen deficient state within the vessel. The anaerobic conditioner zone's dissolved oxygen levels are maintained at or below 0.10 mg/L allowing a formation of volatile fatty acids (VFA's) used by microorganisms in the release of Bio-P. While this Bio-P release creates a temporary increase of phosphorous, it also forces the microorganisms to metabolize greater amounts of phosphorous during a later process. The contents of this zone are able to be maintained with low dissolved oxygen levels by the controlled introduction of low oxygen level mixed liquid suspended solids (MLSS) from vessel 58 (anoxic selector zone—V #3) from line 11 through pump 12 and through line 14 into vessel 8 (anaerobic conditioner zone).

Aqueous total solids (TS) from vessel 8 (V #1) flows through line 16 into vessel 18 (V #2) which is a dynamic aerobic reactor #1 zone. The vessel 18 also receives another flow, MLSS re-cycle, which comes from vessel 20 (V #4), which is a dynamic aerobic reactor #2 zone. The flow from vessel 20 comes from line 22 through pump 24 and finally through line 26. Another flow enters vessel 18 from each of the four clarifiers (vessels 76, 80, 84, 88)—(V #5, V#6, V#7 and V#8) in the form of return activated sludge (RAS) through RAS pumps 28, 30, 32 and 34 then through the lines 36, 38, 40 and 42, and finally entering vessel 18 through lines 44, 46, 48 and 50 respectively. The contents, by volume, of vessel 18 are recirculated substantially one time every two hours, using a re-circulation conduit aeration system (RCAS), explained below, which is powered by pump 52. During the recirculation procedure the contents of vessel 18 the settleable solids, become solubilized by means of shredding as they pass through the RCAS system of pump 52. Shredding occurs as the solids within the aqueous solution are processed through the RCAS system by the toroidal vortex action of the RCAS system so as to become more easily consumed by the microorganism population. Intense aeration is also applied through the RCAS system during the recirculation procedure so that the level of dissolved oxygen is substantially maintained at a concentration of 3.5 mg/L or higher. Keeping the dissolved oxygen concentration at these levels allows bacteria nitrosomonas and nitrobactor, residing in the microorganism colony, to oxidize ammonia ($NH_3$) into nitrite ($NO_2$) and finally into nitrate ($NO_3$) respectively. With dissolved oxygen concentrations of this zone maintained at or above 3.5 mg/L, suspended solids and other organic matter are decomposed and oxidized into more stable compounds.

By using large volumes of atmospheric air delivered by the RCAS and maintaining the dissolved oxygen at higher levels (well above 3.5 mg/L) than that which would be maintained by traditional aeration systems (2.0 mg/L to 3.0 mg/L), along with long MCRT's, the microorganism colony will enter the biological life cycle mode known as endogenous respiration (ER). In this ER mode, the living microorganisms begin to metabolize some of their own cellular mass along with any new organic matter they absorb or adsorb from their environment. This aids in the enhancement of solids reduction while maintaining a microorganism colony through the adjustment of the food to microorganism ratio (F/M) to allow the rate of death of the microorganism colony to equal the rate of growth of the microorganism colony through the endogenous respiration process.

Another benefit of the delivery of intense aeration within this reactor is the enhanced consumption of large amounts of phosphorous by the microorganisms. The amount of phosphorous taken up by the microorganisms is greater than the amount of phosphorous the microorganisms released in vessel 8 as described previously. The microorganisms then use this newly acquired phosphorous for new cell wall development and other energy needs.

Accumulation of inert solids are removed via line 5, from vessel 18 (aerobic reactor #1) when the concentrations reach a predetermined level. This holds true for all embodiments of the present invention. This predetermined level could be substantially 50% of the concentration of total solids in vessel 18 or a level at which the process begins to allow nutrients to pass through to the process effluent.

The flow exits vessel 18 via line 54, is provided to splitter box 56 and is then provided to vessel 58 via line 60 for further processing.

The contents, by volume, of vessel 58 (anoxic selector zone V#3) are recirculated substantially one time every two hours by the pump 62. Vessel 58 receives elemental oxygen attached to nitrogen molecules in the form of nitrate nitrogen ($NO_3$) and nitrite nitrogen ($NO_2$), which was derived primarily from the ammonia conversion process known as nitrification, occurring within vessel 18 (aerobic reactor #1 zone). The amount of dissolved oxygen (DO) in vessel 58 is maintained in the range of 0.3 mg/L to 0.5 mg/L. The microorganisms contained within the wastewater of vessel 58 look for oxygen to respirate. With little dissolved oxygen available, the microorganisms are forced to use the elemental oxygen in the $NO_3$ that is tied up with nitrogen. This process is commonly called denitrification. Once the bond between the nitrogen and oxygen is broken, the microorganisms consume the elemental oxygen for respiration, allowing the nitrogen to be released into the atmosphere. The microorganisms use this oxygen for necessary respiration in order to continue consumption of organic matter still within the wastewater.

During this anoxic condition, a natural release of phosphorous by the microorganisms occurs, as a way to conserve energy during the time of low dissolved oxygen availability, but in lesser quantities than that which occurs in vessel 8 (the anaerobic conditioner zone V #1). While this creates a temporary increase of phosphorous, it also forces the microorganisms to metabolize greater amounts of phosphorous in a later process. The effluent from this process is provided via line 64 on to vessel 20 (aerobic reactor #2 zone-V#4) for further treatment.

Vessel 20 is used as a dynamic aerobic reactor. The contents, by volume, of vessel 20 are recirculated and intensely aerated substantially one time every two hours using the re-circulation conduit aeration system (RCAS), which is powered by pump 66. The oxidation of both dissolved and suspended organic matter occur in vessel 20 by maintaining a dissolved oxygen of at least 3.0 mg/L. The bacteria nitrosomonas and nitrobactor, residing in the microorganism colony, will oxidize organic nitrogen into ammonia ($NH_3$) then into nitrite ($NO_2$) and finally into nitrate ($NO_3$) respectively. As the aqueous solution containing the microorganism colony of vessel 20 (dynamic aerobic reactor #2 zone) is aerated and the dissolved oxygen increases, the microorganisms begin consuming phosphorous in larger quantities than is necessary for them to sustain life. The amount of phosphorous consumed far exceeds the amount of phosphorous the microorganisms released into the aqueous solution while being processed within the anaerobic conditioner zone and anoxic selector zones (vessel 8 and 58). This effect is what is referred to as "luxury phosphorous uptake". Portions of the mixed liquid suspended solids (MLSS) from vessel 20 are recycled for further digestion to vessel 18 (dynamic aerobic reactor #1 zone) through line 22, using pump 24 and is finally discharged through line 26, while the effluent is discharged from vessel 20 through line 68 and into line 70 before entering a clarification zone flow splitter box 72 (SB Clar Inf).

As the influent from line 70 enters the clarification zone flow splitter box 72 (SB Clar Inf), the flow is preferably split into four equal portions and sent to each of the four clarifiers through line 74 for vessel 76 corresponding to Clarifier #1, line 78 for vessel 80 corresponding to Clarifier #2, line 82 for vessel 84 corresponding to Clarifier #3 and line 86 for vessel 88 corresponding to Clarifier #4. The flow velocity is diminished as the flow enters each of the clarifiers, allowing the solids to settle into the bottom portion of each of the clarifiers. The settling solids are then dislodged from the walls of the clarifiers by using a hydraulically operated solids concentration inducer 90 for vessel 76 (Clarifier #1), hydraulically operated solids concentration inducer 92 for vessel 80 (Clarifier #2) hydraulically operated solids concentration inducer 94 for vessel 84 (Clarifier #3), and hydraulically operated solids concentration inducer 96 for vessel 88 (Clarifier #4), allowing the solids to further thicken before being removed through each of the clarifier RAS pumps (28, 30, 32 and 34) and RAS lines (36, 38, 40 and 42) and sent to the vessel 18 (dynamic aerobic reactor #1) for further treatment. Separated liquid from the clarification process exits vessel 76 through line 98, vessel 80 through line 100, vessel 84 through line 102 and vessel 88 through line 104, and join in the collection box 106 (CB Clar Eff). This clarifier provides effluent through line 108 as the final processed effluent.

The preferred embodiment of the present invention allows for an improvement in operational flexibility over traditional aerobic treatment systems.

Figures 5, 5A:
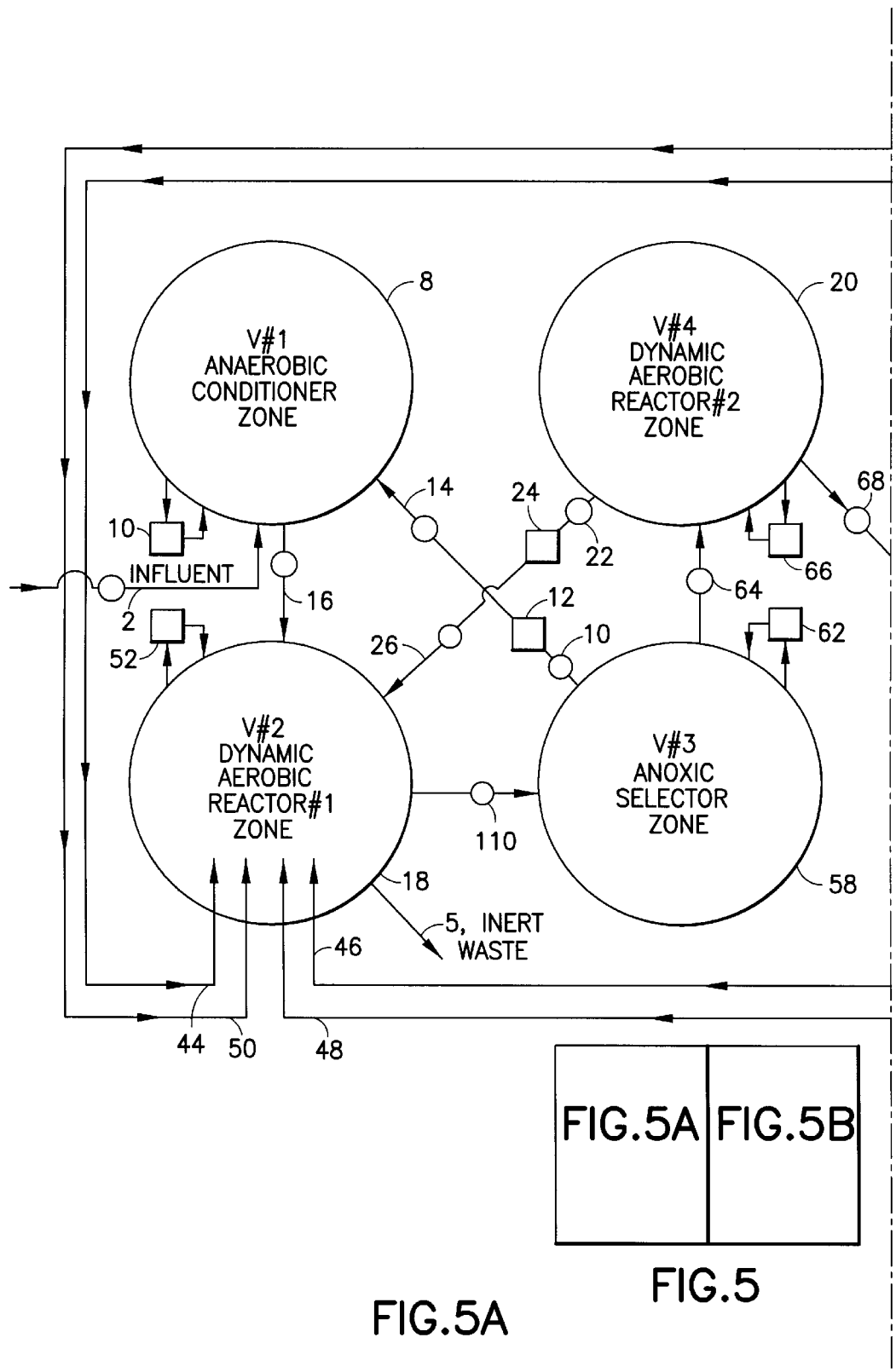
FIG. 5 is a schematic diagram of an eight-vessel plant layout according to an alternate embodiment of the present invention.
Figure 5B:
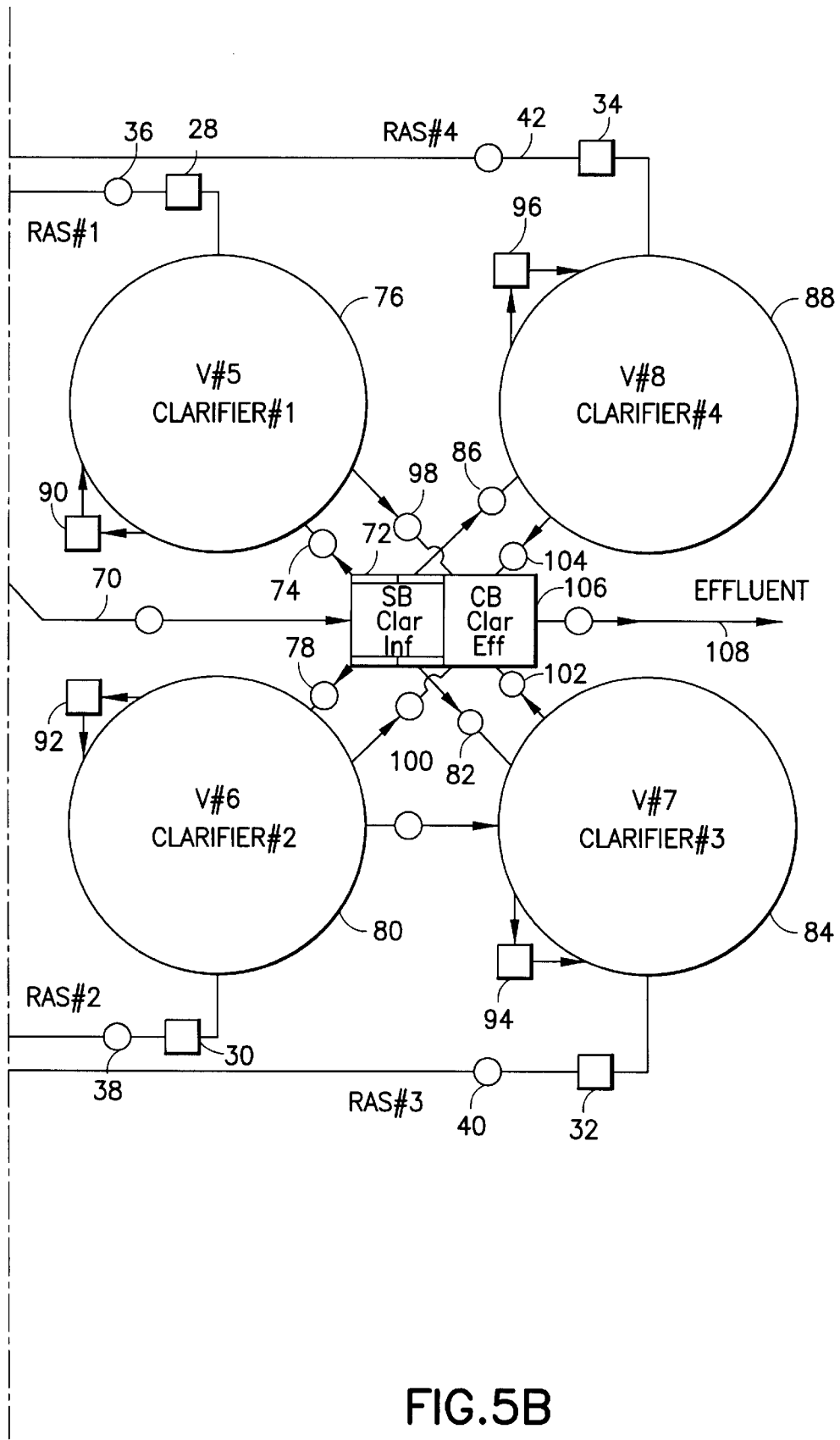

A first alternate embodiment of the present invention is shown in FIG. 5 wherein the unutilized lines and equipment of the preferred apparatus embodiment of FIG. 4 are removed. However, all the utilized lines and equipment required to process the wastewater flow using the preferred process embodiment are shown. The alternative embodiment depicted in FIG. #5 is utilized when the specific flow configuration is contemplated for the installation and where the flexibility offered in FIG. #4 is not required. The influent, which is typical municipal waste water, is directed through line 2 into vessel 8 which is used as an anaerobic conditioner zone (V#1), whereby the contents, by volume, of the zone are recirculated substantially one time every two hours using pump 10. Similar to that of the preferred embodiment, the contents of this vessel are able to be maintained with low dissolved oxygen levels by the controlled introduction of low oxygen level MLSS from vessel 58 (anoxic selector zone) from line 10 through pump 12 and fed through line 14 into vessel 8.

Aqueous total solids from vessel 8 (anaerobic conditioner zone) flows through line 16 into vessel 18 which is a dynamic aerobic reactor #1 zone (V#2). Vessel 18 also receives another flow, MLSS re-cycle, which comes from vessel 20 which is being used as dynamic aerobic reactor #2 zone. The flow from vessel 20 comes from line 22 through pump 24 and finally through line 26. Another flow enters vessel 18 from each of the four clarifiers (vessels 76, 80, 84, 88 described below) in the form of return activated sludge (RAS) through the RAS pumps 28, 30, 32 and 34, then through the lines 36, 38, 40 and 42 respectively, and finally entering vessel 18 through lines 44, 46, 48 and 50 respectively. The contents, by volume, of vessel 18 are re-circulated substantially one time every two hours, using a re-circulation conduit aeration system (RCAS), explained below, which is powered by pump 52. During the re-circulation procedure, the contents of vessel 18, that is the settleable solids, become solubilized by means of shredding as it passes through the RCAS system of the zone. Shredding occurs as the solids within the aqueous solution are processed through the RCAS system by the toroidal vortex action of the RCAS system so as to become more easily consumed by the microorganism population. Intense aeration is also applied through the RCAS system during the re-circulation procedures so that the level of the dissolved oxygen is substantially maintained at a concentration of 3.5 mg per liter or higher.

The flow exits vessel 18 (aerobic reactor #1 zone) via line 110 to vessel 58 (anoxic selector zone V#3). The contents of vessel 58 are recirculated substantially one time every two hours by pump 62. The operation of vessel 58 is similar to that described in connection with FIG. 4. The effluent from vessel 58 is provided via line 64 to vessel 20 for further treatment.

Vessel 20 is a dynamic aerobic reactor (V#4). The contents of vessel 20 are re-circulated and intensely aerated substantially one time every two hours using the re-circulation conduit aeration system (RCAS), which is powered by pump 66. The operation of vessel 20 is similar to that described in connection with FIG. 4. As explained above, portions of the MLSS from vessel 20 are recycled for further processing to vessel 18 through line 22, using pump 24 and finally discharged through line 26, while the effluent of vessel 20 is discharged through line 68 and into line 70 before entering a clarification zone flow splitter box 72 (SB Clar Inf).

As the influent from line 70 enters the clarification zone flow splitter box 72, the flow is preferably split into four equal portions and sent to each of the four clarifiers (V#5, V#6, V#7, V#8) through line 74 for vessel 76 corresponding to clarifier #1, line 78 for vessel 80 corresponding to clarifier #2, line 82 for vessel 84 corresponding to clarifier #3 and line 86 for vessel 88 corresponding to clarifier #4. The flow velocity is diminished as the flow enters each of the clarifiers, allowing the solids to settle into the bottom of each of the clarifiers. These settling solids are then dislodged from the vessel walls by a hydraulically operated solid concentrations inducer 90 for vessel 76, hydraulically operated solids concentration inducer 92 for vessel 80, hydraulically operated solids concentration inducer 94 for vessel 84, and hydraulically operated solids concentration inducer 96 for vessel 88, allowing the solids to further thicken before being removed through each of the clarifier RAS pumps (28, 30, 32 and 34) and RAS lines (36, 38, 40 and 42) and sent via lines 44, 46, 48 and 50 to the vessel 18 for further treatment. Separated liquid from the clarification process exists vessel 76 through line 98, vessel 80 through line 100, vessel 84 through line 102 and vessel 88 through line 104, and joined in collection box 106 (CB Clar Eff). The clarifier effluent exists through line 108 as the final processed effluent.

FIG. 18 is a simplified representation of the process shown in FIG. 5 which further includes a filtration zone 89 coupled to the output of the clarifiers (line 108). The filtration zone receives the aqueous solution (in FIG. 4 the effulent) via line 108 for further processing. The aqueous solution is provided to the filtration zone where solids separate and settle from the liquid portion of the aqueous solution. The solids which have settled and separated from the liquid portion are provided via line 109 to the influent line 2 for re-processing and retreatment through the system. The filtration zone shown in FIG. 18 can also be included in the system shown in FIG. 4 or any of the other embodiments of the present invention explained below.

Figure 6A:
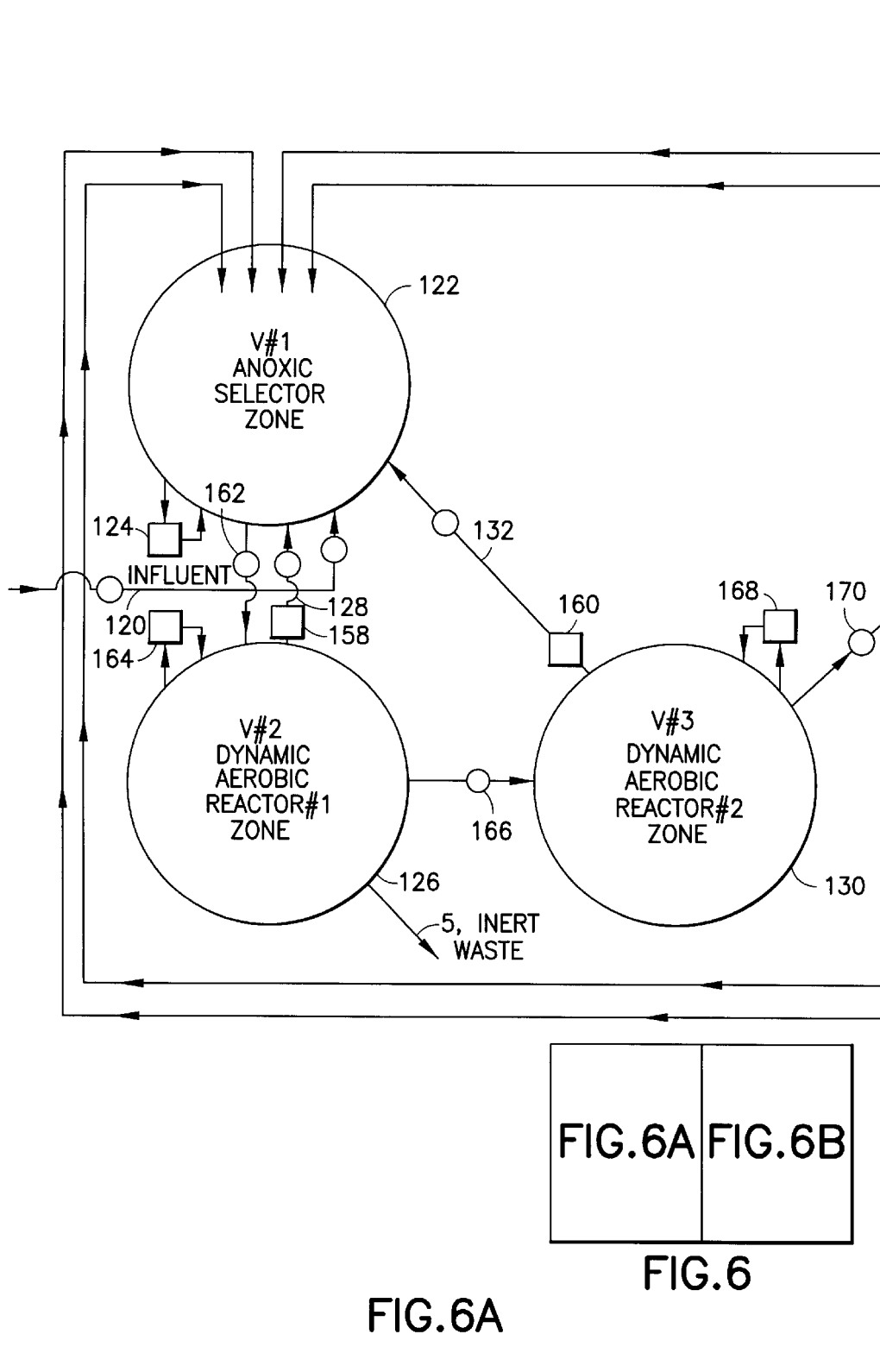
FIG. 6 is a schematic diagram of a seven-vessel plant layout according to an alternate embodiment of the present invention showing specific flow characteristics of plug flow, nitrification, de-nitrification.
Figure 6B:
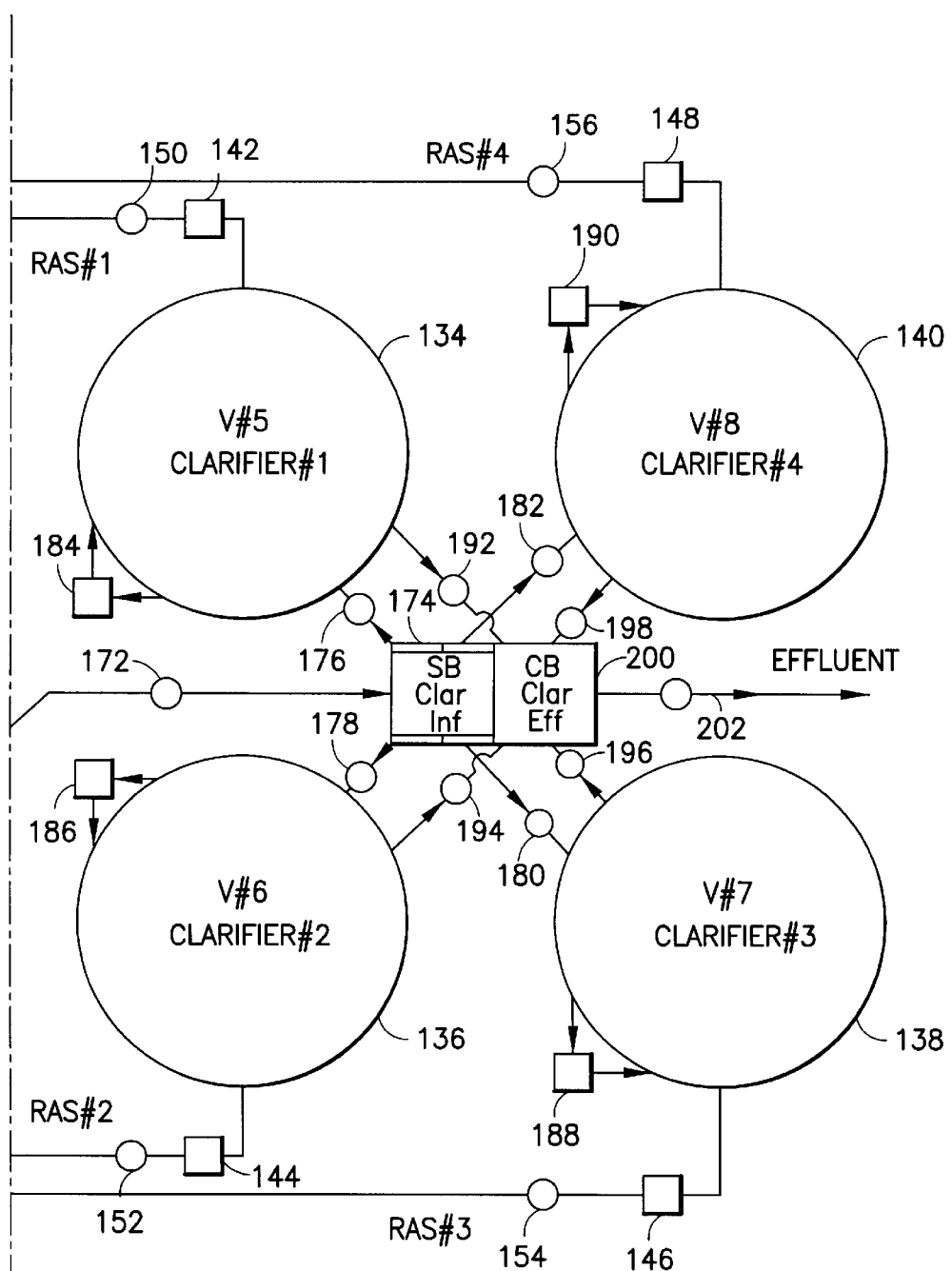

The second alternate embodiment of the present invention depicted in FIG. 6 uses alternate process embodiment #1 of the present invention to provide the processing characteristic of nitrification and de-nitrification in conjunction with a plug flow type flow characteristic. Alternate apparatus embodiment #2 is to be used with alternate process embodiment #1. Alternate processing embodiment #1 of the present invention is a method of processing that is zone specific and not vessel specific.

For alternate process embodiment #1, the influent, represented as typical municipal wastewater, is directed through line 120 into vessel 122 which is used as an anoxic selector zone (V#1), whereby the contents, by volume, of this vessel are recirculated substantially one time every two hours using pump 124. Other flows that enter vessel 122 come from vessel 126 (aerobic reactor #1 zone-V#2) via line 128 and vessel 130 (aerobic reactor #2 zone-V#3) via line 132 in the form of MLSS recycle, which is used to supplement the lack of oxygen within vessel 122. Another flow that enters vessel 122 comes from each of the four clarifiers (vessels 134, 136, 138, 140) in the form of return activated sludge (RAS) through the RAS pumps 142, 144, 146 and 148, then finally through the lines 150, 152, 154 and 156 respectively. Vessel 122 receives elemental oxygen attached to nitrogen molecules in the form of nitrate nitrogen ($NO_3$) and nitrite nitrogen ($NO_2$), which were derived mostly from the ammonia conversion process known as nitrification, occurring within vessels 126 and 130 (aerobic reactor #1 zone and aerobic reactor #2 zone). The amount of dissolved oxygen in vessel 122 is maintained in the range of 0.3 mg/l to 0.5 mg/l. This is made possible by the recycling of MLSS from vessel 126 (aerobic reactor #1 zone) using pump 158 and pumping through line 128, and vessel 130 (aerobic reactor #2 zone) using pump 160 and pumping through line 132 into vessel 122.

The microorganisms contained within the wastewater of vessel 122 (anoxic selector zone) look for oxygen to respirate. With little dissolved oxygen available, the microorganisms are forced to use the elemental oxygen in the $NO_3$ that is tied up with the nitrogen gas. This process is commonly called denitrification. Once the bond between the nitrogen and oxygen is broken, the microorganisms consume the elemental oxygen for respiration, allowing the nitrogen to be released into the atmosphere.

During the consumption of oxygen, through respiration in the denitrification process of vessel 122 (anoxic selector zone), the microorganisms also consume portions of organic matter in the form of total suspended solids that have been shredded and solubilized in the recirculation process of vessels 126, 130 (the aerobic reactor zones #1 and #2) so as to become more easily consumed by the microorganism population.

Aqueous total solids (TS) from vessel 122 (anoxic selector zone) flows via gravity through line 162 to vessel 126 (aerobic reactor #1 zone) for continued treatment. The contents, by volume, of vessel 126 are recirculated substantially one time every two hours, using the re-circulation conduit aeration system (RCAS), which is powered by pump 164. During the recirculation procedure the contents of vessel 126, the settleable solids, become solubilized by the means of shredding through the RCAS system of the vessel. Shredding occurs as the solids within the aqueous solution are processed through the RCAS system by the toroidal vortex action of the RCAS system so as to become more easily consumed by the microorganism population. Intense aeration is also applied through the RCAS system during recirculation so that the level of dissolved oxygen is substantially maintained at a concentration of 3.5 mg/L or higher. Keeping the dissolved oxygen concentration at these levels allows the bacteria nitrosomonas and nitrobactor, residing in the microorganism colony, to oxidize ammonia ($NH_3$) into nitrite ($NO_2$) and finally into nitrate ($NO_3$) respectively. Individuals familiar in the art know this process as nitrification. With dissolved oxygen concentrations of this zone maintained at or above 3.5 mg/L, suspended solids and other organic matter are decomposed and oxidized into more stable compounds.

By using large volumes of atmospheric air delivered by the RCAS system and maintaining the dissolved oxygen at higher levels (well above 3.5 mg/L) than that which would be maintained by traditional systems (2.0 mg/L to 3.0 mg/L), along with long MCRT's, the microorganism colony will enter the biological life cycle mode known as endogenous respiration (ER). In this ER mode, the living microorganisms begin to oxidize some of their own cellular mass along with any new organic matter they absorb or adsorb from their environment. This aids in the enhancement of solids reduction while maintaining a microorganism colony through the adjustment of the food to microorganism (F/M) ratio to allow the rate of death of the microorganisms to equal the rate of growth of the microorganisms through the ER process.

Another benefit of the delivery of intense aeration within this reactor is the consumption of some phosphorous by the microorganisms.

The flow exiting vessel 126 (aerobic reactor #1 zone) exits through line 166 to vessel 130. Vessel 130 is used as an aerobic reactor #2 zone (V#3), whereby the contents, by volume, of this vessel are recirculated and intensely aerated substantially one time every two hours using the re-circulation conduit aeration system (RCAS), which is powered by pump 168. The oxidation of both dissolved and suspended organic matter occur in this vessel by maintaining a DO level of at least 3.0 mg/l. The bacteria nitrosomonas and nitrobactor, residing in the microorganism colony, will oxidize organic nitrogen into ammonia ($NH_3$) then into nitrite ($NO_2$) and finally into nitrate ($NO_3$) respectively in this vessel. A portion of the nitrate rich MLSS is recycled using pump 160 through line 132 into vessel 122 (anoxic selector zone) for nitrogen reduction through the de-nitrification process.

A flow also exits via gravity through line 170 into line 172 before entering the clarification zone flow split box 174 (SB Clar Inf) for the settling of solids from the liquid portion of the wastewater.

Note that this alternate embodiment does not include a vessel (V#4) present in the preferred embodiment. This vessel is not used until the flow increases substantially necessitating the need for an additional aerobic reactor.

As the influent from line 172 enters the clarification zone split box 174 (SB Clar Inf) the flow is split into four equal portions and sent to each of the four clarifier vessels (134, 136, 138, 140) through line 176 for vessel 134 (Clarifier #1), line 178 for vessel 136 (Clarifier #2), line 180 for vessel 138 (Clarifier #3) and line 182 for vessel 140 (clarifier #4). The flow velocity is diminished as the flow enters each of the clarifiers, allowing the solids to settle into the bottom of each of the clarifier vessels. The settling solids are then dislodged from the cone walls by using a hydraulically operated solids concentration inducer 184 for vessel 134, hydraulically operated solids concentration inducer 186 for vessel 136, hydraulically operated solids concentration inducer 188 for vessel 138, and hydraulically operated solids concentration inducer 190 for vessel 140, allowing the solids to further thicken before being removed through each of the clarifier RAS pumps (142, 144, 146 and 148) and RAS lines (150, 152, 154 and 156) be and sent to vessel 122 (anoxic reactor zone) for further treatment. Separated liquid from the clarification process exits vessel 134 (Clarifier #1) through line 192, vessel 136 (Clarifier #2) through line 194, vessel 138 (Clarifier #3) through line 196 and vessel 140 (Clarifier #4) through line 198 and join in the collection box 200 (CB Clar Eff). The clarifier effluent exits via line 202 as the final processed effluent.

Figure 7B:
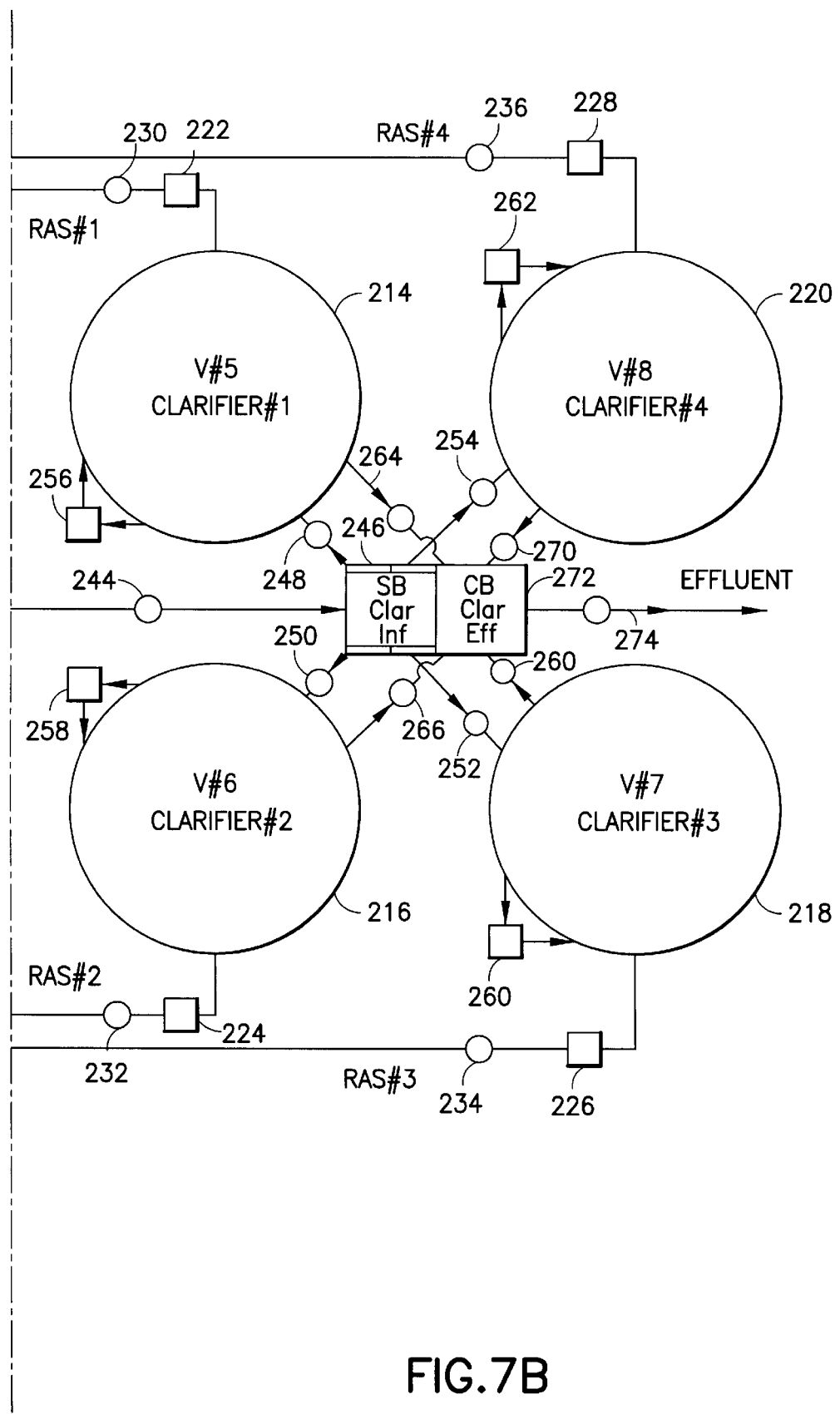
FIG. 7 is a schematic diagram of a six-vessel plant layout according to an alternate embodiment of the present invention showing specific flow characteristics of plug flow and nitrification.

Referring now to FIG. 7, another alternate apparatus embodiment of the present invention is shown which employs alternate process embodiment #2 to provide the processing characteristic of nitrification in conjunction with a plug flow type flow characteristic. This alternate apparatus embodiment is to be used with alternate process embodiment #2. Alternate process embodiment #2 of the present invention is a method of processing that is zone specific and not vessel specific.

In accordance with the present invention shown in FIG. 7, the influent, represented as typical municipal wastewater, is directed through line 210 into vessel 212, which is an aerobic reactor #1 zone. Other flows entering vessel 212 come from four clarifiers (214, 216, 218, 220) in the form of return activated sludge (RAS) through RAS pumps (222, 224, 226 and 228) and are delivered to vessel 212 through lines 230, 232, 234 and 236 respectively.

The contents, by volume, of vessel 212 (aerobic reactor #1 zone) are recirculated substantially one time every two hours, using the re-circulation conduit aeration system (RCAS), which is powered by pump 238. During the recirculation procedure the contents of vessel 212, the settleable solids, become solubilized by means of shredding through the RCAS system. Shredding occurs as the solids within the aqueous solution are processed through the RCAS system by the toroidal vortex action of the RCAS system so as to become more easily consumed by the microorganism population. Intense aeration is also applied through the RCAS system during recirculation so that the level of dissolved oxygen is substantially maintained at a concentration of 3.5 mg/L or above. Keeping the dissolved oxygen concentration at these levels allows the bacteria nitrosomonas and nitrobactor, residing in the microorganism colony, to oxidize ammonia ($NH_3$) into nitrite ($NO_2$) and finally into nitrate ($NO_3$) respectively. Individuals familiar in the art know this process as nitrification. With dissolved oxygen concentrations of this zone maintained at or above 3.5 mg/L, suspended solids and other organic matter are decomposed and oxidized into more stable compounds.

By using large volumes of atmospheric air delivered by the RCAS system and maintaining the dissolved oxygen at higher levels (well above 3.5 mg/L) than that which would be maintained by traditional systems (2.0 mg/L to 3.0 mg/L), along with long MCRT's, the microorganism colony will enter the biological life cycle mode known as Endogenous Respiration (ER). In this ER mode, the living microorganisms begin to oxidize some of their own cellular mass along with any new organic matter they absorb or adsorb from their environment. This aids in the enhancement of solids reduction while maintaining a microorganism colony through the adjustment of the food to microorganism ratio (F/M) to allow the rate of death of the microorganisms to equal the rate of growth of the microorganisms through the ER process.

Another benefit of the delivery of intense aeration within this reactor is the consumption of some phosphorous by the microorganisms.

The flow exits vessel 212 (aerobic reactor #1 zone) through line 239 into vessel 240 (aerobic reactor #2 zone-V#2) for further aerobic treatment. The contents, by volume, of vessel 240 are recirculated substantially one time every two hours, using the re-circulation conduit aeration system (RCAS), which is powered by pump 242. During recirculation of the contents of vessel 240, additional intense aeration is applied and the level of dissolved oxygen is substantially maintained at a concentration of 3.0 mg/L or above. Keeping the dissolved oxygen concentration at these levels allows microorganisms the ability to convert organic matter, including but not limited to total BOD, and also organic nitrogen first into ammonia, then nitrite and finally into nitrate. This process reduces the concentrations of total nitrogen into less harmful compounds.

The flow exits vessel 240, preferably via gravity, through line 243 into line 244 before entering clarification zone flow split box 246 (SB Clar Inf) for the settling of solids from the liquid portion of the wastewater.

Note that additional aerobic reactor vessels described in the previous embodiments are not used in this embodiment until the flow increases substantially necessitating the need for additional aerobic reactors.

As the influent from line 244 enters the clarification zone splitter box 246 (SB Clar Inf), the flow is preferably split into four equal portions and sent to each of the four clarifiers (vessels 214, 216, 218, 220) through line 248 for vessel 214 (Clarifier #1), line 250 for vessel 216 (Clarifier #2), line 252 for vessel 218 (Clarifier #3) and line 254 for vessel 220 (Clarifier #4). The flow velocity is diminished as the flow enters each of the clarifiers, allowing the solids to settle into the bottom of each of the clarifiers. The settling solids are then dislodged from the walls by using a hydraulically operated solids concentration inducer 256 for vessel 214, hydraulically operated solids concentration inducer 258 for vessel 216, hydraulically operated solids concentration inducer 260 for vessel 218 and hydraulically operated solids concentration inducer 262 for vessel 220, allowing the solids to further thicken before being removed through each of the clarifier PAS pumps (222, 224, 226 and 228) and RAS lines (230, 232, 234 and 236) and sent to vessel 212 (aerobic reactor #1 zone) for further treatment. Separated liquid from the clarification process, exits vessel 214 through line 264, vessel 216 through line 266, vessel 218 through line 268 and vessel 220 through line 270 and joins in the collection box 272 (CB Clar Eff). The clarifier effluent exits through line 274 as the final processed effluent.

Figures 8, 8A:
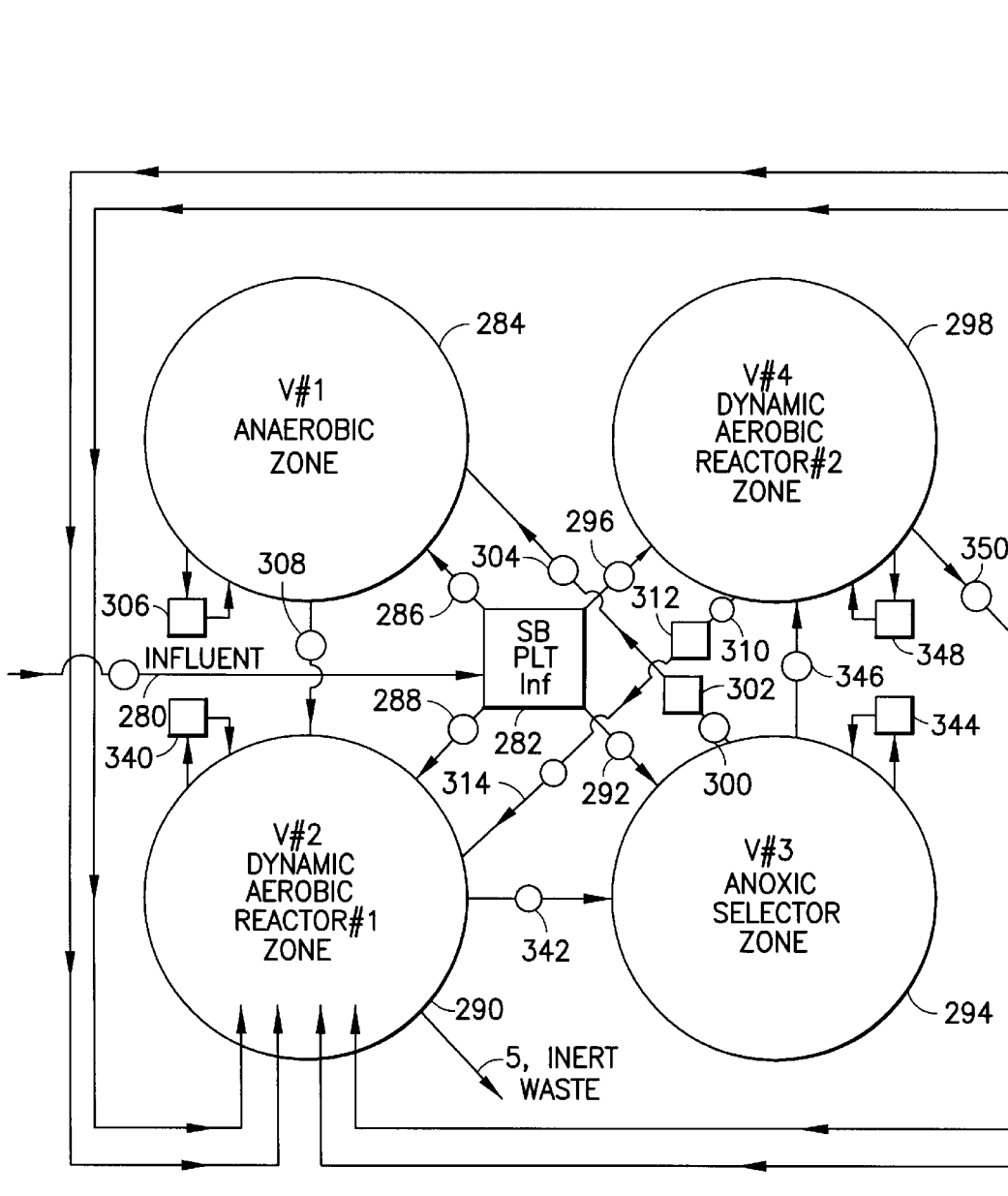
FIG. 8 is a schematic diagram of an eight-vessel plant layout according to an alternate embodiment of the present invention showing specific flow characteristics of step feed, nitrification, de-nitrification and phosphorous reduction.
Figure 8B:
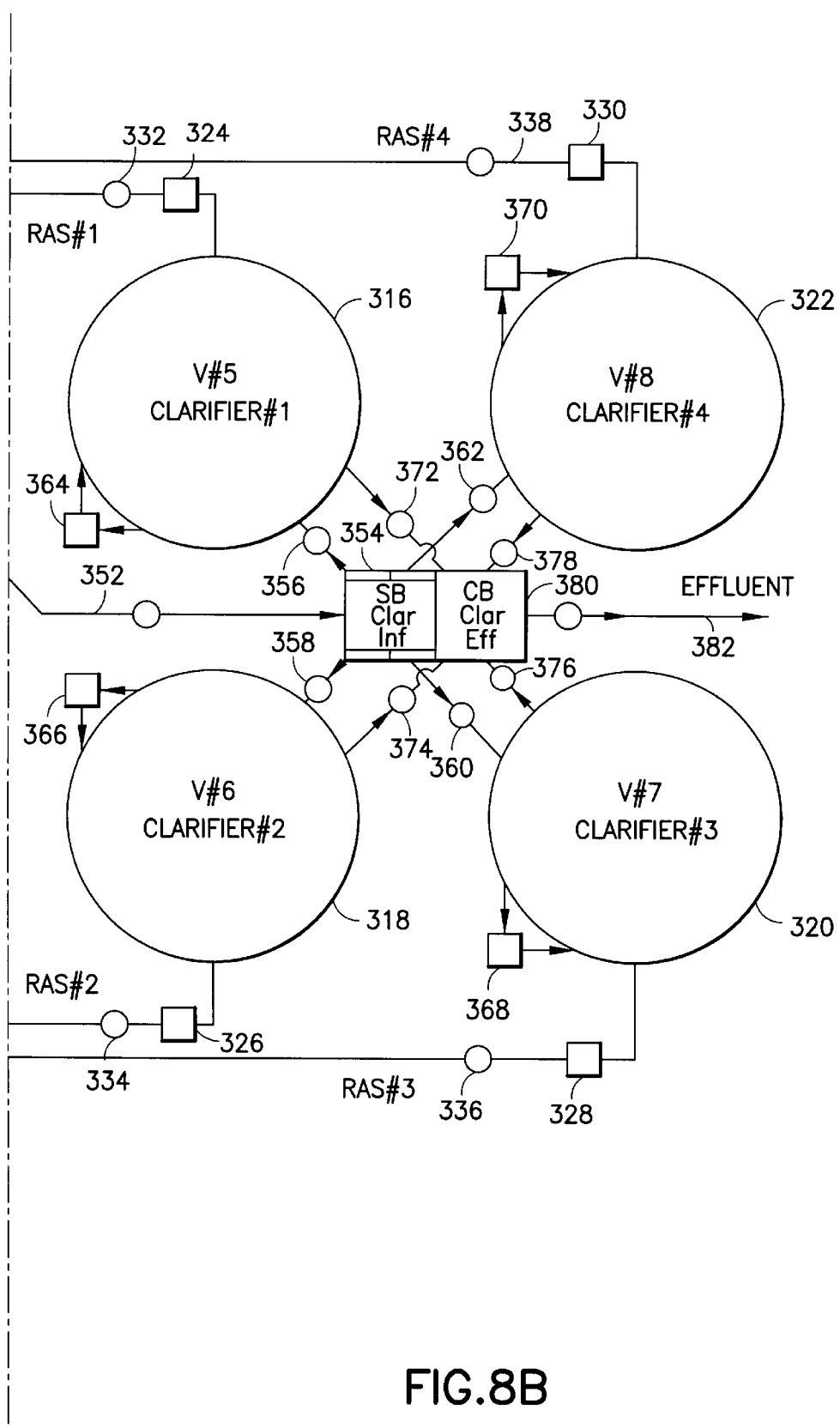

Referring now to FIG. 8, another alternate embodiment of the present invention is shown which utilizes the alternate processing embodiment #3 of the present invention to provide the processing characteristics of nitrification, de-nitrification and phosphorous reduction in conjunction with using a step feed flow type flow characteristic, giving improved operational flexibility. The use of this alternate embodiment in conjunction with alternate processing embodiment #3 would be preferable when there is a change in feed preferences or the parameters change and the effluent quality needs to be improved. This would also hold true for influent nutrient load variations while the influent flow characteristics remain the same. Alternate processing embodiment #3 of the present invention is a method of processing that is zone specific and not vessel specific.

For alternate process embodiment #3, the influent is a high strength waste, which could contain a high concentration of $NH_3$, with a high TSS concentration and a high total BOD concentration, while requiring nitrification, de-nitrification and phosphorous reduction as might need to be demonstrated by the influent concentrations of an industrial strength waste stream.

In the alternate embodiment shown in FIG. 8, influent containing suspended solids and biodegradable organic substances passes through line 280 to splitter box 282 (SB PLT Inf), where it is diverted, sending 60% of the total influent flow into vessel 284 (anaerobic conditioner zone-V #1) via line 286, 30% of the total influent flow through line 288 into the vessel 290 (aerobic reactor #1 zone-V #2) and 5% being diverted through line 292 to vessel 294 (anoxic selector zone-V #3) while the other 5% is diverted thorough line 296 to vessel 298 (aerobic reactor #2 zone-V #4).

Vessel 284 receives 60% of the plant influent flow and a flow from vessel 294 through line 300 using pump 302 and line 304. The contents, by volume, of vessel 284 are recirculated substantially one time every two hours using pump 306.

Vessel 284 (anaerobic conditioner zone) begins the first stage of luxury phosphorous uptake, which is biological phosphorous (Bio-P) release. Luxury phosphorous uptake is accomplished by maintaining an oxygen deficient state within vessel 284. Dissolved oxygen levels are maintained at or below 0.10 mg/L causing Bio-P release by the microorganisms. While this Bio-P release creates a temporary increase of phosphorous, it also forces the microorganisms to metabolize greater amounts of phosphorous during a later process. The contents of this zone are able to maintain low dissolved oxygen levels by the controlled introduction low oxygen level MLSS from vessel 294 (anoxic selector zone) from line 300 through pump 302 and through line 304 into vessel 284. The flow then continues on through line 308 to vessel 290 (aerobic reactor #1 zone) for treatment.

As mentioned above, vessel 290 receives 30% of the plant influent flow through line 288 and is used as aerobic reactor #1 zone. Another flow that enters this vessel comes from vessel 298 through line 310 using pump 312 then through line 314 discharging into vessel 290. The flow from vessel 298 (aerobic reactor #2 zone) is in the form of MLSS recycle. Still another flow entering vessel 290 comes from each of the four clarifier vessels (316, 318, 320, 322) in the form of return activated sludge (RAS) through the RAS pumps 324, 326, 328 and 330, and then finally through the lines 332, 334, 336 and 338 respectively. The contents, by volume, of vessel 290 are recirculated substantially one time every two hours, using the re-circulation conduit aeration system (RCAS), which is powered by pump 340. During the recirculation procedure the contents of vessel 284, the settleable solids, become solubilized by means of shredding as they pass through the RCAS system of the vessel. The shredding occurs as the solids within the aqueous solution are processed through the RCAS system by the toroidal vortex action of the RCAS system so as to become more easily consumed by the microorganism population. Intense aeration is also applied during the recirculation procedure so that the level of dissolved oxygen is substantially maintained at a concentration of 3.5 mg/L or above. Keeping the dissolved oxygen concentration at these levels allows the bacteria nitrosomonas and nitrobactor, residing in the microorganism colony, to oxidize ammonia ($NH_3$) into nitrite ($NO_2$) and finally into nitrate ($NO_3$) respectively. With dissolved oxygen concentrations in this zone at or above 3.5 mg/L, suspended solids and other organic matter are decomposed and oxidized into more stable compounds. By using large volumes of atmospheric air delivered by the RCAS system and maintaining the dissolved oxygen at higher levels (above 3.0 mg/L) than that which would be maintained by traditional aeration systems, along with long MCRT's, the microorganism colony will enter the biological life cycle mode known as endogenous respiration (ER). In this ER mode, the living microorganisms begin to oxidize some of their own cellular mass along with any new organic matter they absorb or adsorb from their environment. This aids in the enhancement of solids reduction while maintaining a microorganism colony through the adjustment of the food to microorganism (F/M) ratio to allow the rate of death of the microorganism colony to equal the rate of growth of the microorganism colony through the ER process.

Another benefit of the delivery of intense aeration within this reactor is the enhanced consumption of large amounts of phosphorous by the microorganisms. The amount of phosphorous taken up by the microorganisms is in greater amounts than the amount of phosphorous the microorganisms released in vessel 284 (anaerobic conditioner zone) as described above. The microorganisms then use this newly acquired phosphorous for new cell wall development and other energy needs.

The flow then exits vessel 290 (aerobic reactor #1 zone) through line 342 into vessel 294 (anoxic selector zone) for further processing. In addition to the flow through line 342 from vessel 290, vessel 294 also receives an additional flow of 5% of the plant influent through line 292. The contents, by volume, of this vessel are recirculated substantially one time every two hours by pump 344. This anoxic selector zone receives elemental oxygen attached to nitrogen molecules in the form of nitrate nitrogen ($NO_3$) and nitrite nitrogen ($NO_2$), which were derived mostly from the ammonia conversion process known as nitrification occurring within vessel 290 (the aerobic reactor #1 zone). The amount of dissolved oxygen (DO) in vessel 294 is maintained in the range of 0.3 mg/l to 0.5 mg/l. The microorganisms contained within the wastewater of vessel 294 look for oxygen to respirate. With little DO available, the microorganisms are forced to use the elemental oxygen in the $NO_3$ that is tied up with nitrogen. This process is commonly called denitrification. Once the bond between the nitrogen and oxygen is broken, the microorganisms consume the elemental oxygen for respiration, allowing the nitrogen to be released into the atmosphere. The microorganisms use this oxygen for the necessary respiration in order to continue consumption of organic matter still within the wastewater.

During this anoxic condition, a natural release of phosphorous by the microorganisms occurs, as a way to conserve energy during the time of low dissolved oxygen availability, but in lesser quantities than occur in vessel 284 (anaerobic conditioner zone). While this creates a temporary, but slight, increase of phosphorous, it also forces the microorganisms to metabolize greater amounts of phosphorous in a later process. The effluent from this process would continue through line 346 on to vessel 298 (aerobic reactor #2 zone) for further treatment.

In addition to the flow which enters the vessel 298 (aerobic reactor #2 zone) through line 346, a flow of 5% of the plant influent is provided into vessel 298 through line 296. The contents, by volume, of this zone are recirculated and intensely aerated substantially one time every two hours using the re-circulation conduit aeration system (RCAS), which is powered by pump 348. The oxidation of both dissolved and suspended organic matter occur in this vessel by maintaining a dissolved oxygen of at least 3.5 mg/l. The bacteria nitrosomonas and nitrobactor, residing in the microorganism colony, will oxidize organic nitrogen into ammonia ($NH_3$) then into nitrite ($NO_2$) and finally into nitrate ($NO_3$) respectively in this vessel. As the aqueous solution containing the microorganism colony of vessel 298 is aerated and the dissolved oxygen increases, the microorganisms will also begin to consume phosphorous in larger quantities than is necessary for them to sustain life. The amount of phosphorous consumed far exceeds the amount of phosphorous the microorganisms released into the aqueous solution while being processed within vessels 284 and 294 (anaerobic conditioner zone and anoxic selector zone). This is what is referred to in the industry as "luxury phosphorous uptake". Portions of the MLSS from vessel 298 are recycled to vessel 290 (aerobic reactor #1 zone), through line 310, using pump 312 and finally discharging through line 314, while the effluent continues on through line 350 and into line 352 before entering the clarification zone flow splitter box 354 (SB Clar Inf).

As the influent from line 352 enters the clarification zones splitter box 354, the flow is preferably split into four equal portions and sent to each of the four clarifiers (316, 318, 320, 322) through line 356 for vessel 316 (Clarifier #1), line 358 for vessel 318 (Clarifier #2), line 360 for vessel 320 (Clarifier #3) and line 362 for vessel 322 (Clarifier #4). The flow velocity is diminished as the flow enters each of the clarifiers, allowing the solids to settle into the bottom of each of the clarifiers. The settling solids are then dislodged from the walls of each clarifier vessel by using a hydraulically operated solids concentration inducer 364 for vessel 316 (Clarifier #1), hydraulically operated solids concentration inducer 366 for vessel 318 (Clarifier #2), hydraulically operated solids concentration inducer 368 for vessel 320, (Clarifier #3), hydraulically operated solids concentration inducer 370 for vessel 322 (Clarifier #4), allowing the solids to further thicken before being removed through each of the clarifier RAS pumps (324, 326, 328 and 330) and RAS lines (332, 334, 336 and 338) and sent to vessel 290 (aerobic reactor #1 zone) for further treatment. Separated liquid from the clarification process, exits vessel 316 (Clarifier #1) through line 372, vessel 318 (Clarifier #2) through line 374, vessel 320 (Clarifier #3) through line 376 and vessel 322 (Clarifier # 4) through line 378, and are combined in collection box 380 (CB Clar Eff). The clarifier effluent exits through line 382 as the final processed effluent.

Figure 9B:
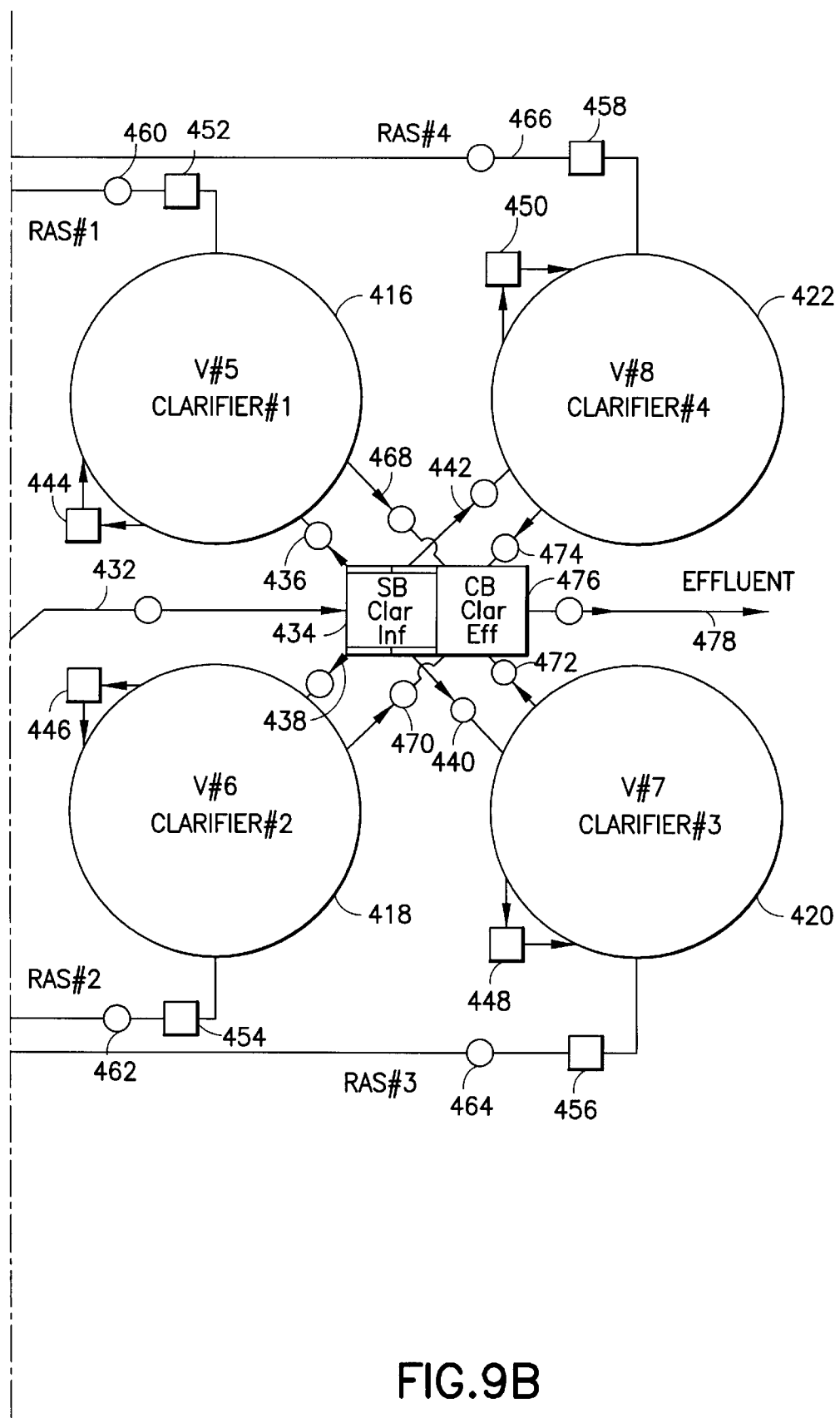
FIG. 9 is a schematic diagram of a seven-vessel plant layout according to an alternate embodiment of the present invention showing specific flow characteristics of step feed, nitrification and de-nitrification.

Referring now to FIG. 9, another alternate embodiment of the present invention is shown which utilizes an alternate process embodiment #4 to provide the processing characteristics of nitrification and de-nitrification in conjunction with using a step feed flow type flow characteristic. Alternate processing embodiment #4 of the present invention is a method of processing that is zone specific and not vessel specific.

For alternate process embodiment #4, the influent is a high strength waste, which could contain a high $NH_3$ concentration, with a high TSS concentration and a high total BOD concentration, while requiring nitrification and de-nitrification for a total nitrogen reduction as might need to be demonstrated by the influent concentrations of an industrial strength waste stream.

Referring now to FIG. 9, an alternate embodiment of the present invention is shown wherein influent containing suspended solids and biodegradable organic substances, is passed through line 390 to splitter box 392 (SB PLT Inf), where it is diverted, sending 75% of the total influent flow through line 394 into vessel 396 (anoxic selector zone—V #1), 15% of the total influent flow is diverted by splitter box 392 through line 398 into the vessel 400 (aerobic reactor #1 zone V #2) and the remaining 10% of the total influent flow is diverted by splitter box 392 through line 402 to vessel 404 (aerobic reactor #2 zone V #3).

Vessel 396 (V #1) is used as an anoxic selector zone receiving 75% of the influent flow through line 394. An additional flow in the form of MLSS Recycle is received from vessel 404 (V #3) through line 406, pump 408 and line 410. Dissolved oxygen in vessel 396 is kept at a level below 0.5 mg/L for denitrification. Vessel 396 is rich in aerobic microorganisms and combined oxygen in the form of nitrate received from vessel 404. With the levels of dissolved oxygen in the 0.5 mg/L range, the aerobic microorganisms are forced to use nitrate for respiration thus being used for the purpose of denitrification of the wastewater prior to continuing on to further processing.

The influent flow received through line 390 is rich in nutrients, while the flow received through line 410 from vessel 404 is rich in nitrate and microorganisms. Therefore, in step feeding a portion of the influent flow into this vessel, the organic load entering the plant can be increased without any alterations to the current design of the preferred apparatus embodiment of the present invention. The contents, by volume of vessel 396 are recirculated one time every two hours by pump 412. Flow exits vessel 396 through line 414 into vessel 400 for further treatment.

Vessel 400 (V #2) is used as an aerobic reactor #1 zone, receiving 15% of the total influent flow through line 398 and flow from vessel 396 through line 414. Additional flow comes from each of the clarifiers (416, 418, 420, 422) in the form of return activated sludge (RAS). The contents, by volume, of this vessel are recirculated substantially one time every two hours, using the re-circulation conduit aeration system (RCAS), which is powered by pump "424". During the recirculation procedure the contents of vessel 400, the settleable solids, become solubilized by means of shredding as they pass through the RCAS system of the zone. The shredding occurs as the solids within the aqueous solution are processed through the RCAS system by the toroidal vortex action of the RCAS system so as to become more easily consumed by the microorganism population. Intense aeration is also applied during the recirculation procedure so that the level of dissolved oxygen is substantially maintained at a concentration of 3.5 mg/L or above. Keeping the dissolved oxygen concentration at these levels allows the bacteria nitrosomonas and nitrobactor, residing in the microorganism colony, to oxidize ammonia ($NH_3$) into nitrite ($NO_2$) and finally into nitrate ($NO_3$) respectively. Individuals familiar in the art know this process as nitrification.

With dissolved oxygen concentrations in this zone at or above 3.5 mg/L, suspended solids and other organic matter are decomposed and oxidized into more stable compounds. This initial decomposition of organic matter, which is the breaking down of organic matter from complex forms to more simple forms, mainly through the digestion action of aerobic bacteria.

By using large volumes of atmospheric air delivered by the RCAS system and maintaining the dissolved oxygen at higher levels (above 3.5 mg/L) than that which would be maintained by traditional aeration systems, along with long MCRT's, the microorganism colony will enter the biological life cycle mode known as endogenous respiration (ER). In this ER mode, the living microorganisms begin to oxidize some of their own cellular mass along with any new organic matter they absorb or adsorb from their environment. This aids in the enhancement of solids reduction while maintaining a microorganism colony through the adjustment of the food to microorganism (F/M) ratio to allow the rate of death of the microorganism colony to equal the rate of growth of the microorganism colony through the ER process. The flow exits vessel 400 (aerobic reactor #1 zone) through line 426 to vessel 404 (aerobic reactor #2 zone V #3). An additional 10% of the influent flow enters vessel 404 (V #3) from the splitter box 392 (SB PLT Inf) through line 402.

The contents, by volume, of vessel 404 is recirculated and intensely aerated substantially one time every two hours using the re-circulation conduit aeration system (RCAS), which is powered by pump 428. During the recirculation of the contents of vessel 404, the settleable solids become further solubilized by the means of shredding through the recirculation pumping of the zone so as to become further consumed by the microorganism population. Intense aeration is also applied during recirculation so that the level of dissolved oxygen is substantially maintained at a concentration of 3.0 mg/L or above. The bacteria nitrosomonas and nitrobactor, residing in the microorganism colony, will oxidize organic nitrogen into ammonia ($NH_3$) then into nitrite ($NO_2$) and finally into Nitrate ($NO_3$) respectively in this zone.

Keeping the dissolved oxygen concentration at levels above 3.5 mg/L allows the microorganism colony the ability to convert organic matter, including but not limited to additional total BOD, along with additional organic nitrogen first into ammonia, then nitrite and finally into nitrate and other less harmful compounds. This process reduces the concentrations of total nitrogen released into the aquatic environment through the denitrification process. The dissolved oxygen in vessel 404 (aerobic reactor #2 zone) maintains a concentration of at least 3.5 mg/L to ensure complete decomposition and oxidation of the organic nutrients within the waste stream.

Portions of the contents of vessel 404 is recycled to vessel 396 (anoxic selector zone) in the form of MLSS recycle in line 406 using pump 408 and finally through in line 410. The MLSS, which is rich in aerobic microorganisms and combined oxygen, is denitrified in vessel 396 prior to returning to the vessels 400, 404 for continued treatment of remaining nutrients.

The Effluent from this processes exits vessel 404 through line 430 into line 432 for the clarification process. As the influent from line 432 enters the clarification zone splitter box 434 (SB Clar Inf) the flow is preferably split into four equal portions and sent to each of the four clarifiers (416, 418, 420, 422) through line 436 for vessel 416 (clarifier #1), line 438 for vessel 418 (clarifier #2), line 440 for vessel 420 (clarifier #3) and line 442 for vessel 422 (clarifier #4). The flow velocity is diminished as the flow enters each of the clarifiers, allowing the solids to settle into the bottom of each of the clarifiers. The settling solids are then dislodged from off of the cone walls by using a hydraulically operated solids concentration inducer 444 for vessel 416, hydraulically operated solids concentration inducer 446 for vessel 418, hydraulically operated solids concentration inducer 448 for vessel 420, hydraulically operated solids concentration inducer 450 for vessel 422 allowing the solids to further thicken before being removed through each of the clarifiers RAS pumps (452, 454, 456, 458) and RAS lines (460, 462, 464, 466) and sent to vessel 400 (aerobic reactor #1 zone) for further treatment. Separated liquid from the clarification process, exits vessel 416 through line 468, vessel 418 through line 470, vessel 420 through line 472 and vessel 422 through line 474 and join in the collection box 476 (CB Clar Eff). This clarifier effluent exits through line 478 as the final processed effluent.

Figure 10B:
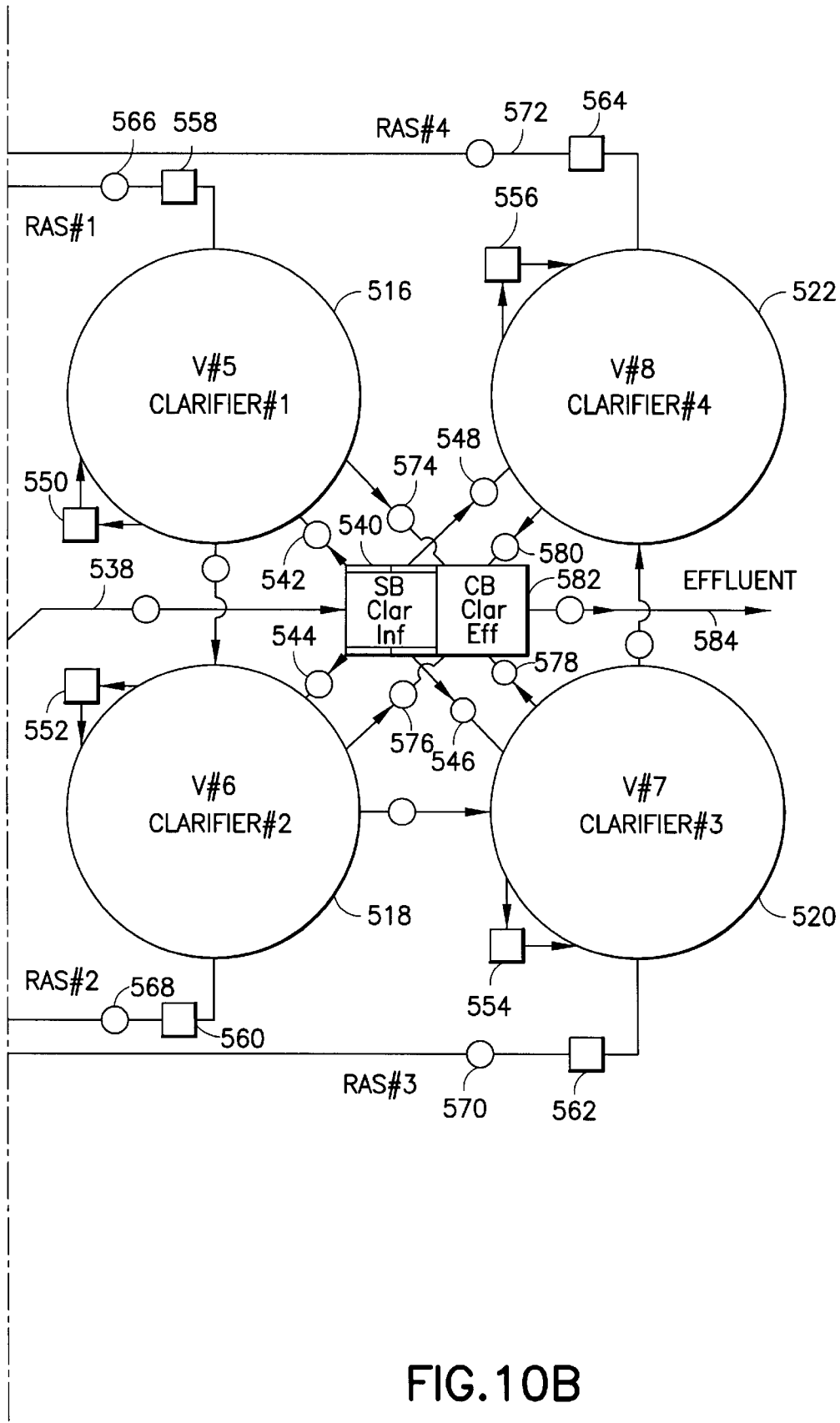
FIG. 10 is a schematic diagram of a seven-vessel plant layout according to an alternate embodiment of the present invention showing specific flow characteristics of step feed and nitrification.

The alternate embodiment as depicted in FIG. 10 shows the unutilized lines, vessels and equipment of the Preferred Apparatus Embodiment removed. However, all the utilized lines, vessels and equipment required to process the wastewater flow using alternate process embodiment #4 are shown.

Referring now to FIG. 10, an alternate apparatus embodiment of the present invention is shown which utilizes the alternate process embodiment #5 of the present invention to provide the processing characteristics of nitrification in conjunction with using a step feed flow type flow characteristic. Alternate processing embodiment #5 of the present invention is a method of processing that is zone specific and not vessel specific.

For alternate process embodiment #5, the influent is represented as a high strength waste which could contain a high $NH_3$ concentration, with a high TSS concentration and a high total BOD concentration, while requiring nitrification as might need to be demonstrated by the influent concentrations of an industrial strength waste stream.

In the present alternate embodiment of FIG. 10 the influent containing suspended solids and biodegradable organic substances passes through line 500 to splitter box 502 (SB PLT Inf), where it is diverted. 50% of the total influent flow is provided into the vessel 504 (aerobic reactor #1 zone-V#1) via line 506, 30% of the total influent flow is diverted through the splitter box 502 (SB PLT Inf) through line 508 into the vessel 510 (aerobic reactor #2 zone-V#2) and the remaining 20% of the influent is diverted by the splitter box 502 (SB PLT Inf) through line 512 to vessel 532 (aerobic reactor #3 zone-V#3).

As stated above, the vessel 504 is used as aerobic reactor #1 zone, receiving 50% of the total influent flow. Additional flows come from each of the clarifiers (516, 518, 520, 522) in the form of return activated sludge (RAS). The contents, by volume, of vessel 504 are recirculated substantially one time every two hours, using the re-circulation conduit aeration system (RCAS), which is powered by pump 524. During the recirculation procedure the contents of the vessel 504, the settleable solids, become solubilized by means of shredding as they pass through the RCAS system of the vessel. The shredding occurs as the solids within the aqueous solution are processed through the RCAS system by the toroidal vortex action of the RCAS system so as to become more easily consumed by the microorganism population. Intense aeration is also applied during the recirculation procedure so that the level of dissolved oxygen is substantially maintained at a concentration of 3.5 mg/L or above. Keeping the dissolved oxygen concentration at these levels allows the bacteria nitrosomonas and nitrobactor, residing in the microorganism colony, to oxidize ammonia ($NH_3$) into nitrite ($NO_2$) and finally into nitrate ($NO_3$) respectively. Individuals familiar in the art know this process as nitrification.

With dissolved oxygen concentration levels in this zone at or above 3.5 mg/L, suspended solids and other organic matter, including but not limited to carbonaceous BOD, are decomposed and oxidized into more stable compounds. This initial decomposition of organic matter, which is the breaking down of organic matter from complex forms to simpler forms, occurs mainly through the digestion action of aerobic bacteria.

By using large volumes of atmospheric air delivered by the RCAS system and maintaining the dissolved oxygen at higher levels (above 3.5 mg/L) than that which would be maintained by traditional aeration systems, along with long MCRT's, the microorganism colony will enter the biological life cycle mode known as Endogenous Respiration (ER). In this ER mode, the living microorganisms begin to oxidize some of their own cellular mass along with any new organic matter they absorb or adsorb from their environment. This aids in the enhancement of solids reduction while maintaining a colony through adjusting the food to microorganism ratio to allow the rate of death of the microorganisms to equal the rate of growth of the microorganisms through ER.

Another benefit of the intense aeration within this vessel is the consumption of some phosphorous by the microorganisms.

The flow exits vessel 504 (the aerobic reactor #1 zone) through line 526 and is provided into vessel 510 for further aerobic treatment.

The flow enters vessel 510 from vessel 504 along with 30% of the plant influent flow which is provided by line 508. Vessel 510 is used as an aerobic reactor #2 zone. The contents, by volume, of this vessel are recirculated substantially one time every two hours, using the re-circulation conduit aeration system (RCAS), which is powered by pump 528. During the recirculation procedure the contents of vessel 510 (the aerobic reactor #2 zone), the settleable solids, become solubilized by means of shredding as they pass through the RCAS. Another benefit of the RCAS system of vessel 510 (aerobic reactor #2 zone) is additional intense aeration being applied and the level of dissolved oxygen is substantially maintained at a concentration of 3.5 mg/L or above. Keeping the dissolved oxygen concentration at these levels gives the microorganism colony the ability to convert organic matter, including but not limited to total BOD. Organic nitrogen is also converted, first into ammonia, then nitrite and finally into nitrate. This process reduces the concentrations of total nitrogen and total BOD into less harmful compounds. Once again, microorganisms consume additional amounts of phosphorous reducing the phosphorous concentrations in the system.

The flow exits vessel 510 (aerobic reactor #2 zone) through line 530 and is provided into vessel 532 (aerobic reactor #3 zone). Flow also enters vessel 532 from the splitter box 502 (10% of the plant influent flow via line 512). The contents, by volume, of vessel 532 are recirculated substantially one time every two hours, using the re-circulation conduit aeration system (RCAS), which is powered by pump 534. During the recirculation procedure the contents of vessel 532, the settleable solids, become solubilized by means of shredding as they pass through the RCAS system. Another benefit of the RCAS system of vessel 532 is additional intense aeration being applied and the level of dissolved oxygen is substantially maintained at a concentration of 3.5 mg/L or above. Keeping the dissolved oxygen concentration at these levels gives the microorganism colony the ability to convert organic matter, including but not limited to total BOD. This process reduces the concentrations total BOD into less harmful compounds. Once again, unavoidably, the microorganisms consume additional amounts of phosphorous.

The flow exits vessel 532 via gravity through line 536 into line 538 before entering the clarification zone flow splitter box 540 (SB Clar Inf.) for the settling of the solids portion from the liquid portion of the wastewater.

As the influent from line 538 enters the clarification zone splitter box 540 (SB Clar Inf) the flow is preferably split into four equal portions and sent to each of the four clarifiers (516, 518, 520, 522) through line 542 for vessel 516 (Clarifier #1), line 544 for vessel 518 (Clarifier #2), line 546 for vessel 520 (Clarifier #3) and line 548 for vessel 522 (Clarifier #4). The flow velocity is diminished as the flow enters each of the clarifier vessels, allowing the solids to settle into the bottom of each of the clarifier vessels. The settling solids are then dislodged from the cone walls by hydraulically operated solids concentration inducer 550 for vessel 516 (Clarifier #1), hydraulically operated solids concentration inducer 552 for vessel 518 (Clarifier #2), hydraulically operated solids concentration inducer 554 for vessel 520 (Clarifier #3) and hydraulically operated solids concentration inducer 556 for vessel 522 (Clarifier #4), allowing the solids to further thicken before being removed through each of the clarifier RAS pumps (558, 560, 562, 564) and RAS lines (566, 568, 570, 572) and sent to vessel 504 (aerobic reactor #1 zone) for further treatment. Separated liquid from the clarification process, exits vessel 516 through line 574, vessel 518 through line 576, vessel 520 through line 578 and vessel 522 through line 580 and join in the collection box 582 (CB Clar Eff). The clarifier effluent exits through line 584 as the final processed effluent.

Re-Circulation Aeration System (RCAS)

Figure 15:
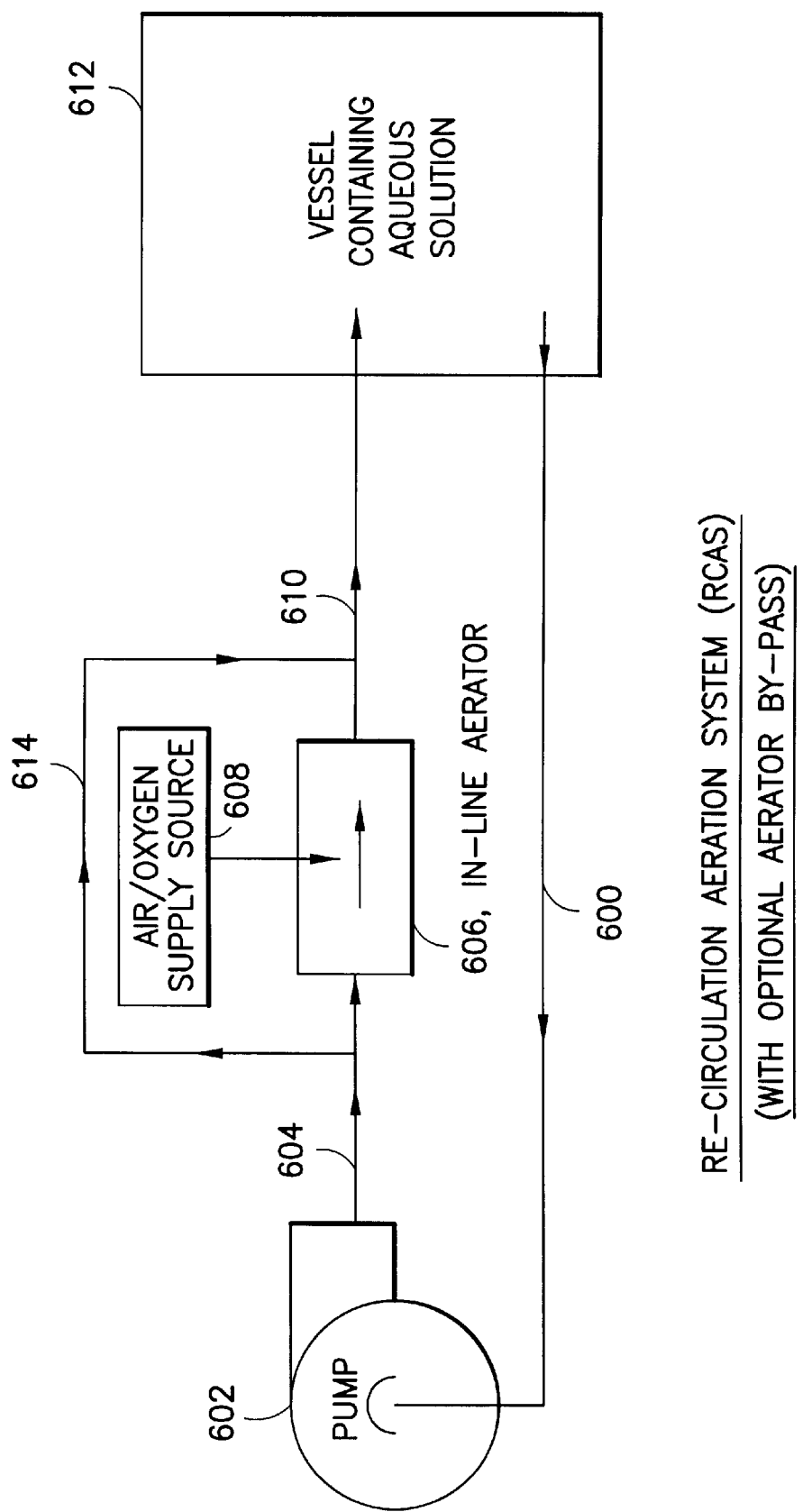
FIG. 15 is a schematic illustration of the Re-Circulation Aeration System (RCAS) with an optional aerator by-pass.

Referring now to FIG. 15, one of the main components of the enhanced solids reduction wastewater treatment process of the present invention is shown. The RCAS is an efficient means of shredding, mixing, agitating, circulating, aerating, homogenizing and saturating the wastewater, with each of the aforementioned employed, as the demand requires. The RCAS is a type of conduit conveyance system that takes the contents of a vessel through a mechanical pump creating a high velocity flow of the vessel contents through a differential injector, which is preferably located on the exterior portion of each vessel for ease of maintenance. The air passing through the differential injector is injected into the wastewater treatment flow which is then returned back to the vessel. As the contents of the vessel pass through the RCAS system, a shredding of organic solids occurs such that the organic solids become solubilized and homogenized for easier digestion by microorganisms. Another benefit of the RCAS system is the destruction of pathogenic microorganisms by the toroidal vortex action at the discharge of the device (in line injector/mixer/aerator) creating agitation.

The RCAS includes a suction side conduit 600 coupled to the suction side of a pump 602, a discharge side conduit 604 that contains within it an in-line injector/mixer/aerator 606 such as the one described in U.S. Pat. No. 5,893,641, (the entire disclosure of which is incorporated herein by reference), an air/oxygen supply source conduit 608 and a delivery conduit 610. The pump 602 evacuates the wastewater from the vessel 612 containing aqueous solution delivering it through the conduit 600 to the aerator 606 for mixing, aeration and agitation. The wastewater is then returned to vessel 612 via conduit 610 where the excess atmospheric air that is entrapped within the bubbles traveling along with the wastewater within conduit 610 are released causing a secondary aeration, agitation and mixing effect to the wastewater contained within vessel 612. During the wastewater's travel, it is passed through an aerator 606, as shown in FIG. 15, where atmospheric air is drawn in by vacuum (venturi effect). The wastewater and atmospheric air are mixed at the discharge of the in-line aerator 608 and while they are encapsulated within the conduit 610, saturating the wastewater with oxygen. The aerator 606 may be the aerator as shown in U.S. Pat. No. 5,893,641 or any other aerator device of similar performance, such as any of the aerators shown in pending PCT Application Serial No. PCT/US01/11936, or U.S. application Ser. No. 09/547,447, the entire disclosures of which are incorporated herein by reference.

The oxygen saturated mixed wastewater travels through the conduit 610, and then is discharged back into the vessel 612. Carried along with the saturated wastewater within the conduit 610 are excess bubbles of atmospheric air that were injected into the wastewater stream, over and above the quantity required for the complete saturation of the wastewater traveling within the conduit 610. When the excess air is discharged from the conduit 610 into the vessel, along with the saturated wastewater, the excess air becomes a source of additional air delivered to the contents of vessel 612, and thereby furthering the aeration process of the entire contents of the vessel by providing additional oxygen supply to be absorbed by the not as yet re-circulated contents of the vessel.

An alternate flow of some or all of the wastewater through conduit 614 would enable additional controls to be available for diminishing the aeration while continuing with the mixing capabilities of the system.

Under certain conditions, induced pressures can be produced by adding resistance to the delivery conduits with restrictions or friction losses (i.e. conduit size reductions) fittings, valves, nozzles, etc.

For certain conditions regarding conduit 610, such as in the case of specific conduit size requirements, specific conduit length requirements, where the installation of the RCAS system is limited to confined parameters that do not meet the design requirements for the aeration or mixing process, induced pressures can be produced within the conduit 610 that would provide compensation to the environment within conduit 610. These compensations in the design of conduit 610 would equal characteristics of a conduit of different diameter, length or desired pressure contained within such conduit so as to deliver the specific aeration criteria desired. The compensations that would be contemplated are represented by the addition of valves, fittings, in-line mixers, a reduction or increase of conduit diameter, or the inclusion of a restriction, such as an orifice, in the conduit 610.

Through the re-circulation events, oxygen transfer abilities and creation of micro-bubbles by the RCAS system, a reduction in power consumption is achieved over traditional aeration systems, which use blowers and compressors. These efficiencies of the RCAS allow the present invention to use a smaller footprint for total plant design.

Bubbles

Aeration of an aqueous solution is important to aerobic digestion of biological nutrients. The smaller the bubble, the greater the aerobic digestion activity of the bacteria and other microorganisms, due to the respiration of easily accessible dissolved oxygen. With these two facts in mind, the best possible forms of bubbles to deliver are micro-bubbles. These are provided by the RCAS System of the present invention.

Oxidative biological and chemical processes in aqueous environments are limited by the low solubility of oxygen in water. This physical limitation as defined by Henry's Law states that when the temperature is kept constant, the amount of a gas that dissolves into a liquid is proportional to the pressure exerted by the gas on the liquid. In the use of the RCAS system, the pressure of the gas and liquid are increased beyond atmospheric pressure so as to increase the amount of gaseous oxygen able to be dissolved in wastewater.

The solubility of oxygen in pure water is only about 10 parts per million (ppm) at ambient temperatures and at one atmosphere pressure.

For most aerobic bioprocesses, dissolved oxygen is quickly consumed so that replenishing it becomes the factor that limits the rate of the process. Therefore, a most critical component of a bioprocess design is the means for the mass transfer of oxygen into the liquid phase of the process. For an actively respiring culture of bacteria, oxygen in the liquid medium must be replaced as needed at a sufficient rate to keep up with the oxygen demand of the bacteria. With the RCAS system used in the present invention, the dissolved oxygen is replenished at a rate that exceeds the oxygen demand of the bacteria.

Water is typically aerated by providing contact surfaces between the gaseous and liquid phases. This can be done either by introducing a source of oxygen into a bulk liquid phase or by flowing dispersed water through a bulk gaseous (air) phases. Regardless of whether the gaseous or liquid phases dominate the oxygenation process, the mass transfer of oxygen, or other gas, is accomplished by introducing gas bubbles into the liquid phase. The efficiency of gas-liquid mass transfer depends to a large extent on the characteristics of the bubbles. Bubble behavior strongly affects the following mass-transfer parameters of:

(a) Transfer of oxygen from the interior of the bubble to the gas-liquid interface;

(b) Movement of oxygen across the gas-liquid interface; and (c) Diffusion of oxygen through the relatively stagnant liquid film surrounding the bubble.

It is generally agreed that a most important property of air bubbles in a bioprocess is their size. For a given volume of gas, more interfacial area between the gas phase and liquid phase is provided if the gas is dispersed into many small bubbles rather than a few large ones. Small bubbles, 1–3 mm, have been shown to have the following beneficial properties not shared by larger bubbles.

Small gas bubbles rise more slowly than large bubbles, allowing more time for a gas to dissolve in the aqueous phase. This property is referred to as gas hold-up, concentrations of oxygen in water can be more than doubled beyond Henry's Law solubility limits. For example, after a saturation limit of 10 ppm oxygen is attained, at least another 10 ppm oxygen within small bubbles would be available to replenish the oxygen.

Once a bubble has been formed, the major barrier for oxygen transfer to the liquid phase is the liquid film surrounding the bubble. Biochemical engineering studies have concluded that transport through this film becomes the rate-limiting step in the complete process, and controls the overall mass-transfer rate. However, as bubbles become smaller, this liquid film thickness decreases so that the transfer of gas into the bulk liquid phase is no longer impeded.

When air is introduced by means of a vacuum, as with the RCAS system, at a velocity and volume equal to the flow of an aqueous solution through a pump, the formation of micro bubbles occurs. These micro bubbles have the size necessary to remain in suspension through the action of gas hold-up, thus increasing the dissolved oxygen concentration beyond the needs of the bacteria.

Uniqueness of the Invention

1) The present invention operates in biological processing ranges that differ from traditional wastewater treatment systems.

The present invention utilizes a Mean Cell Residence Time (MCRT) ranging from 30 days to over 150 days, while the traditional systems cannot achieve such high residency.

The Food to Microorganism (F/M) ratio sustained by the current invention, supporting its efficiency values, are substantially in the 0.05 to 0.80 range, versus a restricted ratio range as recorded with various traditional systems.

The present invention uses a wastewater treatment plant with a unique design so as to treat the total BOD portion of the wastewater using less energy by the plant's processing operation. This treatment is designed to significantly reduce, if not eliminate, all biodegradable solids. The unique process is able to perform at such an efficient level due to the effectiveness of the aeration and recirculation processing introduced throughout the treatment cycles.

A traditional wastewater treatment plant's design objective is to physically remove as much of the solid materials from the influent flow as possible and to ultimately dispose or waste the solids removed from the treatment system off premises. The balance of the wastewater is treated by various means to varying degrees of cleanliness, appropriately meeting the levels required for the discharge.

2) The current invention uses a clarification vessel design with a conical shaped vessel bottom in which to collect the settled solids without the use of mechanical means to concentrate the settled solids.

Wastewater within the vessel is made to rotate at a sufficiently slow velocity to cause the sludge to settle, while not providing an opportunity for the sludge to adhere to the side of the cone shaped bottom. The velocity of the rotating solids remain slow enough to allow them to settle and not remain in suspension. This is accomplished by means of a solids accumulator induction system used in the clarifier for a controlled rotational travel of the vessels liquid.

A traditional clarifier has a mechanical device to transport the sludge into the sludge pump's sump area for removal. The mechanical means consist of a motor, gear reducer, rake arm, blade and scraper squeegees and a skimmer arm.

3) The present invention (in the preferred apparatus embodiment) substantially utilizes typical vessel construction and outfitting. This allows for changes in vessel utilization for different processes. All of the vessels are substantially of the same size and shape to allow the vessels to be used as a single processing zone. An example of use as a single processing zone would be using all the vessels as aerobic reactors during start-up procedures. All the vessels are substantially plumbed the same, and have substantially the same capabilities (if so desired). The system has built-in redundancy capabilities in that each of the vessels being of the same size and shape allows for any one of the vessels to be used for any process, which is desirable during times of maintenance. Vessel and plumbing configuration is such that any processing zone has the ability to be expanded incrementally by simply duplicating a process vessel and plumbing as necessary to satisfy performance and/or discharge permit requirements. With plumbing and vessel configuration, allowances are available for a choice of vessel processing utilization with little or no operational shutdowns. Simple valve changes make this possible.

4) The present invention utilizes the RCAS system's velocity, volume and direction of flow, at its discharge point into the vessel, to regulate the rotational speed and travel time for mixing and/or settling of solids in each zone. For example, an aerobic reactor could be converted into an aerobic digester by:

Isolating the aerobic reactor from the system and aerating the contents while holding the contents for complete digestion of solids.

Slowing the rotational velocity in the anoxic selector so as to allow solids to settle for transfer to the anaerobic conditioner.

Slowing the rotational velocity in the anaerobic conditioner so as to allow solids to settle for transfer to the aerobic digester.

Holding the contents of the aerobic digester while aerating so as to nearly complete the digestion of organic matter.

Stopping the aerobic digestion action, allowing any inorganic matter to settle to the cone bottom and then removing any inorganic matter for disposal.

Starting the process once again for continued digestion of organic solids.

Upon completion of all organic digestion, the aerobic digester can be returned into service as an aerobic reactor.

5) The present invention reduces the number of pathogenic organisms within a wastewater through the use of the RCAS system. This occurs as the turbulence and agitation within the toroidal vortex of the RCAS device creates a violent action, sheering the cell membrane of bacteria such as *e. coli* and fecal coliform allowing the electron acceptors of the bacteria to be used by oxygen which then oxidizes the bacteria killing it.

Although illustrative embodiments of the present invention have been described herein with reference to the accompanying drawings, it is to be understood that the invention is not limited to these precise embodiments, and that various other changes and modifications may be effected therein by one of ordinary skill in the art without departing from the scope or spirit of the invention. For example, the use of square or rectangular processing vessels having flat or slopped bottoms, as is the case in traditional processing vessels are able to be used with effectiveness by the RCAS system. The biological process of the present invention functions with sufficient circulation, agitation, aeration and homogenization apart from the RCAS system.

What is claimed:

1. A process for the treatment of an aqueous solution containing waste comprising the steps of:

providing an influent wastewater stream to an anaerobic conditioner zone within which aqueous total solids are re-circulated, mixed and kept in suspension;

providing low oxygen level mixed liquor suspended solids from an anoxic selector zone to the anaerobic conditioner zone to maintain a low dissolved oxygen level within the anaerobic conditioner zone;

providing an outflow from the anaerobic conditioner zone to a first aerobic reactor zone, the anaerobic conditioner zone outflow being mixed in the first aerobic reactor zone with return activated sludge from a clarification zone whereby contents of the first aerobic reactor zone are re-circulated and aerated, and whereby settleable solids present in the contents of the first aerobic reactor zone are fractionalized, thereby decomposing and oxidizing the solids and other organic matter and accumulating insert solids;

discharging the accumulated inert solids from the first aerobic reactor zone;

providing an outflow of aqueous solution from the first aerobic reactor zone to the anoxic selector zone wherein the aqueous solution in the anoxic selector zone is re-circulated and mixed;

transferring a first portion of the anoxic selector zone aqueous solution corresponding to the low oxygen level/mixed liquor suspended solids to the anaerobic conditioner zone, and a second portion of the anoxic selector zone aqueous solution to a second aerobic reactor zone;

recirculating and aerating aqueous solution contained in the second aerobic reactor zone whereby settleable solids become fractionalized thereby decomposing and oxidizing suspended solids and other organic matter;

providing a first portion of the second aerobic reactor zone aqueous solution to the first aerobic reactor zone;

providing a second portion of the second aerobic reactor zone aqueous solution to the clarification zone to settle or separate solids from the aqueous solution contained therein;

providing the settled or separated solids from the clarification zone, corresponding to return activated sludge, to the first aerobic reactor zone;

providing aqueous solution of the clarification zone to a filtration zone to settle or separate solids from the aqueous solution provided thereto; and transferring a liquid portion of an outflow of the filtration zone to a discharge receptacle, and the settled or separated solids portion of the outflow of the filtration zone to the influent wastewater stream for re-processing.

2. A process for the biological treatment of an aqueous solution containing waste to reduce organic material, nitrogen and phosphorous, comprising the steps of:

providing an influent wastewater stream, which includes microorganisms, to an anaerobic conditioner zone within which aqueous total solids are re-circulated, mixed and kept in suspension, wherein a first stage of luxury phosphorous uptake is accomplished by regulating a flow of low oxygen level mixed liquor suspended solids from an anoxic selector zone to the anaerobic conditioner zone to maintain a low dissolved oxygen level within the anaerobic conditioner zone;

providing an outflow from the anaerobic conditioner zone to a first aerobic reactor zone, the anaerobic conditioner zone outflow being mixed in the first aerobic reactor zone with return activated sludge received from a clarification zone whereby contents of the first aerobic reactor zone are re-circulated and aerated and whereby nitrification occurs and settleable solids present in the contents of the first aerobic reactor zone are fractionalized, thereby decomposing and oxidizing suspended solids and other organic matter along with enhancing a second stage of luxury phosphorous uptake and accumulating insert solids;

discharging the accumulated inert solids from the first aerobic reactor zone;

providing an outflow of aqueous solution from the first aerobic reactor zone to the anoxic selector zone wherein the aqueous solution in the anoxic selector zone is re-circulated and mixed, and causing a low oxygen environment to exist within the anoxic selector zone such that denitrification and release of biological phosphorous occurs along with the consumption of organic matter contained within the aqueous solution;

transferring a first portion of anoxic selector zone aqueous solution corresponding to low oxygen level/mixed liquor suspended solids to the anaerobic conditioner zone and a second portion of the anoxic selector zone aqueous solution to a second aerobic zone, at least the second portion of the anoxic selector zone aqueous solution being rich in microorganisms and nutrients;

re-circulating and aerating aqueous solution contained in the second aerobic reactor zone whereby nitrification occurs and settleable solids become fractionalized thereby decomposing and oxidizing suspended solids and other organic matter, and further enhancing the second stage of luxury phosphorous uptake resulting in a consumption of a large amount of phosphorous by the microorganisms;

providing a first portion of the second aerobic reactor zone aqueous solution to the first aerobic reactor zone;

providing a second portion of the second aerobic reactor zone aqueous solution to the clarification zone to settle or separate solids from the aqueous solution provided thereto;

providing the settled or separated solids from the clarification zone to the first aerobic reactor zone as return activated sludge;

providing aqueous solution of the clarification zone to a filtration zone to settle or separate solids from the aqueous solution provided thereto; and transferring a liquid portion of an outflow of the filtration zone to a discharge receptacle and the settled or separated solids portion of the outflow of the filtration zone to the influent wastewater stream for re-processing.

3. Apparatus for the treatment of an aqueous solution containing waste comprising:

an anaerobic conditioner zone fluidly coupled to an inlet, the anaerobic conditioner zone receiving an influent wastewater stream through the inlet, the anaerobic conditioner zone re-circulating the wastewater contained therein such that aqueous total solids are kept in suspension, the anaerobic conditioner zone receiving a flow of low oxygen level mixed liquor suspended solids from an anoxic selector zone to maintain a low dissolved oxygen level within the anaerobic conditioner zone;

a first aerobic reactor zone fluidly coupled to the anaerobic conditioner zone, the first aerobic reactor zone receiving an outflow of the anaerobic conditioner zone which is mixed with return activated sludge received from a clarification zone whereby contents of the first aerobic reactor zone are re-circulated and aerated and whereby settleable solids become fractionalized thereby decomposing and oxidizing suspended solids and other organic matter, the first aerobic reactor zone accumulating inert solids, the accumulated inert solids being discharged from the first aerobic reactor zone;

an anoxic selector zone fluidly coupled to the anaerobic conditioner zone and the first aerobic reactor zone, the anoxic selector zone receiving an outflow of aqueous solution from the first aerobic reactor zone, aqueous solution within the anoxic selector zone being re-circulated and mixed, a first portion of the anoxic selector zone aqueous solution, corresponding to the low oxygen level/mixed liquor suspended solids, being provided to the anaerobic conditioner zone;

a second aerobic reactor zone fluidly coupled to the anoxic selector zone and the first aerobic reactor zone, the second aerobic reactor zone receiving a second portion of the anoxic selector zone aqueous solution wherein the aqueous solution within the second aerobic zone is re-circulated and aerated whereby settleable solids become fractionalized, a first portion of the aqueous solution of the second aerobic reactor zone being provided to the first aerobic reactor zone;

a clarification zone fluidly coupled to the second aerobic zone and the first aerobic zone, the clarification zone receiving a second portion of the second aerobic reactor zone aqueous solution, whereby settling or separating and capturing of solids from the aqueous solution occurs, and the settled solids, corresponding to return activated sludge, are provided to the first aerobic reactor zone; and a filtration zone fluidly coupled to the clarification zone, the inlet, and an outlet, the filtration zone receiving an outflow from the clarification zone to separate solids from the liquid portion of the contents of the clarification zone, a first portion of the contents of the filtration zone, which corresponds to effluent, being provided to the outlet, and a second portion of the contents of the filtration zone, which corresponds to separated solids, being provided to the inlet and being combined with the influent wastewater stream for re-processing.

* * * * *